(12) United States Patent
Swager et al.

(10) Patent No.: US 10,697,918 B2
(45) Date of Patent: Jun. 30, 2020

(54) POLYMER / SINGLE-WALLED CARBON NANOTUBE COMPOSITE FOR GAS DETECTION

(71) Applicant: MASSACHUSETTS INSTITUTE OF TECHNOLOGY, Cambridge, MA (US)

(72) Inventors: Timothy Manning Swager, Newton, MA (US); Sophie Liu, Annandale, NJ (US); Bora Yoon, Cambridge, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 183 days.

(21) Appl. No.: 15/586,466

(22) Filed: May 4, 2017

(65) Prior Publication Data

US 2017/0322167 A1 Nov. 9, 2017

Related U.S. Application Data

(60) Provisional application No. 62/331,944, filed on May 4, 2016.

(51) Int. Cl.
| | |
|---|---|
| *G01N 27/12* | (2006.01) |
| *G01N 27/416* | (2006.01) |
| *C08L 39/04* | (2006.01) |
| *C08F 38/02* | (2006.01) |
| *C08L 39/08* | (2006.01) |
| *C08F 8/44* | (2006.01) |
| *C01B 32/168* | (2017.01) |
| *C08F 126/06* | (2006.01) |
| *B82Y 15/00* | (2011.01) |

(Continued)

(52) U.S. Cl.
CPC ........ *G01N 27/126* (2013.01); *C01B 32/168* (2017.08); *C08F 8/44* (2013.01); *C08F 38/02* (2013.01); *C08F 126/06* (2013.01); *C08L 39/04* (2013.01); *C08L 39/08* (2013.01); *G01N 27/127* (2013.01); *G01N 27/4162* (2013.01); *B82Y 15/00* (2013.01); *B82Y 30/00* (2013.01); *B82Y 40/00* (2013.01); *C01B 2202/02* (2013.01)

(58) Field of Classification Search
CPC ..... G01N 27/127; G01N 27/126; G01N 27/04
USPC ............................ 422/82.02, 82.01; 977/942
See application file for complete search history.

(56) References Cited

U.S. PATENT DOCUMENTS

2010/0179054 A1* 7/2010 Swager .................. B01J 21/185
502/162

* cited by examiner

*Primary Examiner* — Natalia Levkovich
(74) *Attorney, Agent, or Firm* — Steptoe & Johnson LLP

(57) ABSTRACT

A sensor can include a conductive region in electrical communication with at least two electrodes, the conductive region can include a composite of a polymer and SWCNTs immobilized onto a substrate. In certain embodiment, a linker can be grafted on the substrate. The linker can connect the substrate and the composite of the polymer and SWCNTs. In certain embodiments, the linker can covalently bond the polymer to the substrate. In certain embodiments, metal nanoparticles or ions can be incorporated as a metal sensitizer to confer further selectivity or sensitivity to the device. In certain embodiments, the polymer can act as a ligand for a variety of metal ions. By incorporating a specific metal ion, the sensor can selectively detect a specific analyte. In certain embodiments, the composite of the polymer and SWCNTs can be functionalized. In certain embodiments, the composite can further include a sensing element.

36 Claims, 33 Drawing Sheets

(51) Int. Cl.
*B82Y 30/00* (2011.01)
*B82Y 40/00* (2011.01)

LEWIS ACID

LEWIS BASE

POLYMER / SINGLE-WALLED CARBON NANOTUBE COMPOSITE FOR GAS DETECTION

CLAIM OF PRIORITY

This application claims the benefit of U.S. Provisional Application No. 62/331,944 filed on May 4, 2016, which is incorporated by reference in its entirety.

FEDERALLY SPONSORED RESEARCH OR DEVELOPMENT

This invention was made with Government support under Contract No. DE-AC52-07NA27344 awarded by the Department of Energy and under Contract No. W911NF-13-D-0001 awarded by the Army Research Office. The Government has certain rights in the invention.

TECHNICAL FIELD

The invention relates to sensors and methods of sensing.

BACKGROUND

While a large variety of chemical sensor devices exist, there is still increasing demand for sensitive, selective and cost-effective devices for gas and vapor phase detection. Strategies for the detection of various gas and vapor phase detection include chromatography, spectrometry, electrophoresis, colorimetry, mass balance, chemiluminescence, and electrochemistry. See, for example, Z. Karpas, et al. *Anal. Chim. Acta* 2002, 463, 155-163; L. V. Jørgensen, et al. *J. Agric. Food Chem.* 2001, 49, 2376-2381; Á. Kovács, et al. *J. Chromatogr. A* 1999, 836, 305-313; H. Li, et al. *Anal. Methods* 2014, 6, 6271-6277; b) T. L. Nelson, et al. *Analyst* 2007, 132, 1024-1030; c) M. S. Maynor, et al. *Org. Lett.* 2007, 9, 3217-3220; C. Di Natale, et al. *Sens. Actuators, B* 1997, 44, 521-526; Y. Yano, et al. *Lebensm. Wiss. Technol.* 1996, 29, 498-502; M. Wimmerová, et al. *Biosens. Bioelectron.* 1999, 14, 695-702; D. Carelli, et al. *Biosens. Bioelectron.* 2007, 23, 640-647, each of which is incorporated by reference in its entirety. However, these all suffer from one or more drawbacks: extensive sample preparation prior to analysis; expensive, cumbersome instruments with high power consumption; highly trained personnel to operate; and line of sight required to read output.

SUMMARY

In another aspect, a sensor for detecting an analyte can include a substrate and a conductive region in electrical communication with at least two electrodes on the substrate, the conductive region including a composite, where the composite includes a carbon nanotube associated with a polymer covalently linked to a surface of the substrate via a linker.

In certain embodiments, the polymer can include a nitrogenous group available to form a covalent bond with the linker.

In certain embodiments, the polymer can include poly(4-vinylpyridine) (P4VP).

In certain embodiments, the linker can include a quaternary nitrogen bond with the polymer.

In certain embodiments, the linker can be derived from an alkyl halide group.

In certain embodiments, the linker can be derived from 3-bromopropyltrichlorosilane.

In certain embodiments, the polymer can be further associated with a metal particle or a metal ion.

In certain embodiments, the metal ion can be a soft Lewis acidic cation.

In certain embodiments, the metal ion can be $Cu^{2+}$, $Cu^+$, $Pd^{2+}$, $Ru^+$, $Rh^{3+}$, $Ag^+$, $Cd^{2+}$, $Fe^{3+}$, $Ru^{3+}$, $Os^+$, $Ir^{3+}$, $Pt^{4+}$, $Pt^{2+}$, $Au^{3+}$, $Au^+$, $Hg^{2+}$, $Hg^+$ or $Tl^+$.

In certain embodiments, the metal ion can be an oxidizing agent.

In certain embodiments, the metal ion can be permanganate.

In certain embodiments, a second polymer can be incorporated into the sensor.

In certain embodiments, the second polymer can be a conducting polymer.

In certain embodiments, the second polymer can be a polydiacetylene.

In certain embodiments, the carbon nanotube can be a single-walled carbon nanotube.

In certain embodiments, wherein the substrate can be glass, paper, plastic, or a resonant circuit.

In certain embodiments, the sensor can further include a metal sensitizer.

In certain embodiments, the metal sensitizer includes silver nanoparticles.

In certain embodiments, the composite can be functionalized.

In certain embodiments, the composite can be functionalized with 2-bromoethanol.

In certain embodiments, the composite can further comprise a sensing element.

In certain embodiments, the sensing element can be glucose oxidase.

In certain embodiments, the analyte can be glucose.

In another aspect, a method of sensing an analyte can include exposing a sensor to a sample, the sensor including a substrate, and a conductive region in electrical communication with at least two electrodes on the substrate, the conductive region including a composite, wherein the composite includes a carbon nanotube associated with a polymer covalently linked to a surface of the substrate via a linker, and measuring an electrical property at the electrodes.

In certain embodiments, the method can further include detecting an amine.

In certain embodiments, the method can further include detecting a thioether.

In certain embodiments, the method can further include detecting a volatile organic compound.

In certain embodiments, the method can further include detecting an environmental stimulus.

In certain embodiments, the method can further include detecting the analyte wirelessly.

In certain embodiments, the method can further include detecting the analyte through a wireless radio frequency communication.

In certain embodiments, the method can further include detecting an output from a radio frequency identification tag including the sensor.

In certain embodiments, the polymer can include a nitrogenous group available to form a covalent bond with the linker.

In certain embodiments, the polymer can include poly(4-vinylpyridine) (P4VP).

In certain embodiments, the linker can include a quaternary nitrogen bond with the polymer.

In certain embodiments, the linker can be derived from an alkyl halide group.

In certain embodiments, the linker can be derived from 3-bromopropyltrichlorosilane.

In certain embodiments, the polymer can be further associated with a metal particle or a metal ion.

In certain embodiments, the metal ion can be a soft Lewis acidic cation. In certain embodiments, the metal ion can be $Cu^{2+}$, $Cu^+$, $Pd^{2+}$, $Ru^+$, $Rh^{3+}$, $Ag^+$, $Cd^{2+}$, $Fe^{3+}$, $Ru^{3+}$, $Os^+$, $Ir^{3+}$, $Pt^{4+}$, $Au^{3+}$, $Au^+$, $Hg^{2+}$, $Hg^+$ or $Tl^+$.

In certain embodiments, the metal ion can be permanganate.

In certain embodiments, a second polymer can be incorporated into the sensor.

In certain embodiments, the second polymer can be a conducting polymer.

In certain embodiments, the second polymer can be a polydiacetylene.

In certain embodiments, the carbon nanotube can be a single-walled carbon nanotube.

In certain embodiments, the substrate can be glass or paper.

In certain embodiments, the method can further include a metal sensitizer.

In certain embodiments, the metal sensitizer includes silver nanoparticles.

In certain embodiments, the composite can be functionalized.

In certain embodiments, the composite can be functionalized with 2-bromoethanol.

In certain embodiments, the composite can further comprise a sensing element.

In certain embodiments, the sensing element can be glucose oxidase.

In certain embodiments, the analyte can be glucose.

In another aspect, a method of preparing a sensor for detecting an analyte can include preparing a substrate, forming a conductive region on the substrate, the conductive region including a composite, where the composite includes a carbon nanotube and a polymer, grafting a linker on the substrate, forming a covalent bond between the substrate and the polymer via the linker, and placing the conductive region in electrical communication with at least two electrodes.

In certain embodiments, the polymer can include a nitrogenous group available to form a covalent bond with the linker.

In certain embodiments, the polymer can include poly(4-vinylpyridine) (P4VP).

In certain embodiments, the method can further include functionalizing the substrate with a linker.

In certain embodiments, the linker can include a quaternary nitrogen bond with the polymer.

In certain embodiments, the linker can be derived from an alkyl halide group.

In certain embodiments, the linker can be derived from 3-bromopropyltrichlorosilane.

In certain embodiments, the method can further include depositing a metal sensitizer.

In certain embodiments, the metal sensitizer can include metal nanoparticles.

In certain embodiments, the metal sensitizer can include silver nanoparticles.

In certain embodiments, the method can further include associating the polymer with a metal ion or a metal particle.

In certain embodiments, the metal ion can be a soft Lewis acidic cation.

In certain embodiments, the metal ion can be $Cu^{2+}$, $Cu^+$, $Pd^{2+}$, $Ru^+$, $Rh^{3+}$, $Ag^+$, $Cd^{2+}$, $Fe^{3+}$, $Ru^{3+}$, $Os^+$, $Ir^{3+}$, $Pt^{4+}$, $Au^{3+}$, $Au^+$, $Hg^{2+}$, $Hg^+$ or $Tl^+$.

In certain embodiments, the metal ion can be permanganate.

In certain embodiments, the method can further include incorporating a second polymer into the sensor.

In certain embodiments, the second polymer can be a conducting polymer.

In certain embodiments, the second polymer can be a polydiacetylene.

In certain embodiments, the composite can be functionalized.

In certain embodiments, the composite can be functionalized with 2-bromoethanol.

In certain embodiments, the composite can further comprise a sensing element.

In certain embodiments, the sensing element can be glucose oxidase.

In certain embodiments, the analyte can be glucose.

Other aspects, embodiments, and features will be apparent from the following description, the drawings, and the claims.

DETAILED DESCRIPTION

Figure 1A:
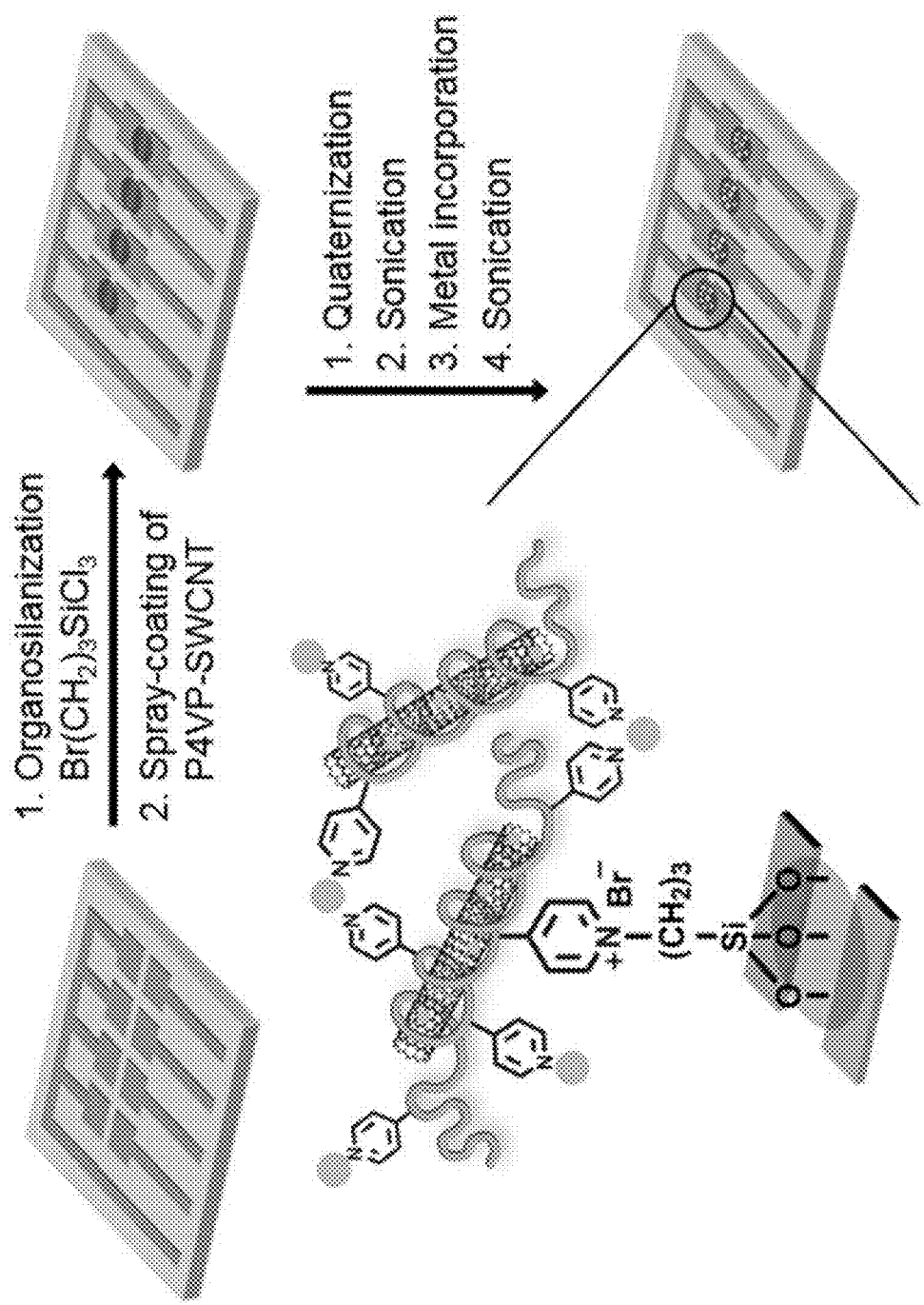
FIG. 1A shows a schematic of fabrication of a P4VP SWCNT-based chemiresistive device immobilized on a glass substrate.

Disclosed herein is a platform for electronic gas detectors including carbon nanotubes (CNTs) that are functionalized with a polymer and immobilized on a substrate. In certain embodiments, a sensor can include a conductive region in electrical communication with at least two electrodes, where the conductive region includes a composite. In certain embodiments, the polymer can include a nitrogenous group available to form a covalent bond with a linker. In certain embodiments, the linker can form a quaternary nitrogen bond with the polymer. In certain embodiments, the linker is derived from an alkyl halide group. The nitrogenous group is a group having a nucleophilic nitrogen atom. The nitrogenous group can be a pendant amino, pyridyl, pyrimidyl, oxazolyl, quinolinyl, purinyl, or isoquinolinyl moiety. In certain embodiments, the linker on the substrate can be activated to bind the polymer by dehydration reaction with activating electrophiles such as thionyl chloride of triflic anhydride. In certain embodiments, the composite includes a carbon nanotube that is functionalized with poly(4-vinylpyridine) (P4VP). The functionalization can be non-covalent. The sensor can behave as a dosimeter giving a response to a desired analyte.

Carbon nanotubes can be constructed with length-to-diameter ratio of up to 132,000,000:1, significantly larger than for any other material. These cylindrical carbon molecules have unusual properties, which are valuable for nanotechnology, electronics, optics and other fields of materials science and technology. In particular, owing to their extraordinary thermal conductivity and mechanical and electrical properties, carbon nanotubes find applications as additives to various structural materials.

Carbon nanotubes are members of the fullerene structural family. These sheets are rolled at specific and discrete (chiral) angles, and the combination of the rolling angle and radius decides the nanotube properties. Nanotubes are categorized as single-walled nanotubes (SWNTs) and multi-walled nanotubes (MWNTs). Individual nanotubes naturally align themselves into "ropes" held together by van der Waals forces, more specifically, π-stacking.

Applied quantum chemistry, specifically, orbital hybridization best describes chemical bonding in nanotubes. The chemical bonding of nanotubes is composed entirely of $sp^2$ bonds, similar to those of graphite. These bonds, which are stronger than the $sp^3$ bonds found in alkanes and diamond, provide nanotubes with their unique strength.

Single-walled carbon nanotubes (SWCNTs) have attracted remarkable attention as a material for electronic chemical detection due to the changes in electrical resistance they can exhibit upon exposure to analyte molecules. See, Kauffman, D. R.; Star, A. *Angew. Chem. Int. Ed.* 2008, 47 (35), 6550-6570, Fennell, J. F.; Liu, S. F.; Azzarelli, J. M.; Weis, J. G.; Rochat, S.; Mirica, K. A.; Ravnsbaek, J. B.; Swager, T. M. *Angew. Chem. Int. Ed.* 2016, 55 (4), 1266-1281, and Kong, J.; Franklin, N. R.; Zhou, C.; Chapline, M. G.; Peng, S.; Cho, K.; Dai, H. *Science* 2000, 287 (5453), 622-625, each of which is incorporated by reference in its entirety. The intrinsic properties of SWCNTs, such as their high surface area-to-volume ratios and their capability of molecular adsorption onto their sidewalls, enable them to detect gases and volatile organic compounds (VOCs). See, Azzarelli, J. M.; Mirica, K. A.; Ravnsbaek, J. B.; Swager, T. M. *Proc. Natl. Acad. Sci.* 2014, 111 (51), 18162-18166, Mirica, K. A.; Azzarelli, J. M.; Weis, J. G.; Schnorr, J. M.; Swager, T. M. *Proc. Natl. Acad. Sci.* 2013, 110 (35), E3265-E3270, Mubeen, S.; Zhang, T.; Chartuprayoon, N.; Rheem, Y.; Mulchandani, A.; Myung, N. V.; Deshusses, M. A. *Anal. Chem.* 2010, 82 (1), 250-257, Liu, S. F.; Moh, L. C. H.; Swager, T. M. *Chem. Mater.* 2015, 27 (10), 3560-3563, Shirsat, M. D.; Sarkar, T.; Kakoullis, J.; Myung, N. V.; Konnanath, B.; Spanias, A.; Mulchandani, A. *J. Phys. Chem. C* 2012, 116 (5), 3845-3850, and Sarkar, T.; Srinives, S.; Sarkar, S.; Haddon, R. C.; Mulchandani, A. *J. Phys. Chem. C* 2014, 118 (3), 1602-1610, each of which is incorporated by reference in its entirety.

In particular, many recent reports have shown the advantages of chemiresistors fabricated from random SWCNT networks for gas detection because of their porosity with large surface areas, device-to-device reproducibility, and facile device fabrication via well-established solution processes such as drop-casting, spin-coating, dip-coating, inkjet-printing or spray-coating. See, Liu, S. F.; Petty, A. R.; Sazama, G. T.; Swager, T. M. *Angew. Chem. Int. Ed.* 2015, 54 (22), 6554-6557, Wang, F.; Yang, Y.; Swager, T. M. *Angew. Chem. Int. Ed.* 2008, 47 (44), 8394-8396, Kim, T. H.; Lee, B. Y.; Jaworski, J.; Yokoyama, K.; Chung, W.-J.; Wang, E.; Hong, S.; Majumdar, A.; Lee, S.-W. *ACS Nano* 2011, 5 (4), 2824-2830, Ammu, S.; Dua, V.; Agnihotra, S. R.; Surwade, S. P.; Phulgirkar, A.; Patel, S.; Manohar, S. K. *J. Am. Chem. Soc.* 2012, 134 (10), 4553-4556, Lipomi, D. J.; Vosgueritchian, M.; Tee, B. C.-K.; Hellstrom, S. L.; Lee, J. A.; Fox, C. H.; Bao, Z. *Nat. Nanotechnol.* 2011, 6 (12), 788-792, Jing, H.; Jiang, Y.; Du, X. *J. Mater. Sci. Mater. Electron.* 2013, 24 (2), 667-673, Chen, Y.; Lee, Y. D.; Vedala, H.; Allen, B. L.; Star, A. *ACS Nano* 2010, 4 (11), 6854-6862, and Battie, Y.; Gorintin, L.; Ducloux, O.; Thobois, P.; Bondavalli, P.; Feugnet, G.; Loiseau, A. *Analyst* 2012, 137 (9), 2151-2157, each of which is incorporated by reference in its entirety. Among these methods employed for deposition of SWCNT dispersions, a spray-coating technique is of great interest owing to its superior features that allow simple and cost-effective device fabrication on various substrates, which would render the SWCNT-based chemiresistors suitable for scaling-up processes for real-life applications.

Although several reports exist on the use of spray-coated SWCNTs for chemiresistive gas detection, the poor solubility of SWCNTs in most solvents, caused by the strong van der Waals interaction between inherently hydrophobic SWCNTs, is still one of the main challenges of using SWCNTs for the spray-coating technique. Spray coating can be performed over large areas, and patterns can be produced using a mask. Alternatively, spray coating can be miniaturized wherein droplets are positioned over small, sub-millimeter dimensions. Inkjet printing is a form of spray coating thought the selective deposition of small droplets. For a reliable and controlled coating process without nozzle clogging, it is critical to form a stable SWCNT dispersion. Considerable research has been made to improve the solubility of SWCNTs by using mainly two approaches, covalent and non-covalent functionalization. See, Tasis, D.; Tagmatarchis, N.; Bianco, A.; Prato, M. *Chem. Rev.* 2006, 106 (3), 1105-1136, Sakellariou, G.; Priftis, D.; Baskaran, D. *Chem. Soc. Rev.* 2013, 42 (2), 677-704, Bekyarova, E.; Kalinina, I.; Sun, X.; Shastry, T.; Worsley, K.; Chi, X.; Itkis, M. E.; Haddon, R. C. *Adv. Mater.* 2010, 22 (7), 848-852, Schnorr, J. M.; van der Zwaag, D.; Walish, J. J.; Weizmann, Y.; Swager, T. M. *Adv. Funct. Mater.* 2013, 23 (42), 5285-5291, Bilalis, P.; Katsigiannopoulos, D.; Avgeropoulos, A.; Sakellariou, G. *RSC Adv.* 2014, 4 (6), 2911-2934, Liang, S.; Zhao, Y.; Adronov, A. *J. Am. Chem. Soc.* 2014, 136 (3), 970-977, Samanta, S. K.; Fritsch, M.; Scherf, U.; Gomulya, W.; Bisri, S. Z.; Loi, M. A. *Acc. Chem. Res.* 2014, 47 (8), 2446-2456, Zhao, Y.-L.; Stoddart, J. F. *Acc. Chem. Res.* 2009, 42 (8), 1161-1171, and Nish, A.; Hwang, J.-Y.; Doig, J.; Nicholas, R. J. *Nat. Nanotechnol.* 2007, 2 (10), 640-646, each of which is incorporated by reference in its entirety. It is inevitable, however, that the intrinsic properties of SWCNTs are altered while forming covalent bonds between functional groups and the nanotube sidewalls, which leads to major disruption of the SWCNTs' electronic and primary structures. On the other hand, the use of polymers to non-covalently adsorb to SWCNTs has been shown to be effective in solubilizing SWCNTs without impairing the inherent properties of SWCNTs. However, many of them still have limitations associated with polymer preparation, such as the need for complicated steps for polymer synthesis or relatively expensive commercial polymers in addition to the lack of chemical selectivity and limited further functionalization on polymers. See, Lee, H. W.; Yoon, Y.; Park, S.; Oh, J. H.; Hong, S.; Liyanage, L. S.; Wang, H.; Morishita, S.; Patil, N.; Park, Y. J.; Park, J. J.; Spakowitz, A.; Galli, G.; Gygi, F.; Wong, P. H.-S.; Tok, J. B.-H.; Kim, J. M.; Bao, Z. *Nat. Commun.* 2011, 2, 541, Ren, S.; Bernardi, M.; Lunt, R. R.; Bulovic, V.; Grossman, J. C.; Gradečak, S. *Nano Lett.* 2011, 11 (12), 5316-5321, Chatterjee, T.; Yurekli, K.; Hadjiev, V. G.; Krishnamoorti, R. *Adv. Funct. Mater.* 2005, 15 (11), 1832-1838, and Chang, T.-E.; Kisliuk, A.; Rhodes, S. M.; Brittain, W. J.; Sokolov, A. P. *Polymer* 2006, 47 (22), 7740-7746, each of which is incorporated by reference in its entirety.

Based on the consideration above, poly(4-vinylpyridine) (P4VP), an inexpensive and commercially available polymer, is a promising candidate for a SWCNT dispersant because of the favorable interfacial interactions between SWCNTs and its pyridyl groups that leads to SWCNT debundling. See, Rouse, J. H. *Langmuir* 2005, 21 (3), 1055-1061, and Jin, Z.; Sun, X.; Xu, G.; Hong Goh, S.; Ji, W. *Chem. Phys. Lett.* 2000, 318, 505-510, each of which is incorporated by reference in its entirety. In the development of SWCNT-based chemiresistors, it was hypothesized that sensitivity could be enhanced by improving the dispersibility of the SWCNTs to discourage aggregation, thereby increasing the functional surface area of the SWCNTs. Moreover, the nucleophilic and polar pyridyl nitrogens' chemical reactivity toward alkyl halides or metal species (see Fréchet, J. M. J.; de Meftahi, M. V. *Br. Polym. J.* 1984, 16 (4), 193-198, which is incorporated by reference in its entirety) makes P4VP attractive as a versatile and modular sensor platform, but there has been no previous research on the use of P4VP-SWCNT composites in electronic devices for gas detection.

In an effort to develop a scalable chemiresistive sensor platform, P4VP was incorporated into a SWCNT-based chemiresistive device architecture via spray-coating technique as shown in FIG. 1A. Additionally, it was hypothesized that immobilizing the P4VP-SWCNT composite onto the substrate would improve robustness and long-term stability of the device (see Frazier, K. M.; Swager, T. M. *Anal. Chem.* 2013, 85 (15), 7154-7158, which is incorporated by reference in its entirety). Also hypothesized is that the residual pyridyl moieties of the polymer not consumed by immobilizing quaternization would be available for post-fabrication coordination with metal nanoparticles or ions that could potentially confer selectivity or sensitivity toward analytes of interest per the inorganic coordination chemistries by which they are governed.

Electronic sensors such as chemiresistors offer solutions to drawbacks of existing art. They can take measurements in real time with the as-is sample; they can be fabricated cheaply; they can be portable with low power requirements and readily integrated into electronic circuitry without direct visual (line of sight) observation needed to obtain the readout. Carbon nanotubes are particularly well suited for use in chemiresistors as they are highly sensitive to changes in their electronic environments and do not require high operating temperatures. See, for example, U. Latif, et al., *Sensors* 2011, 11, 8611-8625; D. R. Kauffman, et al., *Angew. Chem.* 2008, 120, 6652-6673; b) D. R. Kauffman, et al., *Angew. Chem. Int. Ed.* 2008, 47, 6550-6570; P. M. Schweizer-Berberich, et al., Sens. Actuators, B 1994, 19, 282-290, each of which is incorporated by reference in its entirety.

Although non-functionalized single-walled carbon nanotubes (SWCNTs) can detect analytes chemiresistively, their sensitivity and specificity to amines can be improved through functionalization.

SWCNTs can be functionalized covalently or non-covalently with other molecules in order to impart sensitivity or selectivity for a desired analyte. See, for example, K. A. Mirica, et al. *Angew. Chem.* 2012, 124, 10898-10903; K. A. Mirica, et al., *Angew. Chem. Int. Ed.* 2012, 51, 10740-10745; J. M. Schnorr, et al. *Chem. Mater.* 2011, 23, 646-657, each of which is incorporated by reference in its entirety. In particular, non-covalent functionalization allows for facile functionalization without disruption of the electronic properties of the CNTs that can accompany covalent functionalization. See, for example, W. Maser, et al., in Functionalized Nanoscale Materials, Devices and Systems (Eds.: A. Vaseashta, I. N. Mihailescu), Springer, Dordrecht, The Netherlands, 2008, pp. 101-120, which is incorporated by reference in its entirety.

Covalent functionalization is based on the formation of a covalent linkage between functional entities and the carbon skeleton of nanotubes. It could also be divided into direct covalent sidewall functionalization and indirect covalent functionalization with carboxylic groups on the surface of CNTs. Direct covalent sidewall functionalization is associated with a change in hybridization from $sp^2$ to $sp^3$ and a simultaneous loss of conjugation. Indirect covalent functionalization takes advantage of chemical transformations of carboxylic groups at the open ends and holes in the sidewalls. These carboxylic groups might have existed on the as-grown CNTs and also be further generated during oxidative purification. In order to increase the reactivity of CNTs, the carboxylic acid groups usually need to be converted into acid chloride and then undergo an esterification or amidation reaction. The drawback of covalent functionalization is that the structure of CNTs has to be destroyed, resulting in significant changes in their physical properties.

Non-covalent functionalization is mainly based on supramolecular complexation using various adsorption forces, such as van der Waals force, hydrogen bonds, electrostatic force and it-stacking interactions. Compared to the chemical functionalization, non-covalent functionalization has the advantages that it could be operated under relatively mild reaction conditions and the graphitic structure of CNTs could be maintained.

In certain embodiments, a sensor can include a composite of a polymer and SWCNTs immobilized onto a substrate. In certain embodiments, the substrate can include metal electrodes, and a linker can be grafted on the substrate. The linker can connect the substrate and the composite of the polymer and SWCNTs. In certain embodiments, the linker can covalently bond the polymer to the substrate. In certain embodiments, metal nanoparticles or ions can be further included as a metal sensitizer to confer further selectivity or sensitivity to the device. The metal nanoparticles or ions can be coordinated by residual moieties in the polymer that are not consumed by grafting to the substrate. In certain embodiments, the polymer can act as a ligand for a variety of metal ions. By incorporating a specific metal ion, the sensor can selectively detect an analyte.

The substrate can be either rigid or flexible. In certain embodiments, the substrate can be made of rigid materials, such as glass, plastic, wood, concrete, rocks, metal chalcogenides, rigid polymers and their composites, passivated metals, bone, asphalt, graphite, silicon, semiconductors, a resonant circuit, ceramics, marble, or granite. In certain embodiments, the substrate can be made of flexible materials, such as paper, polymers, skin, cloth, tissue, plants, leather, thin sheets of semiconductors or metals, and tires.

In certain embodiments, the electrodes can include gold or silver.

In certain embodiments, the linker can include an alkyl halide group. For example, the linker can be 3-bromopropyltrichlorosilane.

In certain embodiments, the metal nanoparticles can include silver, copper, gold, mercury, zinc, cobalt, rhodium, iridium, nickel, platinum, palladium, iron, ruthenium, manganese, tin, lead of oxides or sulfides thereof.

Figure 20:
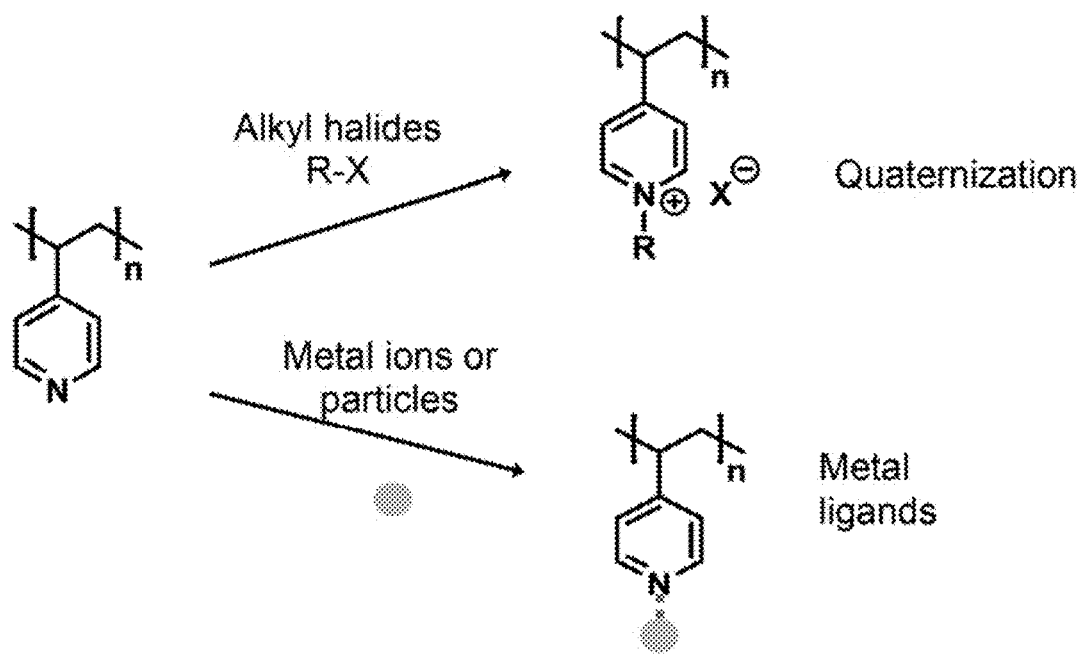
FIG. 20 shows further modifications of pyridines.

For example, the glass substrate was patterned with gold electrodes and then subjected to grafting between gold electrodes and then subjected to organosilanization with 3-bromopropyltrichlorosilane. The resulting pendant alkyl bromide groups on the glass surface are then available to undergo quaternization chemistry with the pyridyl groups in a composite of P4VP and SWCNTs, thereby covalently bonding the polymer to the substrate (FIG. 20). Residual pyridyl groups in the P4VP that are not consumed in the quaternization can subsequently be used to coordinate metal nanoparticles or metal ions chosen to confer further selectivity or sensitivity to the device (FIG. 20).

Figure 21:
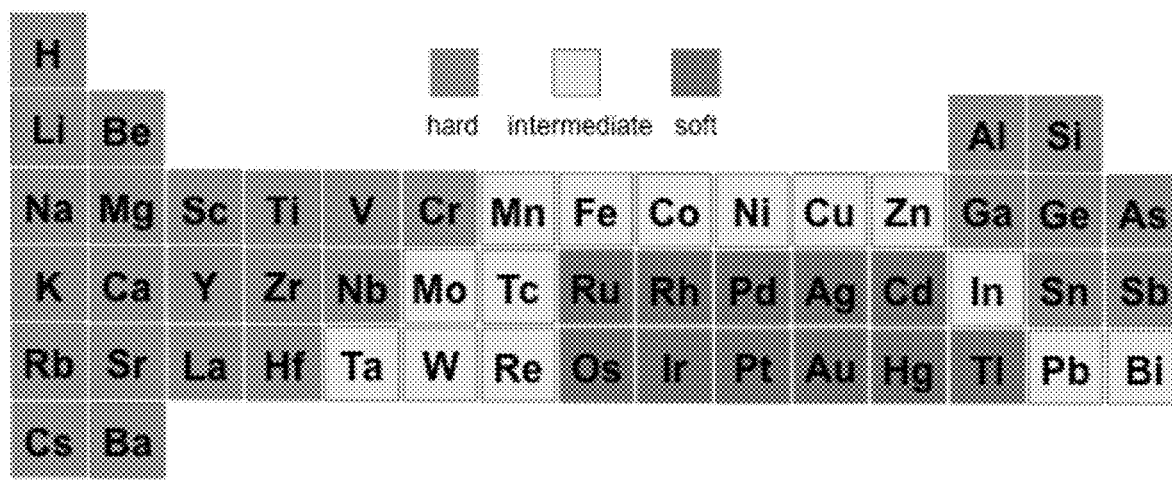
FIG. 21 shows examples of soft, intermediate, and hard Lewis acids.
Figure 21:
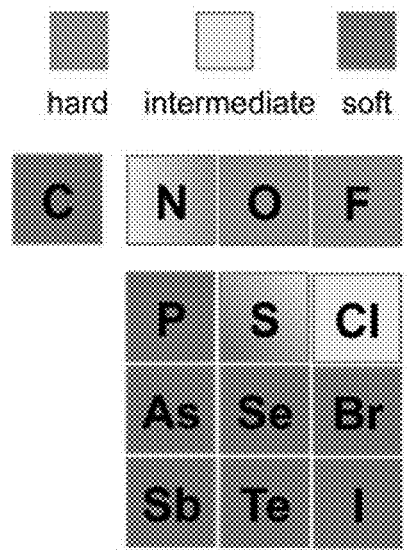

This platform's physical parameters can be optimized using P4VP coordinated with silver nanoparticles to detect ammonia gas. In certain embodiments, P4VP can be further associated with a metal particle or a metal ion. In certain embodiments, the modularity of the P4VP platform can incorporate soft Lewis acidic cations. As used herein, the term "soft Lewis acid" is given its ordinary meaning in the art and refers to species with characteristics, such as large atomic/ionic radius, high polarizability, and low charge. The examples of soft Lewis acids can include cations of Ru, Rh, Pd, Ag, Cd, Os, Ir, Pt, At, Hg, and Tl (see FIG. 21, reproduced from public sources). In certain embodiments, $Pd^{2+}$ cations from $PdCl_2$ can be incorporated into the P4VP platform. The $Pd^{2+}$ cations can yield a selective and highly sensitive device that changes resistance upon exposure to vapors of thioethers, which have relevance in applications such as odorized fuel leak detection, produce detection and assessment, and breath diagnostics. In certain other embodiments, incorporation of permanganate rather than $Pd^{2+}$ at the residual pyridyl sites can give a device that responds well to vapors of VOCs susceptible to oxidation. In certain other embodiments, a polymer can be incorporated into the sensor. In certain embodiments, the polymer can be a conducting polymer. For example, polydiacetylenes (PDAs) or polyaniline can undergo color (typically blue-to-red) and fluorescence (non-to-red) changes upon exposure to environmental stimuli such as heat, mechanical stress, and biological and chemical interaction. Therefore, inkjet-compatible PDAs can be applied to disposable chromogenic paper-based sensors and visible security features in authentic identification systems based on the optical properties of PDAs.

First this platform was optimized using ammonia as a model analyte through examination of multiple device fabrication parameters. After optimization of the P4VP-SWCNT-based chemiresistor platform using ammonia as a model analyte, the P4VP-SWCNT platform was tuned to selectively and sensitively detect the vapors of a specific class of VOCs, thioethers. Thioethers are an important class of organic molecules, and their detection has numerous potential applications including the evaluation and harvest of truffles (2,4-dithiapentane), detection of odorized gas leak (tetrahydrothiophene), and breath analysis in healthcare diagnostics for diseases such as malaria (methyl n-propyl sulfide). See, Pelusio, F.; Nilsson, T.; Montanarella, L.; Tilio, R.; Larsen, B.; Facchetti, S.; Madsen, J. *J. Agric. Food Chem.* 1995, 43 (8), 2138-2143, Falasconi, M.; Pardo, M.; Sberveglieri, G.; Battistutta, F.; Piloni, M.; Zironi, R. *Sens. Actuators, B* 2005, 106 (1), 88-94, Whisman, M. L.; Goetzinger, J. W.; Cotton, F. O.; Brinkman, D. W. *Environ. Sci. Technol.* 1978, 12 (12), 1285-1288, and Berna, A. Z.; McCarthy, J. S.; Wang, R. X.; Saliba, K. J.; Bravo, F. G.; Cassells, J.; Padovan, B.; Trowell, S. C. *J. Infect. Dis.* 2015, 212 (7), 1120-1128, each of which is incorporated by reference in its entirety. By incorporation of soft $Pd^{2+}$ metal cations into the P4VP-SWCNT film and utilizing the resultant devices to chemiresistively detect the vapors of these representative organic thioethers, the principles of hard-soft acid-base (HSAB) theory was leveraged (see, Pearson, R. G. *J. Chem. Educ.* 1968, 45 (9), 581-587, and Lemire, J. A.; Harrison, J. J.; Turner, R. J. *Nat. Rev. Microbiol.* 2013, 11 (6), 371-384, each of which is incorporated by reference in its entirety) with this platform to guide the rational design of effective chemiresistive detectors. Additionally, as an alternative to $Pd^{2+}$, a post-fabrication modification of the P4VP was performed in these devices by incorporating permanganate through treatment with potassium permanganate under acidic conditions. These devices were then used to chemiresistively detect the vapors of VOCs susceptible to oxidation (e.g., alcohols). Through this work, the modularity and the facile incorporation of inorganic chemistries into this platform to afford targeted detection of vapors of VOCs were demonstrated.

The P4VP-SWCNT chemiresistor platform developed in this study was fabricated as shown in FIG. 1A. Briefly, a glass substrate deposited with chromium adhesion layers, and gold electrodes was treated with piranha solution and then organosilanized with 3-bromopropyltrichlorosilane (BPTS) thereby functionalizing the surface with alkyl bromide groups. Organosilanization was followed by masking the glass substrate with a homemade transparency film mask to expose only the spaces between electrode pairs and then spray-coating with a suspension in DMF of SWCNTs and P4VP with pyridyl groups available for quaternization with the glass substrate now bearing alkyl bromide groups. After thermal annealing, the device was treated in an ultrasonic bath to remove material that was not immobilized onto the glass substrate. It was then soaked in a saturated solution of a metal salt and treated again in an ultrasonic bath to remove material that was not incorporated onto the device. Sensor 10 includes a substrate 20 (e.g., a resonant circuit) and a conductive region 30 in electrical communication with at least two electrodes (40,42) on the substrate. Conductive region 30 includes a composite 45 that includes a carbon nanotube 50 associated with a polymer 55 covalently linked to a surface 60 of the substrate via a linker 65.

Figure 1C:
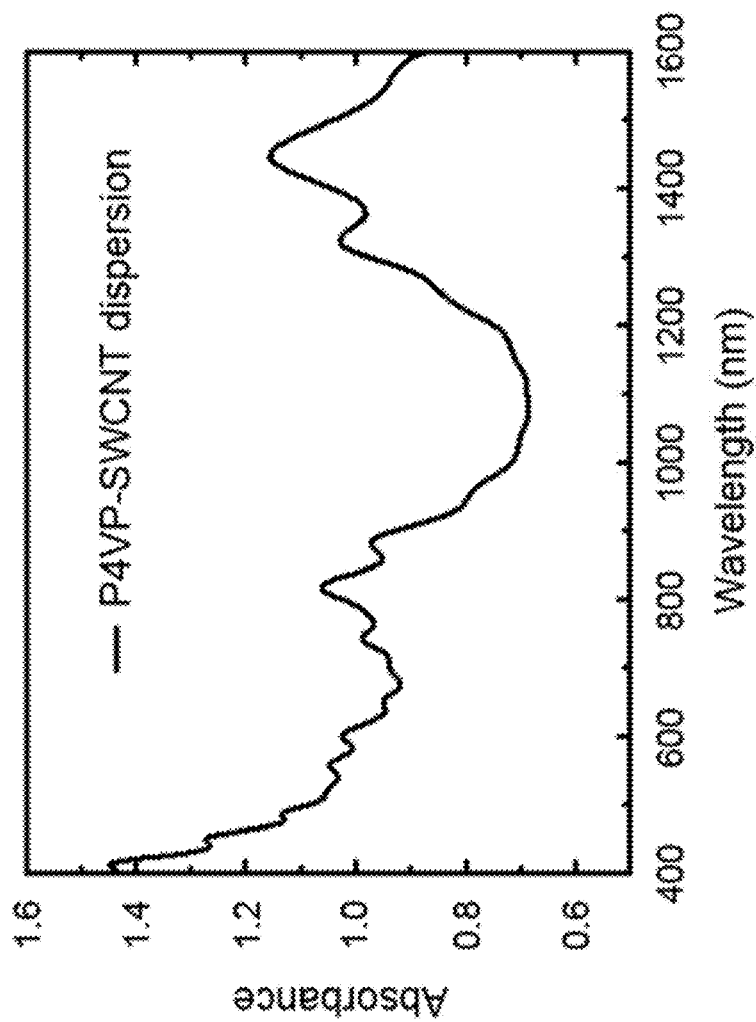
FIG. 1C shows UV-Vis-NIR absorption spectrum of the diluted P4VP-SWCNT dispersion (1:3 dilution in DMF).
Figure 1B:
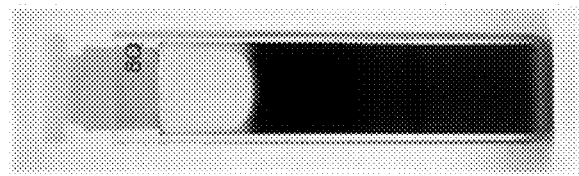
FIG. 1B shows a photograph of the P4VP-SWCNT dispersion in DMF.
Figure 7:
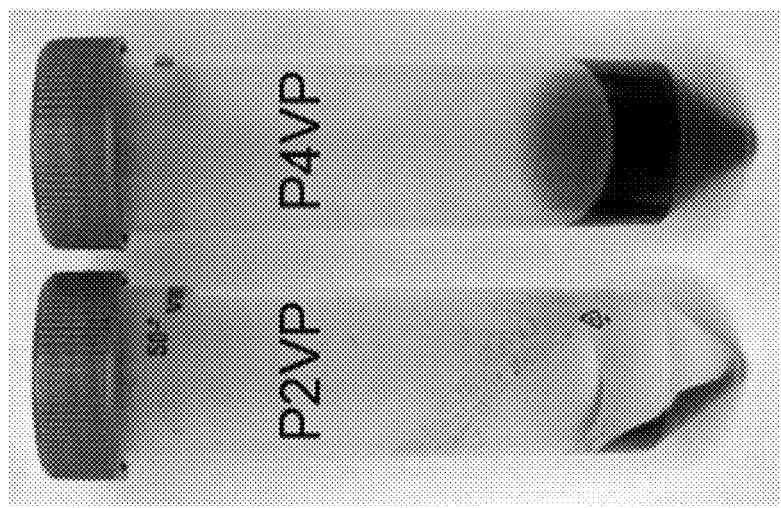
FIG. 7 shows photographs of P2VP-SWCNT (left) and P4VP-SWCNT (right) dispersions in DMF.
Figure 8A:
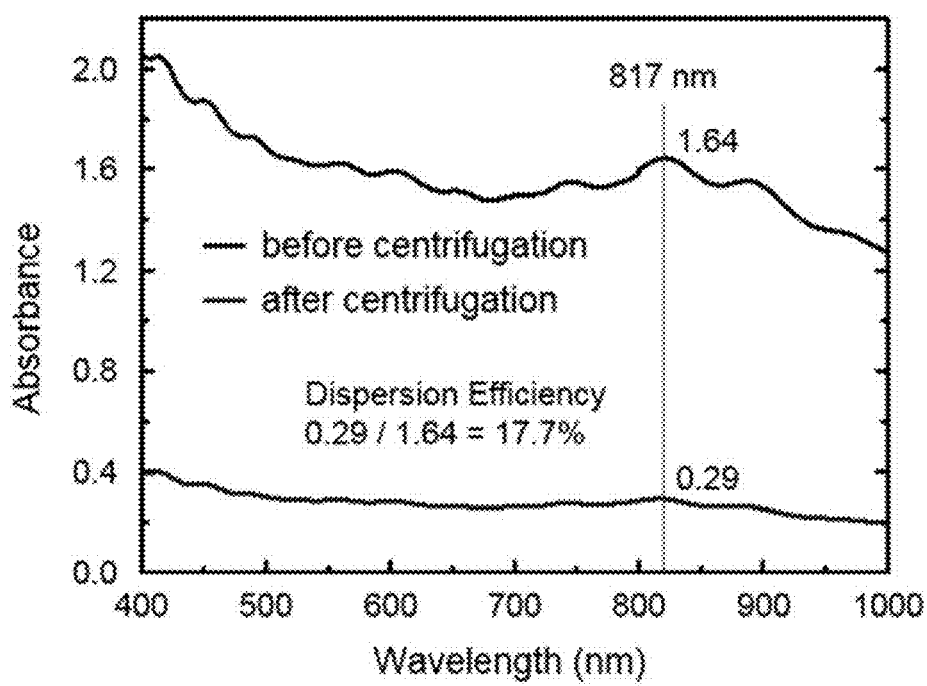
FIG. 8A shows UV-Vis-NIR spectra of a diluted P4VP-SWCNT dispersion before and after centrifugation (1:10 dilution in DMF).
Figure 8B:
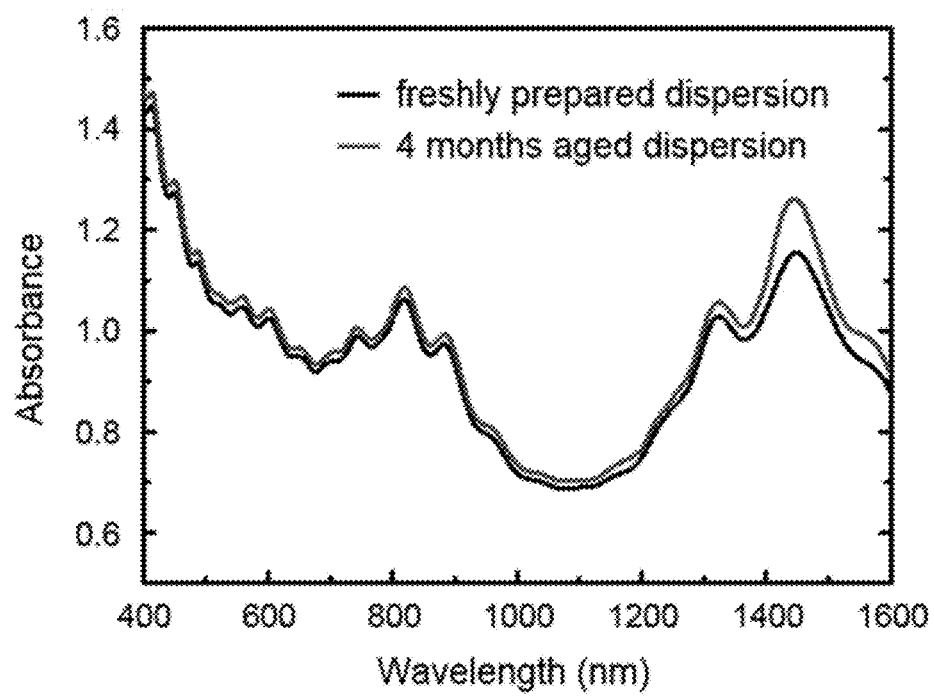
FIG. 8B shows UV-Vis-NIR spectra of a diluted P4VP-SWCNT dispersion measured for freshly prepared dispersion and after standing on the benchtop for 4 months (1:3 dilution in DMF).

In order to fabricate a sensor device described above, a highly dispersed P4VP-SWCNT dispersion is required. A typical P4VP-SWCNT dispersion was prepared using the following procedure. Purified SWCNTs obtained from a commercial source (Nano-C, Inc.) were added to a DMF solution containing P4VP (50 mg of P4VP, 5 mg of SWCNT in 10 mL of DMF). The mixture was sonicated for 1 h in an ultrasonic bath chilled with ice and then allowed to reach room temperature. Subsequently, the suspension was centrifuged for 30 min at 15,000 g and allowed to stand overnight undisturbed. Depicted in FIG. 1B is a photograph of the isolated supernatant from the centrifuged suspension, showing well-dispersed P4VP-SWCNT composites in DMF with high concentration. There were no visible aggregates present in the dispersion. The stable dispersion may be attributed to both a donor-acceptor interaction and π-π interaction between the electron-rich pyridyl groups of P4VP and SWCNT sidewalls. Poly(2-vinylpyridine) (P2VP), however, did not form a stable suspension of SWCNTs in the same condition by visual inspection, which might be due to the unfavorable N position of the pyridyl substitution to interact with SWCNTs (FIG. 7). In FIG. 1C shows the UV-Vis-NIR spectrum of the diluted P4VP-SWCNT dispersion in DMF. Since the P4VP does not absorb light in the measured wavelength range, it is evident that the SWCNTs are responsible for the absorption peaks in the observed range. In the absorption spectrum, the absorption bands in the wavelength regions from 800 nm to 1600 nm and 550 to 900 nm represent the $E_{11}$ and $E_{22}$ van Hove singularity transitions of semiconducting SWCNTs, respectively (see, O'Connell, M. J.; Bachilo, S. M.; Huffman, C. B.; Moore, V. C.; Strano, M. S.; Haroz, E. H.; Rialon, K. L.; Boul, P. J.; Noon, W. H.; Kittrell, C.; Ma, J.; Hauge, R. H.; Weisman, R. B.; Smalley, R. E. *Science* 2002, 297 (5581), 593-596, which is incorporated by reference in its entirety), indicating that the P4VP-SWCNT dispersion is enriched with semiconducting tubes. The dispersion efficiency calculated from the ratio of the absorbance at a fixed wavelength of 817 nm before and after centrifugation (see Backes, C.; Schmidt, C. D.; Hauke, F.; Böttcher, C.; Hirsch, A. *J. Am. Chem. Soc.* 2009, 131 (6), 2172-2184, which is incorporated by reference in its entirety) is about 18% with a final SWCNT concentration of about 89 μg/mL (FIG. 8A). In addition, the resulting P4VP-SWCNT dispersion was found to be stable after prolonged storage (>4 months) on the benchtop at room temperature without any observable precipitation. No noticeable broadening and red-shift of absorption peaks in the UV-Vis-NIR spectrum were observed, indicating that the aggregated P4VP-SWCNT composites were not generated (FIG. 8B). See, O'Connell, M. J.; Bachilo, S. M.; Huffman, C. B.; Moore, V. C.; Strano, M. S.; Haroz, E. H.; Rialon, K. L.; Boul, P. J.; Noon, W. H.; Kittrell, C.; Ma, J.; Hauge, R. H.; Weisman, R. B.; Smalley, R. E. Science 2002, 297 (5581), 593-596, which is incorporated by reference in its entirety.

Figure 9A:
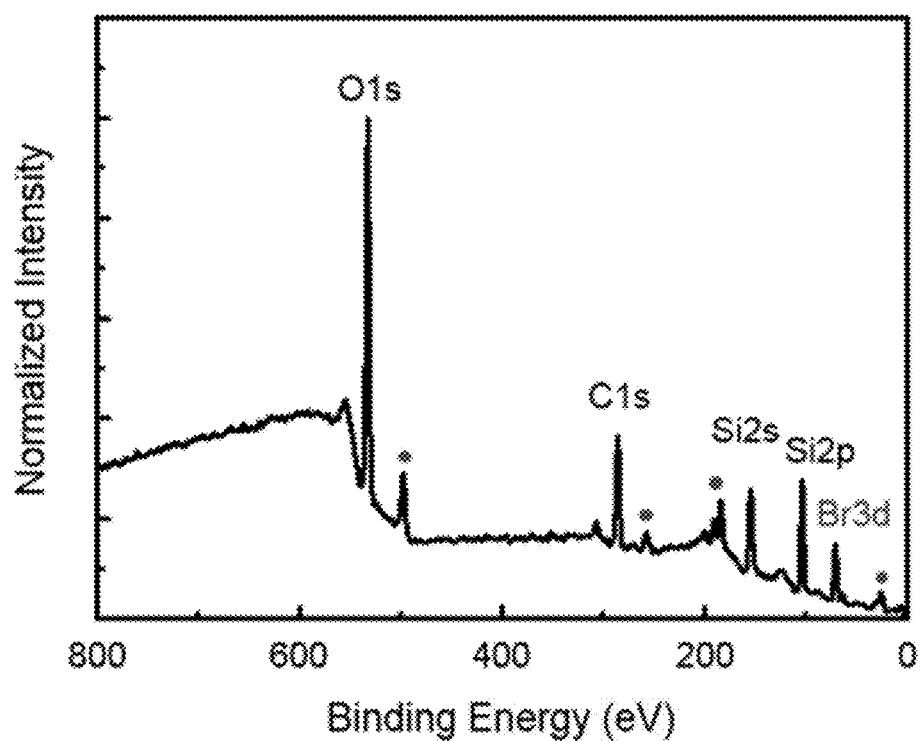
FIG. 9A shows XPS spectrum of a surface functionalized glass substrate after BPTS treatment.
Figure 9B:
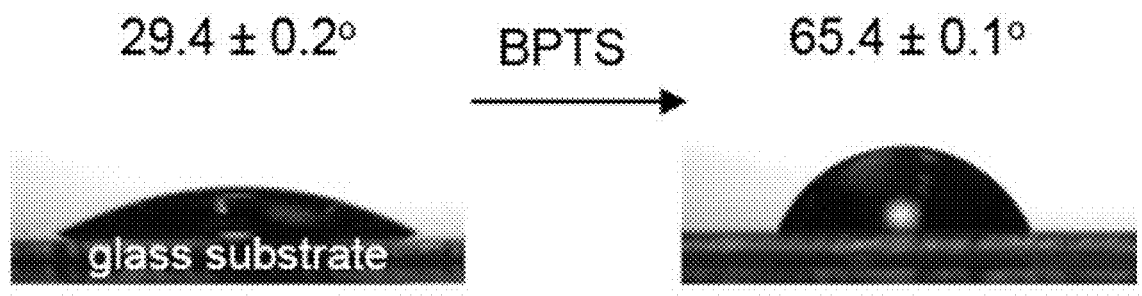
FIG. 9B shows Contact angle for a glass substrate before and after BPTS treatment.
Figure 10A:
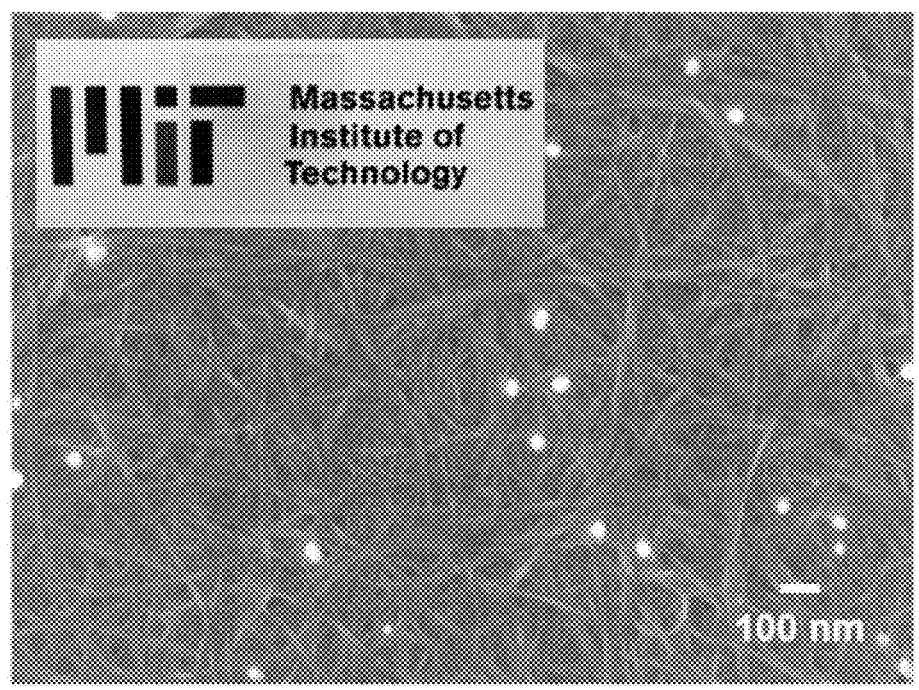
FIG. 10A shows SEM image of the immobilized P4VP-SWCNT composites on a surface-functionalized glass substrate after sonication and a photograph of the spray-coated P4VP-SWCNT composites on a cover slip after sonication (inset).

To demonstrate the applicability of the P4VP-SWCNT dispersion for spray-coating to immobilize the composites onto the glass substrate, surface-functionalized glass substrates was prepared via organosilanization. For this purpose, alkyl bromide groups were introduced to the surface of piranha-treated glass substrates by immersing the substrates in a dry toluene solution of BPTS followed by washing. The reaction of BPTS onto the glass substrate was confirmed by XPS analysis and contact angle measurements. The presence of a Br 3d peak in XPS spectrum and the increase in water contact angle after organosilanization verify the surface-functionalized substrate with BPTS (FIGS. 9A and 9B). In FIG. 9A, the composite includes O1s: 33.0%, C1s: 27.6%, Si2p: 32.6%, Br3d: 4.7%, Cl2p: 1.1%, and Na1s: 0.9% and the dots display distinctive peaks for Br. The P4VP-SWCNT dispersion of 400 µL was then loaded into an airbrush and manually spray-coated on the substrate placed on a 130° C. hot plate under $N_2$ carrier gas of 2 bar pressure. After the spraying process, the resulting substrate was thermal annealed at 130° C. to enable quaternization between the alkyl bromide groups on the substrate and the pyridyl groups of the P4VP-SWCNT composites, followed by sonication in dichloromethane (DCM) for 1 min to remove excess polymers and unimmobilized P4VP-SWCNT composites. The degree of immobilization can be seen from the FESEM image in FIG. 10A, which indicates that a significant amount of P4VP-SWCNT composites remained on the substrate even after the sonication step. Random networks of the P4VP-SWCNT composites were formed by the rapid solvent evaporation while spraying. The removal of unimmobilized materials makes the film transparent with an increase in transmittance from 44 to 89% at 550 nm (FIG. 10A, inset). In addition, the sheet resistance of the film prepared with 400 µL of dispersion deposited over 0.8 $cm^2$ decreased from ~19 to ~2 kΩ/sq after sonication (FIG. 10B) due to the removal of residual insulating P4VPs that can reduce the hole carrier density of SWCNTs through the electron doping effect from the Lewis basic pyridyl groups.

Many metal and inorganic oxide surfaces can be activated by dehydration or reaction with electrophilic reagents such as thionyl chloride or triflic anhydride. These methods can create vacancies and/or reactive sites for binding of Lewis bases, such as the nitrogen atoms of P4VP. In the case of thionyl chloride or triflic anhydride, the treatment substitutes surface hydroxyls or other groups for chloride and triflate leaving groups, respectively, that can be displaced. Alternatively, organic polymers containing surface —OH groups or paper can be activated to react with P4VP by the same methods.

Figure 2A:
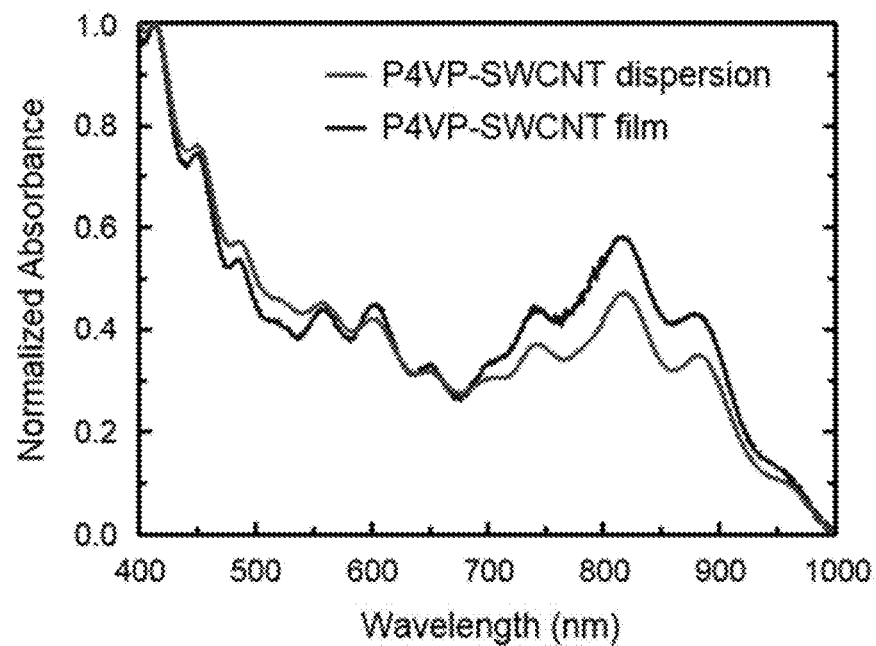
FIG. 2A shows normalized UV-Vis absorption spectra of the P4VP-SWCNT dispersion and the spray-coated composites on glass substrate.
Figure 2B:
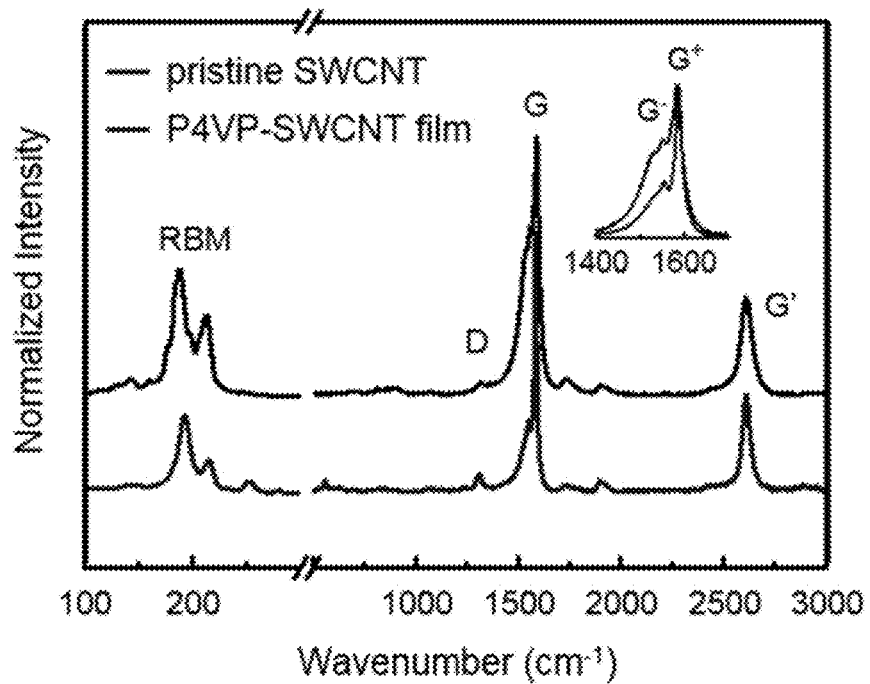
FIG. 2B shows Raman spectra of pristine SWCNT and P4VP-SWCNT film (excitation at 633 nm).

FIG. 2A shows the normalized UV-Vis absorption spectra of the P4VP-SWCNT dispersion and the spray-coated composite film on the glass substrate. The spectra indicate that the absorption peak positions of the immobilized SWCNT film were barely shifted compared to those of the P4VP-SWCNT dispersion, which suggests that the electronic structures of SWCNTs were not significantly affected by the quaternization. In FIG. 2B, Raman spectroscopy was used to further characterize the electronic types of P4VP-SWCNT composites. The spectra shown here were measured using an excitation wavelength of 633 nm and normalized to the G band at 1584 $cm^{-1}$. The line shape of the G band, a tangential mode of SWCNTs comprised of superimposed $G^-$ and $G^+$ peaks, can be used for discriminating between semiconducting and metallic nanotubes. Although the $G^-$ band in the P4VP-SWCNT spectrum becomes narrower with a decrease in intensity, which indicates some of the metallic tubes can be removed from the as-received pristine SWCNTs by P4VP, the composite still contains both metallic and semiconducting tubes. This observation is also consistent with the absorptions assigned to the metallic and semiconducting bands in FIG. 1C. See, Jorio, A.; Pimenta, M. A.; Filho, A. G. S.; Saito, R.; Dresselhaus, G.; Dresselhaus, M. S. New J. Phys. 2003, 5 (1), 139, which is incorporated by reference in its entirety. There is a small increase in the D/G band intensity ratio, which reflects the degree of defects on the SWCNT sidewalls, from 0.04 in the pristine SWCNTs to 0.06 in the P4VP-SWCNT film, which might be caused by the sonication step. In addition, SWCNTs have a distinct radial breathing mode (RBM) between 120 and 250 $cm^-$, where the peak frequencies are inversely related to the diameters of SWCNTs. See, Jorio, A.; Pimenta, M. A.; Filho, A. G. S.; Saito, R.; Dresselhaus, G.; Dresselhaus, M. S. New J. Phys. 2003, 5 (1), 139, which is incorporated by reference in its entirety. The two major peak shifts were observed from 186 and 212 $cm^{-1}$ with broad bandwidths in the pristine SWCNT to narrower bands at 192 and 215 $cm^{-1}$ in the P4VP-SWCNT film, suggesting that P4VP can mainly disperse SWCNTs with diameters of about 1.29 and 1.14 nm, respectively.

Figure 2C:
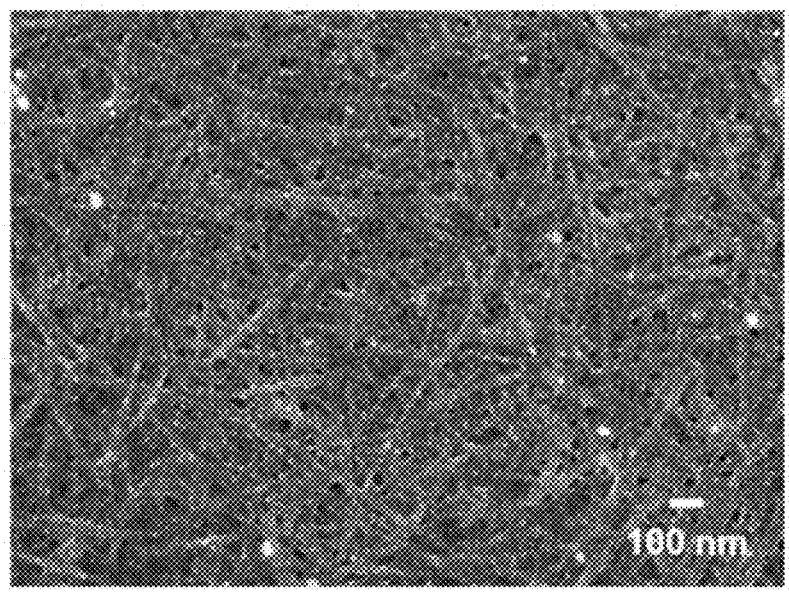
FIG. 2C shows SEM image of AgNP-incorporated P4VP-SWCNT composites immobilized on glass substrate.
Figure 11:
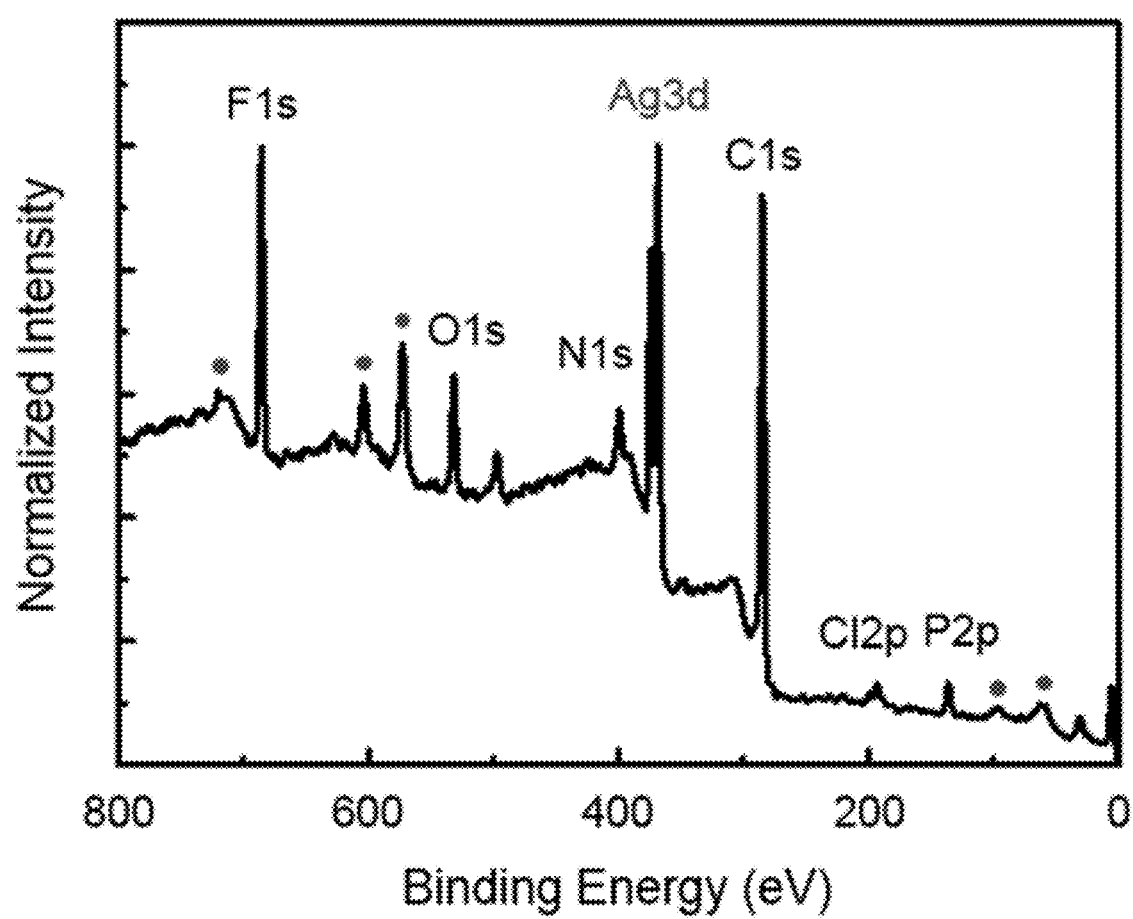
FIG. 11 shows XPS spectrum of the Ag$^0$-P4VP-SWCNT composites immobilized on glass substrate.

In the next phase of the investigation, to confer further selectivity or sensitivity to the device, metal nanoparticles or ions were incorporated to the residual pyridyl groups in the P4VP that are not consumed in the quaternization reaction. As a model system for this hypothesis, silver nanoparticles (AgNPs) were chosen as a metal sensitizer for ammonia detection, which have been shown to enhance the sensing performance of CNT-based chemiresistive sensors for ammonia. See, Cannilla, C.; Bonura, G.; Frusteri, F.; Spadaro, D.; Trocino, S.; Neri, G. J. Mater. Chem. C 2014, 2 (29), 5778-5786, and Cui, S.; Pu, H.; Lu, G.; Wen, Z.; Mattson, E. C.; Hirschmugl, C.; Gajdardziska-Josifovska, M.; Weinert, M.; Chen, J. ACS Appl. Mater. Interfaces 2012, 4 (9), 4898-4904, each of which is incorporated by reference in its entirety. To synthesize AgNPs on the surface of P4VP-SWCNT composites, the composite films immobilized on the glass substrate were soaked in 10 mg (40 µmol) of $AgPF_6$ solution in 2 mL of tetrahydrofuran overnight under dark condition, followed by sonication to remove unbound silver ions. Upon irradiation with 254 nm UV light from a handheld UV lamp, $Ag^0$-P4VP-SWCNT composites were prepared by photoreduction of silver ions. A SEM image of the $Ag^0$-P4VP-SWCNT composite film in FIG. 2C shows bright nanoparticles of metallic silver on the surface of the composites, indicating that AgNPs are strongly bound to the composites even after sonication. The result of XPS analysis of the $Ag^0$-P4VP-SWCNT composite film, showing the Ag 3d peak, is consistent with the SEM observation (FIG. 11). In FIG. 11, the composite includes O1s 5.9%, C1s: 67.8%, N1s: 4.6%, F1s: 9.7%, Ag3d: 5.3%, P2p: 4.1%, Cl2p: 2.1%, and Na1s: 0.5%, and the dots display distinctive peaks for silver.

Figure 2D:
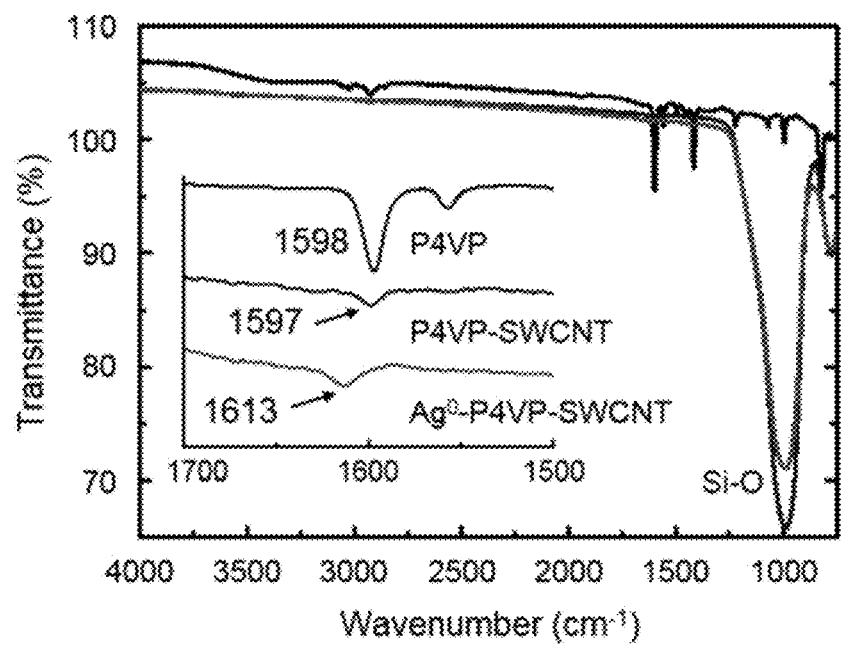
FIG. 2D shows ATR-FTIR spectra of P4VP polymer powder, P4VP-SWCNT and $Ag^0$-P4VP-SWCNT composites on glass substrates.

The FTIR spectra in FIG. 2D show the shift of the stretching vibration band for pyridine ring from 1597 to 1613 $cm^{-1}$ upon AgNP incorporation. This peak shift clearly suggests that the coordination of AgNPs generated at the pyridyl ligand site in the P4VP-SWCNT composites.

Figure 3A:
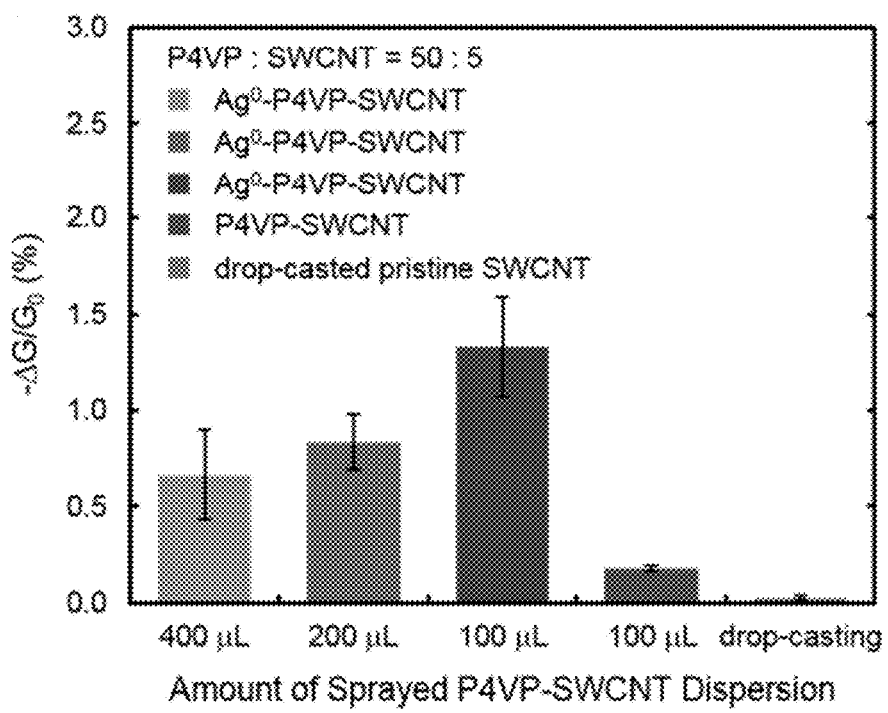
FIG. 3A shows chemiresistive responses averaged across triplicate devices fabricated with different amount of P4VP-SWCNT dispersion (P4VP:SWCNT=50:5) spray-coated on glass substrates before and after AgNP incorporation, and fabricated with drop-casted pristine SWCNTs.
Figure 10B:
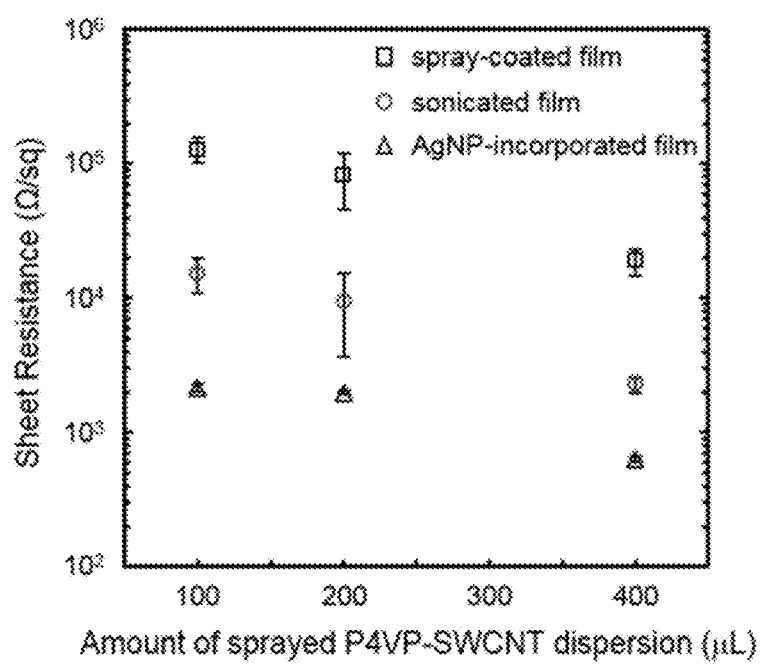
FIG. 10B shows sheet resistance as a function of amount of sprayed P4VP-SWCNT dispersion for the P4VP-SWCNT composite films.
Figure 12A:
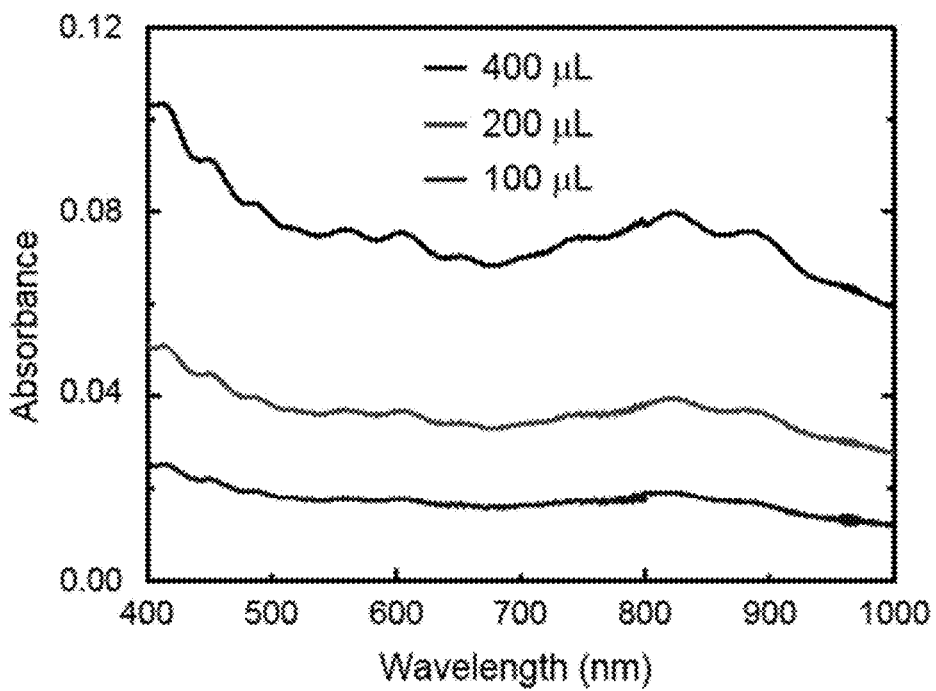
FIG. 12A shows UV-Vis spectra of spray-coated P4VP-SWCNT composites on a cover slip with a different amount of P4VP-SWCNT dispersion (400, 200 and 100 µL).
Figure 12B:
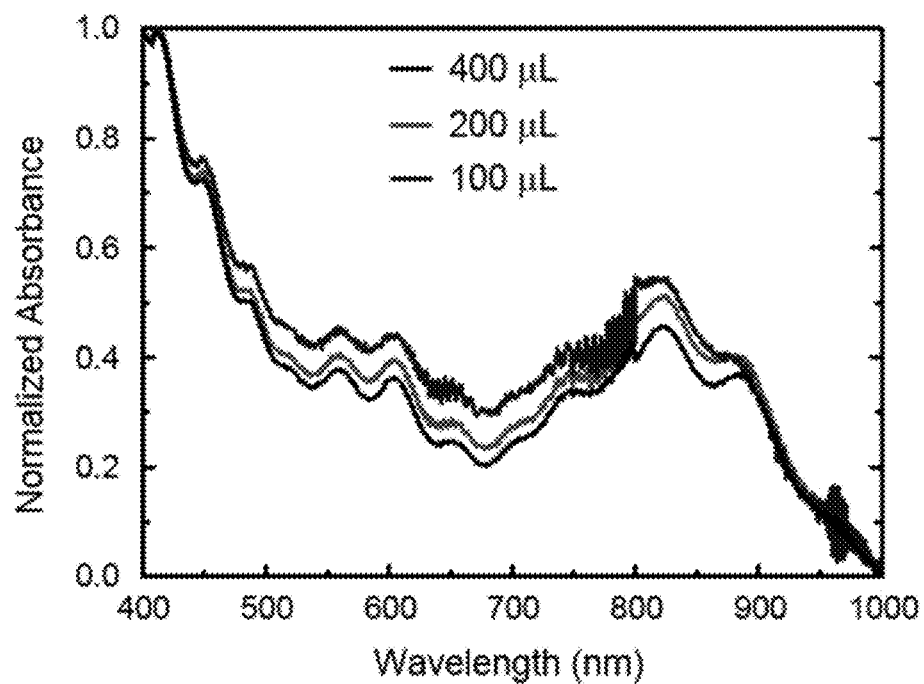
FIG. 12B shows the normalized spectra of FIG. 12A.
Figure 13:
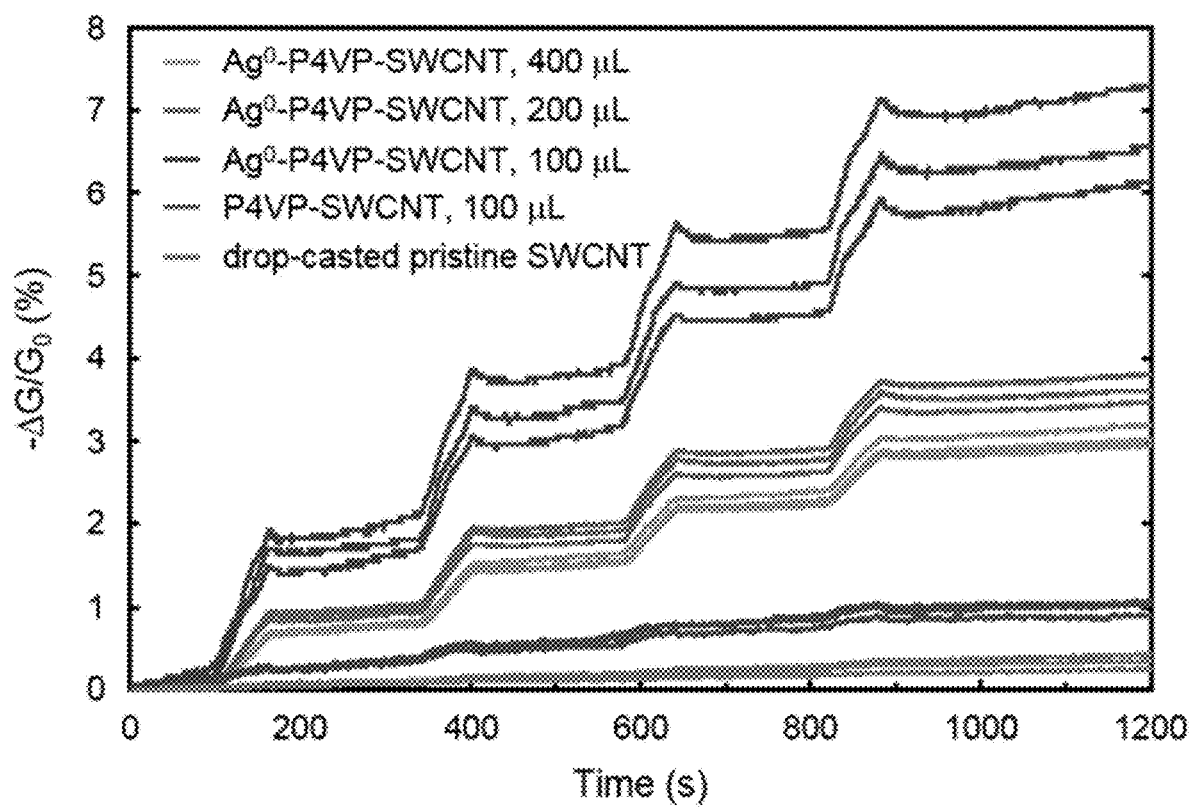
FIG. 13 shows chemiresistive traces of triplicate devices fabricated with different amount of P4VP-SWCNT dispersion (P4VP:SWCNT=50:5) spray-coated on glass substrates before and after AgNP incorporation, and fabricated with drop-casted pristine SWCNTs in response to one 60 s exposure to 20 ppm of NH$_3$ in N$_2$ at room temperature.

To explore the potential of the metal-incorporated P4VP-SWCNT composite-based platform as a high-performance chemiresistive sensor, devices were fabricated by changing parameters such as the thickness of the composite film on the device and the ratio of P4VP and SWCNT in the composite. First, the effect of the quantity of P4VP-SWCNT dispersion deposited onto the glass substrate was examined as a measure of film thickness in optimizing the system. It was hypothesized that reducing film thickness by applying less material would improve sensitivity to analytes based on a surface area argument; with a thinner film thickness, a larger proportion of the material would be available to interact with the analyte vapor. UV-Vis spectra of the spray-coated composite films in FIG. 12A show that the absorption of the immobilized composites decreases with decreasing the quantity of the sprayed dispersion, which suggests the difference in thickness of the deposited composites. As expected, the normalized absorbance spectra of the composite films show similar peaks of SWCNTs (FIG. 12B). Also, the sheet resistance of the films decreases upon AgNP incorporation, which can be attributed to the recovered hole carrier density of SWCNT in response to the binding of AgNP to the basic pyridyl group (FIG. 10B). Then, the hypothesis was tested with a P4VP-SWCNT device decorated with AgNPs used to detect 20 ppm of ammonia gas in nitrogen under 60 s exposure at room temperature. Indeed, when using a dispersion comprised of 50 mg P4VP and 5 mg SWCNT in 10 mL DMF, depositing only 100 μL of solution to make two device channels resulted in more sensitive devices than depositing 200 μL, which in turn performed better than depositing 400 μL (FIG. 3A). It should be noted that the devices fabricated only with the spray-coated P4VP-SWCNT composites and with drop-casted pristine SWCNTs showed only small or negligible responses to the same concentration of ammonia. The corresponding chemiresistive traces of triplicate devices fabricated with different amount of P4VP-SWCNT dispersion are shown in FIG. 13.

Figure 3B:
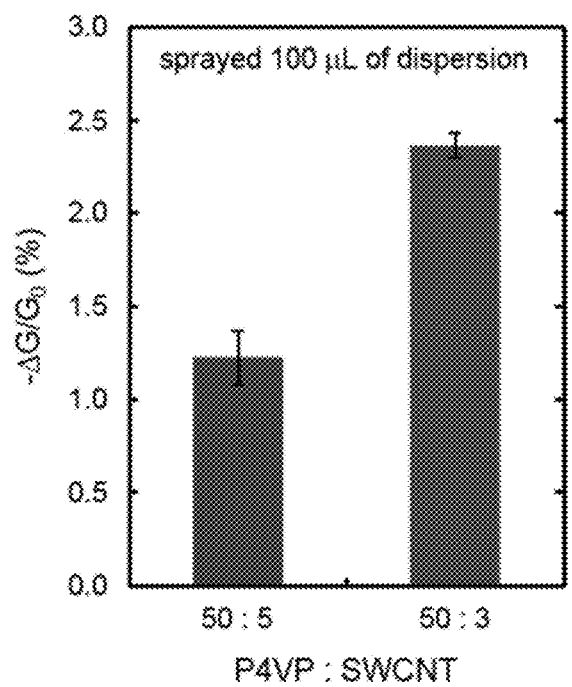
FIG. 3B shows chemiresistive responses averaged across triplicate devices fabricated with P4VP-SWCNT dispersions with different ratios of P4VP: SWCNT (50:5 and 50:3) in response to one 60 s exposure to 20 ppm of $NH_3$ in $N_2$ at room temperature.
Figure 14A:
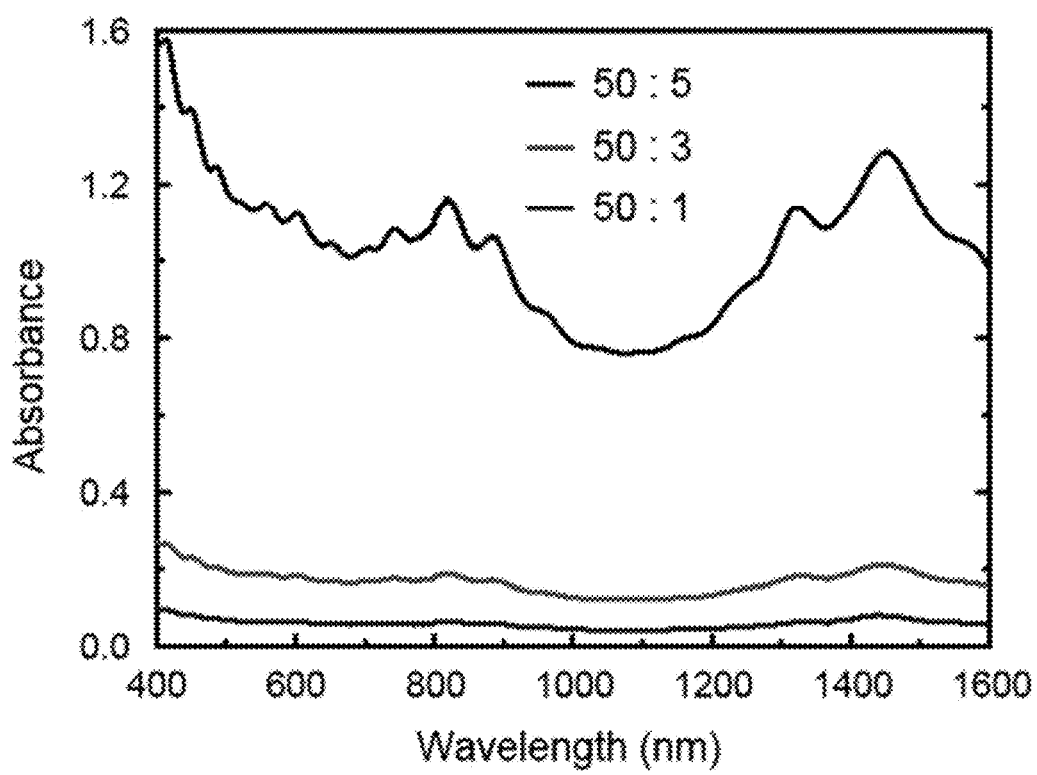
FIG. 14A shows UV-Vis-NIR spectra of diluted P4VP-SWCNT dispersions with different ratios of P4VP:SWCNT (50:5, 50:3 and 50:1) in DMF.
Figure 14B:
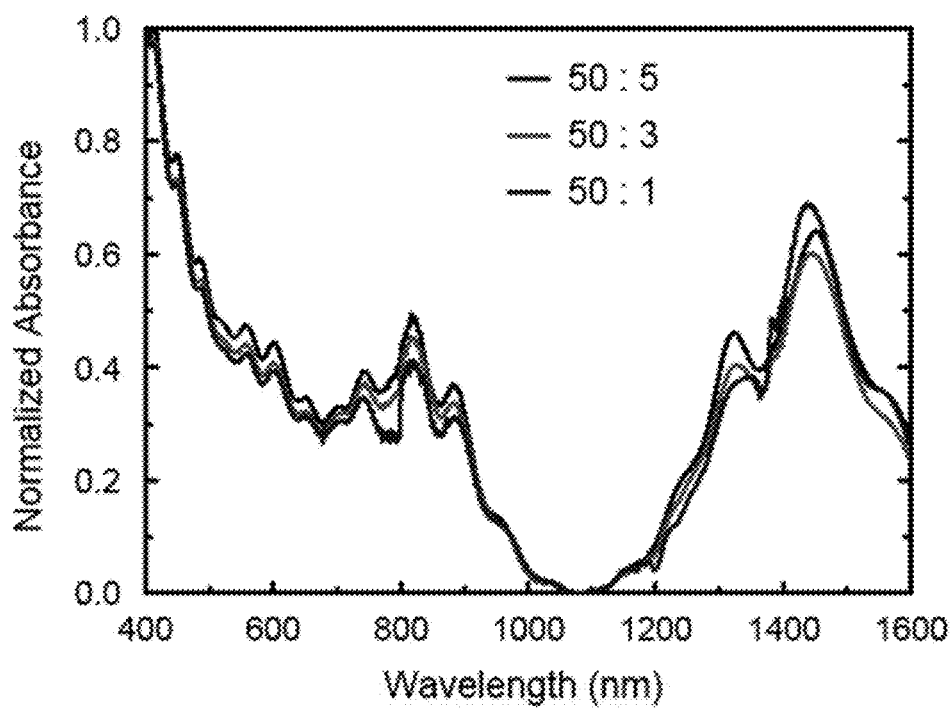
FIG. 14B shows the normalized spectra of FIG. 14A.
Figure 15A:
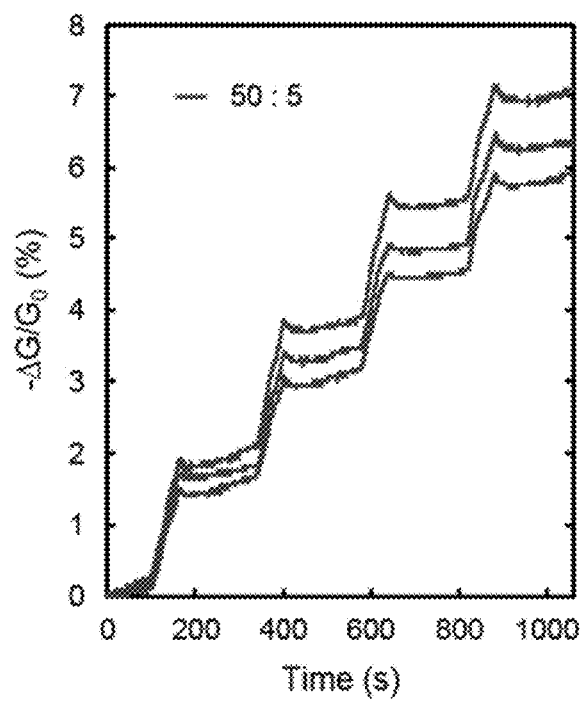
FIGS. 15A and 15B show chemiresistive traces of triplicate Ag$^0$-P4VP-SWCNT devices fabricated with P4VP-SWCNT dispersions with different ratios of P4VP:SWCNT=50:5 (FIG. 15A) and 50:3 (FIG. 15B) in response to one 60 s exposure to 20 ppm of NH$_3$ in N$_2$ at room temperature.
Figure 15B:
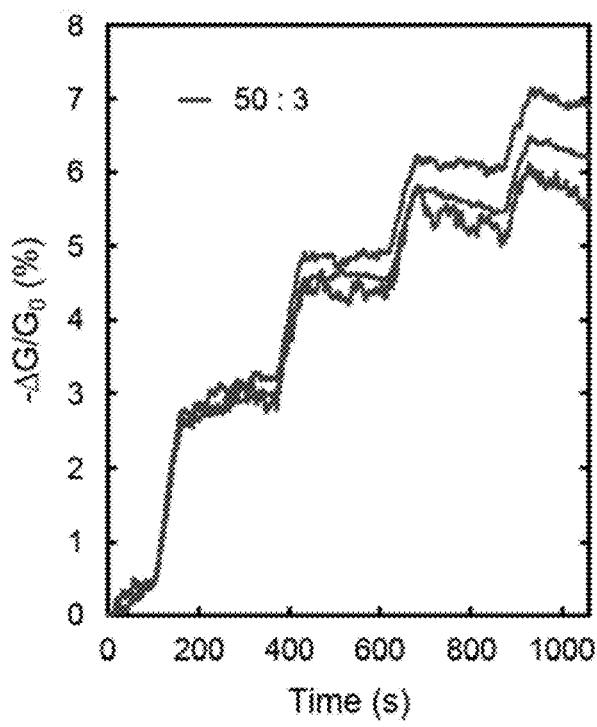

Another important parameter, besides the composite film thickness, is the ratio of P4VP and SWCNT in the composite on the device. It was hypothesized that using a smaller concentration of SWCNTs would lead to fewer conductive pathways in the random SWCNT network such that disruptions in connectivity from the analyte would more readily drop SWCNT connectivity below the percolation threshold, thereby inducing a greater decrease in resistance. In order to demonstrate the effect of SWCNT concentration in the composite, P4VP-SWCNT dispersions were prepared from different SWCNT concentrations: 5 mg, 3 mg, and 1 mg in 10 mL DMF. The amount of P4VP was held constant at 50 mg in all tested dispersion. As shown in FIG. 14A, though the absorbance of the spectra decreased with decreasing SWCNT contents at a given P4VP concentration, the normalized spectra show all dispersions contain SWCNTs with the identical electronic structures (FIG. 14B). In FIG. 3B, dropping the concentration of SWCNTs to 3 mg in 10 mL DMF did in fact result in more sensitive devices upon exposure to 20 ppm of ammonia in nitrogen for 60 s. The corresponding sensing traces are shown in FIG. 15. Further decreases of SWCNT content to 1 mg, however, resulted in devices that were not sufficiently conductive enough to perform chemiresistive measurements.

Figure 4A:
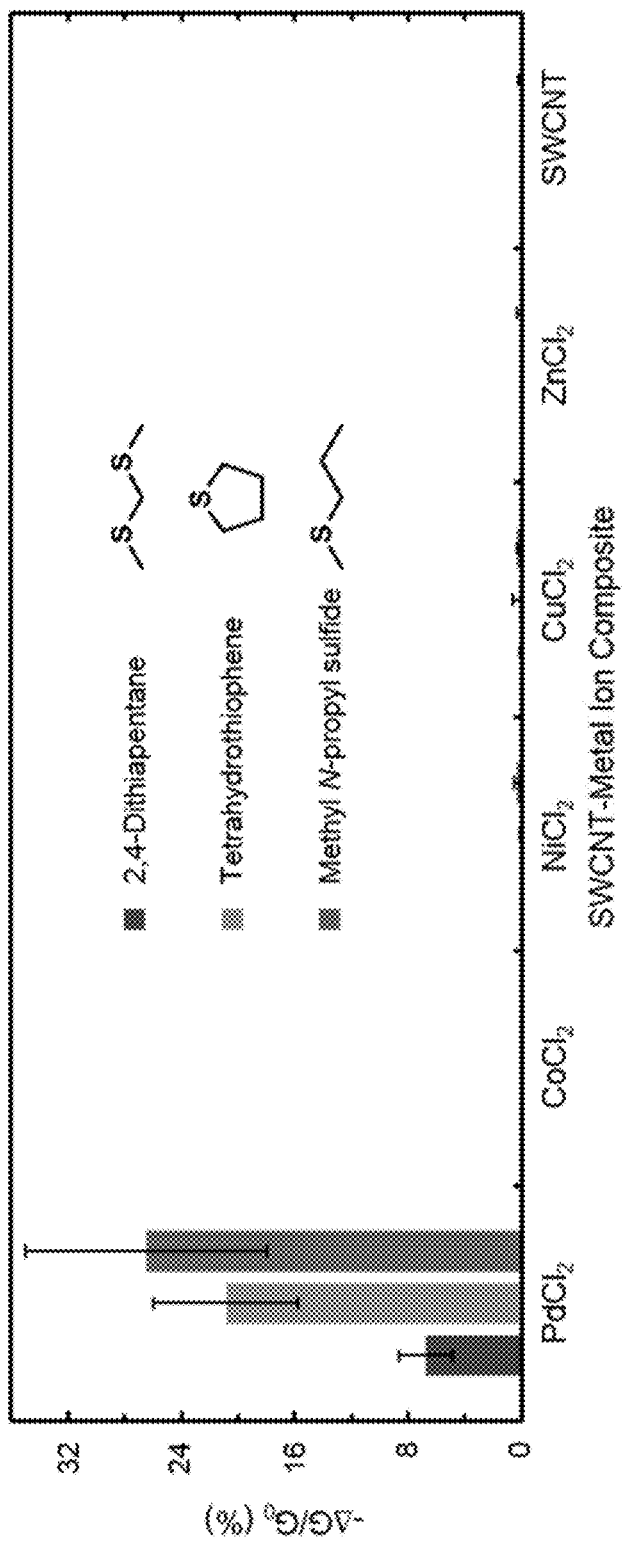
FIG. 4A shows average conductance change of four chemiresistive detectors fabricated from composites of SWCNTs with various divalent metal salts in response to 60 s exposures to 40 ppm of various thioether vapors diluted in $N_2$.

After optimizing the P4VP-SWCNT platform using ammonia as a model analyte, the platform was tuned toward the chemiresistive detection of thioethers as a specific class of VOCs. Per HSAB theory, it was hypothesized that using a soft metal (soft acid) such as $Pd^{2+}$ in a SWCNT-based chemiresistive detector would lead to specificity for soft Lewis bases such as sulfur-containing organic molecules (e.g., thioethers). To investigate this hypothesis, simple chemiresistive devices were fabricated from composites of SWCNTs with various divalent metal ions as their chloride salts, $Pd^{2+}$ (a soft Lewis acid) and the divalent metal ions $Co^{2+}$ through $Zn^{2+}$ (intermediate to hard Lewis acids). See FIG. 21 for examples of soft, intermediate, and hard Lewis acids. These devices were tested for their chemiresistive responses to vapors of the three representative thioethers chosen for this study (60 s exposures of 40 ppm diluted in nitrogen gas) and found that only the devices fabricated with $PdCl_2$ gave significant chemiresistive responses as large decreases in conductance (FIG. 4A). These results suggested to us that $PdCl_2$ in the P4VP-SWCNT chemiresistor platform would lead to detectors with good sensitivity to thioethers.

Figure 4B:
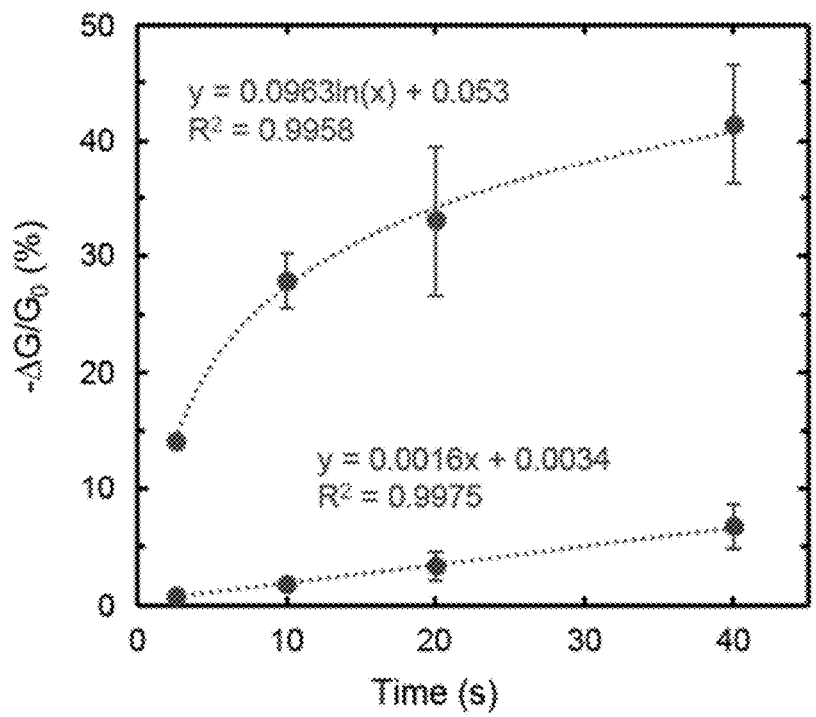
FIG. 4B shows chemiresistive responses averaged across quadruplicate trials of $Pd^{2+}$-P4VP-SWCNT devices and $PdCl_2$-SWCNT devices to 60 s exposures of varying concentrations of 2,4-dithiapentane vapor in air at room temperature.
Figure 4C:
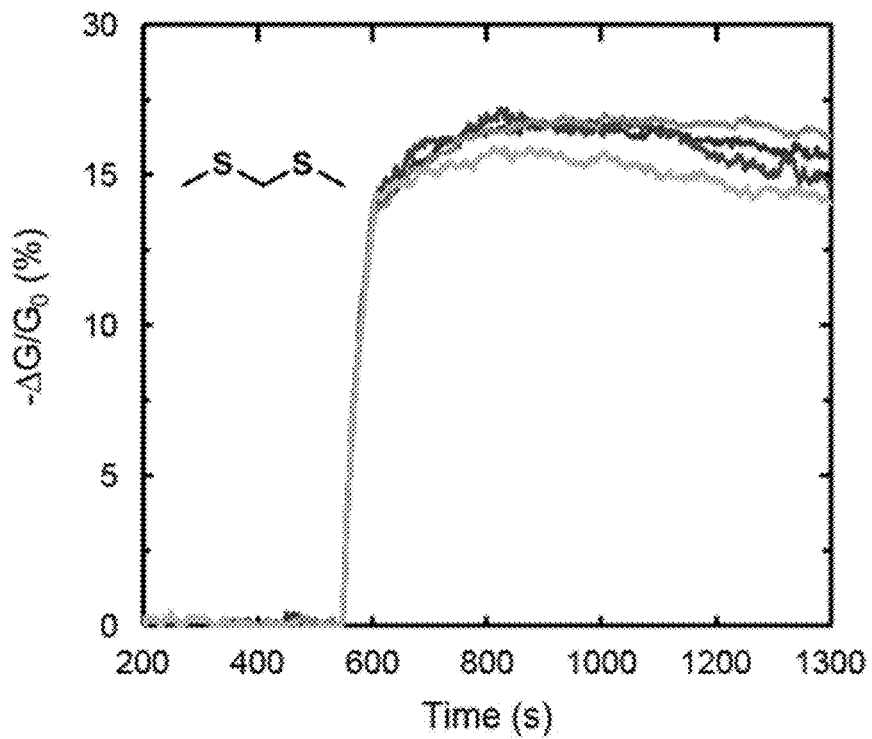
FIG. 4C shows chemiresistive traces of quadruplicate $Pd^{2+}$-P4VP-SWCNT devices in response to one 60 s exposure to 2,4-dithiapentane vapor of 2.5 ppm in air at room temperature.
Figure 5:
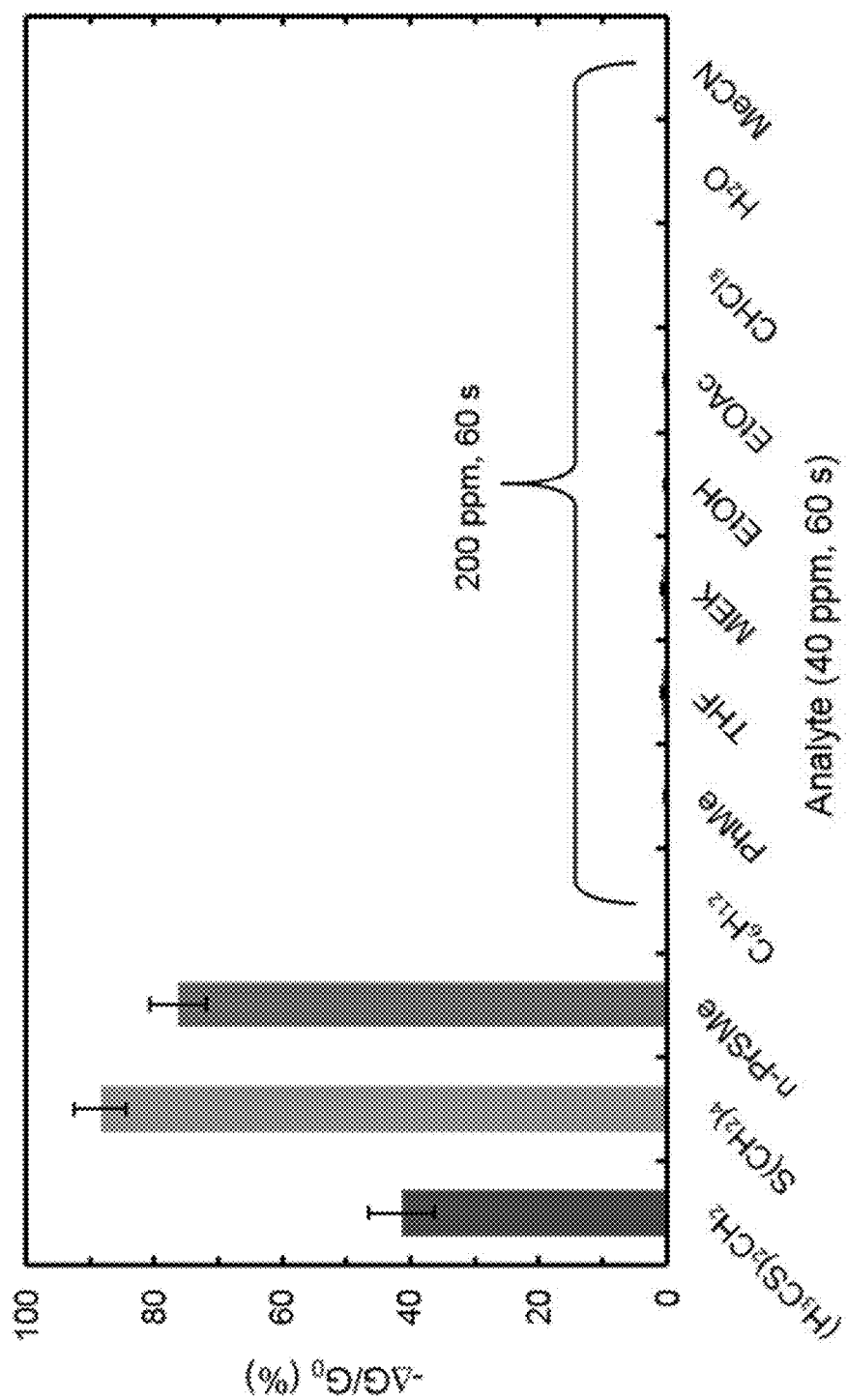
FIG. 5 shows chemiresistive responses averaged across triplicate $Pd^{2+}$-P4VP-SWCNT devices to 60 s exposure of VOCs representative of various functional group classes at a concentration of 40 ppm unless otherwise specified.
Figure 16A:
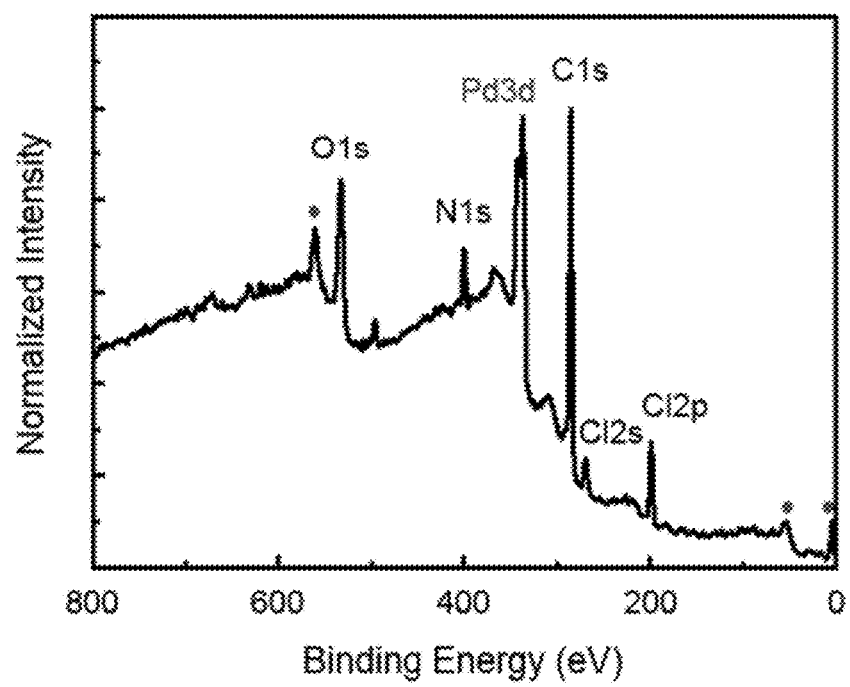
FIG. 16A shows XPS spectrum of the Pd$^{2+}$-P4VP-SWCNT composites immobilized on glass substrate.
Figure 16B:
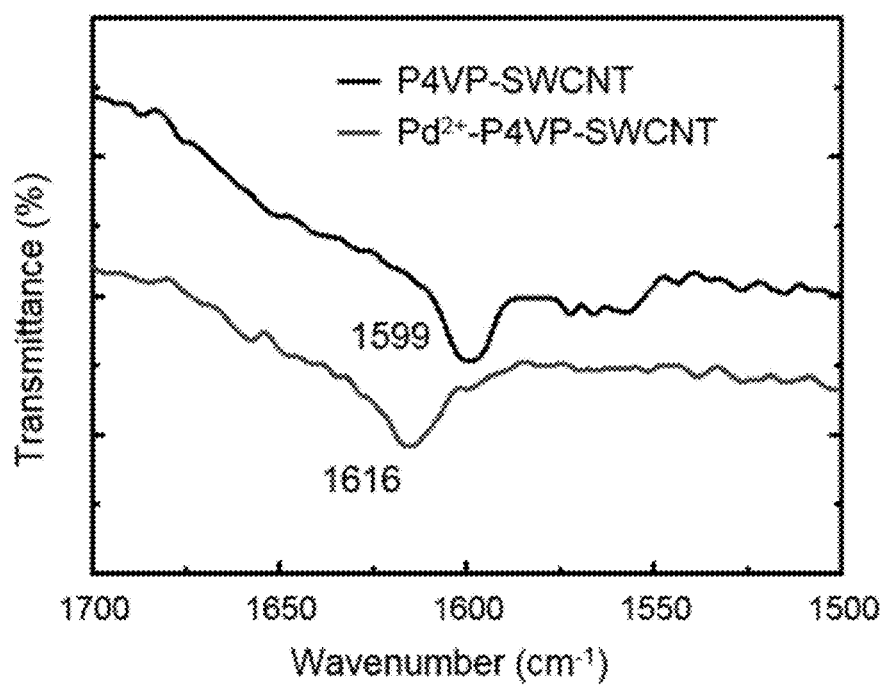
FIG. 16B shows ATR-FTIR spectra of P4VP-SWCNT and Pd$^{2+}$-P4VP-SWCNT composites on glass substrates.
Figure 17A:
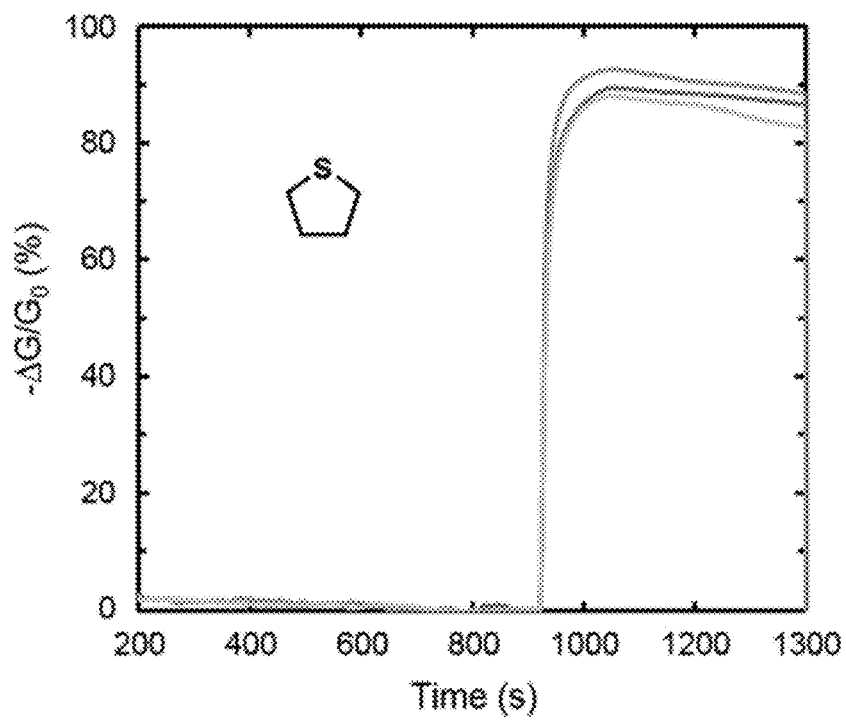
FIGS. 17A and 17B show chemiresistive traces of triplicate Pd$^{2+}$-P4VP-SWCNT devices in response to one 60 s exposure to 40 ppm tetrahydrothiophene (FIG. 17A) and methyl n-propyl sulfide (FIG. 17B) in air at room temperature.
Figure 17B:
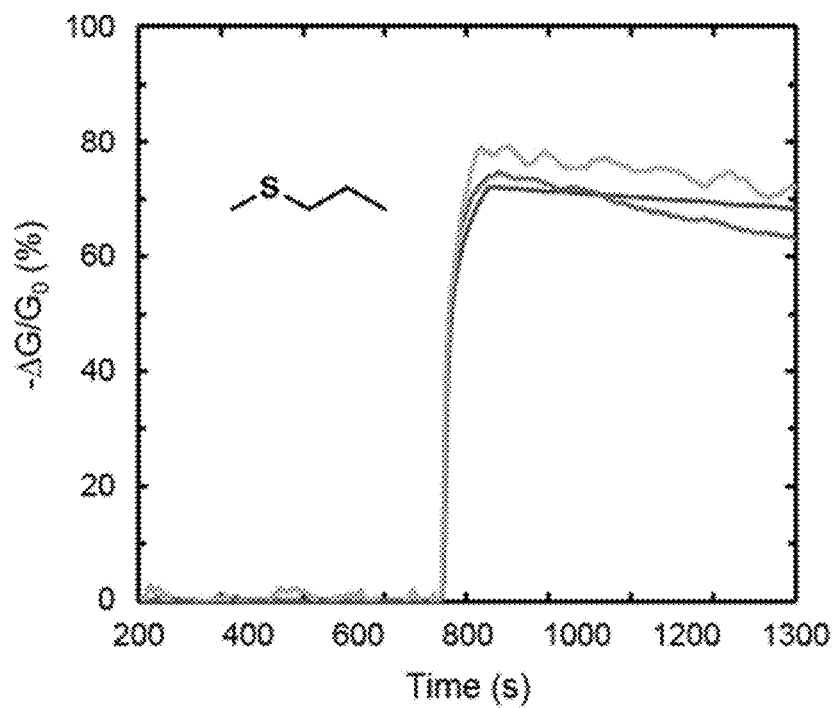

Such devices were fabricated from dispersions of 50 mg P4VP and 3 mg SWCNT in 10 mL DMF. After thermal annealing for quarternization and sonication in DCM with an ultrasonic bath to remove material that was not immobilized onto the substrate, the devices were submerged in saturated ethanolic solutions of $PdCl_2$ to incorporate $Pd^{2+}$ metal centers in the material as a soft metal cation. After sonication to remove unbound metal ions and subsequent drying, the $Pd^{2+}$-incorporated composite film was characterized by XPS analysis and FTIR spectroscopy. The presence of a Pd 3d peak in the XPS spectrum and the shift of pyridyl stretching band to the higher frequency region in the $Pd^{2+}$-P4VP-SWCNT film in the FTIR data clearly indicates the $Pd^{2+}$ incorporation at the pyridyl ligand site (FIGS. 16A and 16B). In FIGS. 16A and 16B, the composite includes O1s: 15.6%, C1s: 64.6%, N1s: 5.9%, Pd3d: 6.8%, Cl2p: 6.9% and Na1s: 0.2%, and the dots display distinctive peaks for Pd. In FIG. 4B, the resultant devices were tested for their responses to 60 s exposure of various concentration of 2,4-dithiapentane vapor diluted in air. These devices give strong and irreversible responses to 2,4-dithiapentane (FIG. 4C shows the conductance trace of quadruplicate devices responding to 2.5 ppm of 2,4-dithiapentane) with high sensitivity, and a calculated theoretical limit of detection (LOD) of 0.1 ppm. In the concentration range tested, the responses are modeled well as a logarithmic function of concentration. Analogous data for simple chemiresistors fabricated from a $PdCl_2$-SWCNT composite, without immobilized P4VP, which exhibit significantly lower sensitivity for 2,4-dithiapentane, are also presented in FIG. 4B for comparison. The improvement in sensitivity observed for the P4VP-SWCNT-based devices suggests that improving the dispersibility of the SWCNTs in solvent does indeed enhance chemiresistive responses. P4VP-SWCNT-based devices that were not treated with a solution of $PdCl_2$ did not give any appreciable decrease in conductance upon exposure to 40 ppm of 2,4-dithiapentane. Devices fabricated from a $Pd(py)_2Cl_2$-SWCNT composite and from only SWCNTs also did not give any measurably significant decrease in conductance. Also, $Pd^{2+}$-P4VP-SWCNT chemiresistive devices responded strongly and irreversibly to 60 s exposure of 40 ppm of both tetrahydrothiophene and methyl n-propyl sulfide vapors diluted in air (FIG. 17). The theoretical LODs for these analytes were calculated to be 0.1 ppm and 0.2 ppm, respectively. Per the principles of HSAB theory, it was hypothesized that these soft Lewis acid $Pd^{2+}$-based chemiresistive devices would not display significant responses to compounds that were not soft Lewis bases. Indeed, as shown in FIG. 5, among several VOCs representing a variety of organic functional groups that do not function as an analyte, even at a concentration of 200 ppm, 5 times greater than analogous data for thioethers also presented in FIG. 5. This high level of selectivity suggests that coordination of the thioether analytes to the metal sites incorporated into the P4VP film is responsible for the large chemiresistive responses in the devices and that fundamental principles that govern inorganic coordination chemistry can translate well to this platform for selective chemical detection.

Figure 18A:
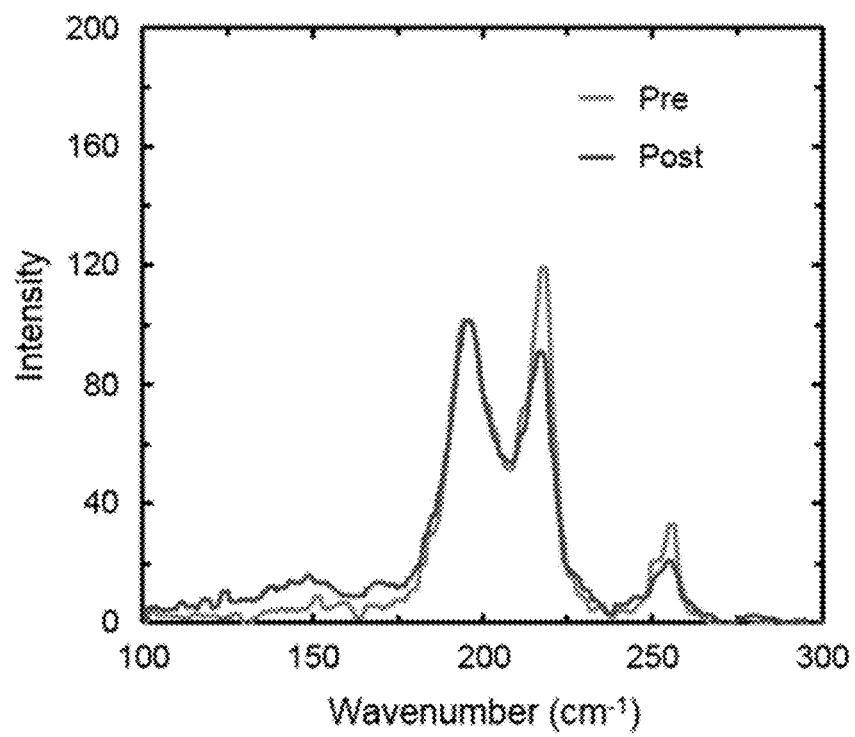
FIGS. 18A and 18B show Raman spectra before and after exposure to saturated vapor of 2,4-dithiapentane in air at room temperature of immobilized P4VP-SWCNTs with (FIG. 18A) and without (FIG. 18B) incorporation of PdCl$_2$.
Figure 18B:
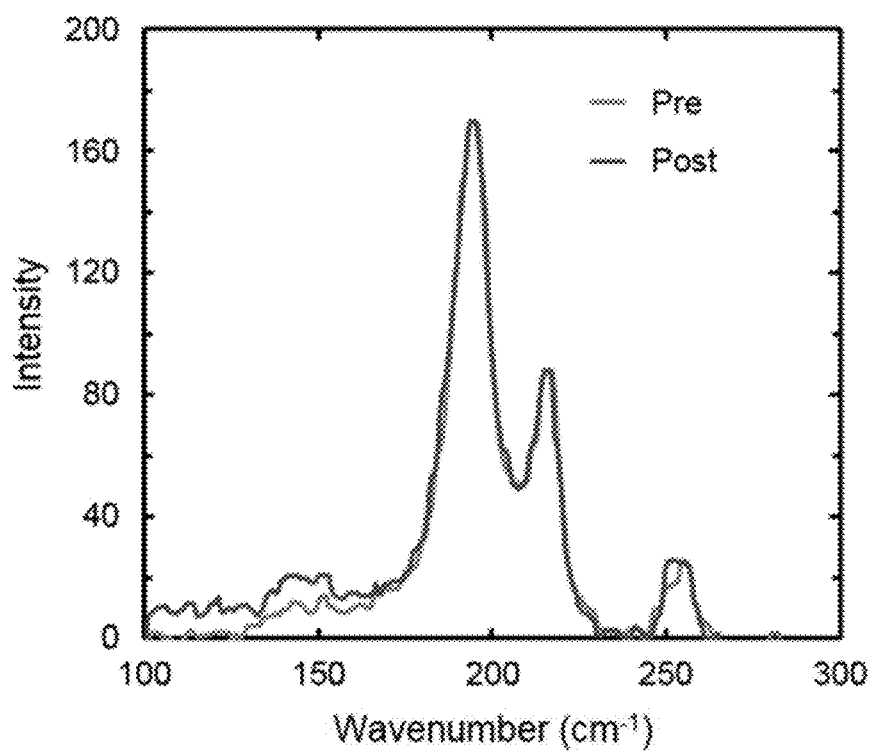

Raman spectroscopy was used to characterize the $Pd^{2+}$-P4VP-SWCNT composite and to examine the change in the sensing material caused by the analytes. The composite exhibited a decrease in the relative intensity at 217 $cm^{-1}$ (normalized to the intensity at 196 $cm^{-1}$) in the RBM region of the Raman spectrum after exposure to saturated vapor of 2,4-dithiapentane in air at room temperature (FIG. 18A), suggesting that the analyte vapors, upon binding $Pd^{2+}$ sites, induce separations between the SWCNTs that in turn cause the increase in resistance. See, Wang, F.; Yang, Y.; Swager, T. M. *Angew. Chem. Int. Ed.* 2008, 47 (44), 8394-8396, which is incorporated by reference in its entirety. Small expansion of the inter-SWCNT gaps is expected to dramatically reduce conductance of the material as a result of the exponential decrease in electron tunneling probability with distance. Such swelling-type mechanisms have been proposed previously for both polymer- and CNT-based sensors. See, Zhang, T.; Mubeen, S.; Myung, N. V; Deshusses, M. A. *IOP Publ. Nanotechnol. Nanotechnol.* 2008, 19, 332001-332014, Llobet, E. *Sens. Actuators B* 2013, 179, 32-45, and Jurs, P. C.; Bakken, G. A.; McClelland, H. E. *Chem. Rev.* 2000, 100 (7), 2649-2678, each of which is incorporated by reference in its entirety. Consistent with its lack of displayed chemiresistive response to thioethers, the analogous P4VP-SWCNT device made without the incorporation of $PdCl_2$ does not exhibit any such change in its Raman spectrum upon exposure to saturated vapor of 2,4-dithiapentane under standard laboratory conditions (FIG. 18B).

Figure 19:
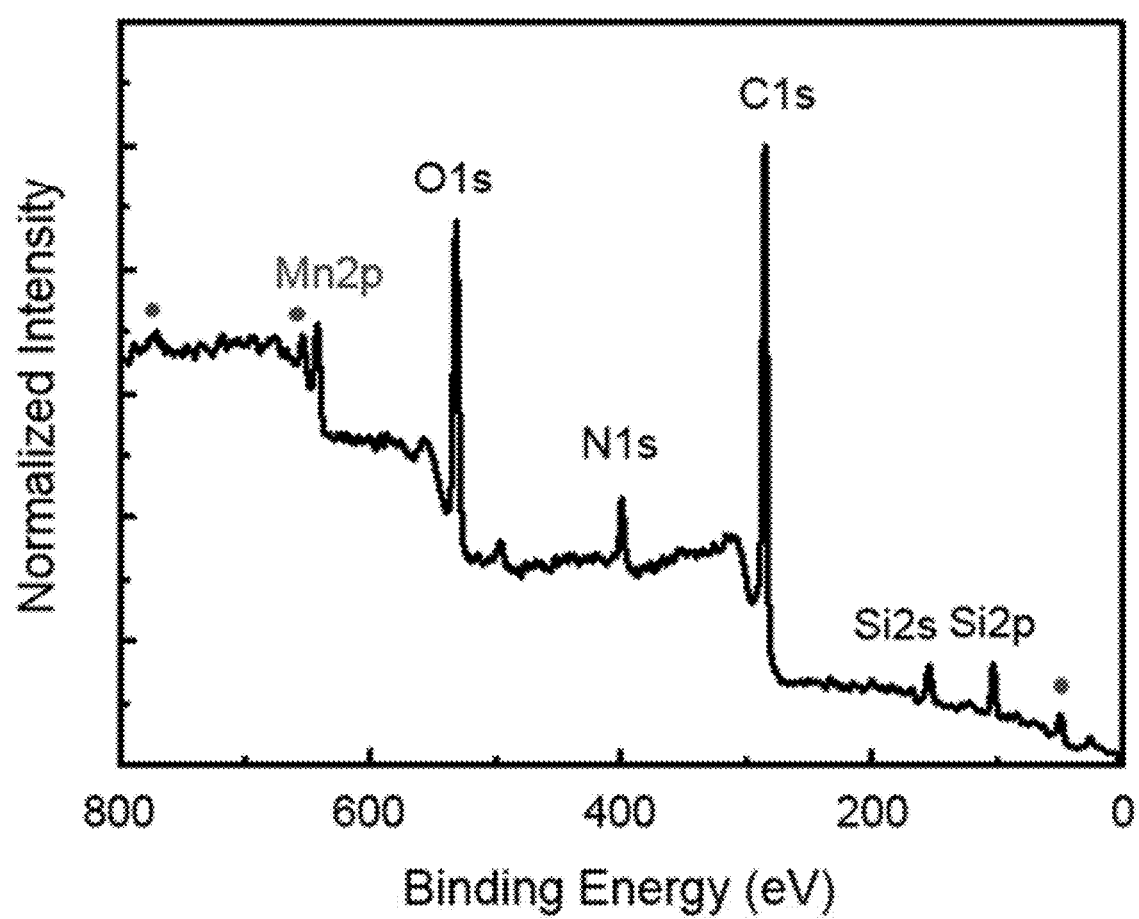
FIG. 19 shows XPS spectrum of the [MnO$_4$]$^-$-P4VP-SWCNT composites immobilized on glass substrate.

After demonstrating the utility of the P4VP-based chemiresistive devices decorated with $Pd^{2+}$ for thioether detection, the modularity of this platform was taken advantage of by introducing permanganate into the polymer as opposed to $Pd^{2+}$. It was hypothesized incorporation of permanganate, presumably accomplished by transforming the pyridine residues in the P4VP that remain unconsumed after quaternization into pyridinium permanganate, would confer strong, irreversible responses to VOC analytes that are susceptible to oxidation chemistry such as alcohols, alkenes, aldehydes, and thioethers. To perform this post-fabrication modification of the P4VP, a literature procedure was modified for the functionalization of P4VP-based resins with permanganate. See, John, K. J.; Pillai, V. N. R. *J. Polym. Sci., Part A: Polym. Chem.* 1989, 27 (9), 2897-2906, which is incorporated by reference in its entirety. One four-channel device post-quaternization was submerged in 2.5 mL water in a glass vessel. To the chamber, 0.63 mL of 0.5 M $H_2SO_4$ was added at room temperature and was allowed to sit for 1 h with occasional agitation. A solution of 0.75 g $KMnO_4$, 6.25 mL water, and 0.63 mL of 0.5 M $H_2SO_4$ was then added to the device at 0° C. (in an ice water bath), and the mixture was allowed to sit for 1 h with occasional agitation. The device was removed and rinsed with water, sonicated in water in an ultrasonic bath for 1 min, rinsed again with water, and then dried under a stream of nitrogen gas. Incorporation of Mn into the devices was evidenced by XPS as shown in FIG. 19. In FIG. 19, the composite includes O1s: 17.5%, C1s: 68.7%, N1s: 4.6%, Mn2p: 1.0% and Si2p: 8.2%, and the dots display distinctive peaks for Mn.

Figures 6A, 6B:
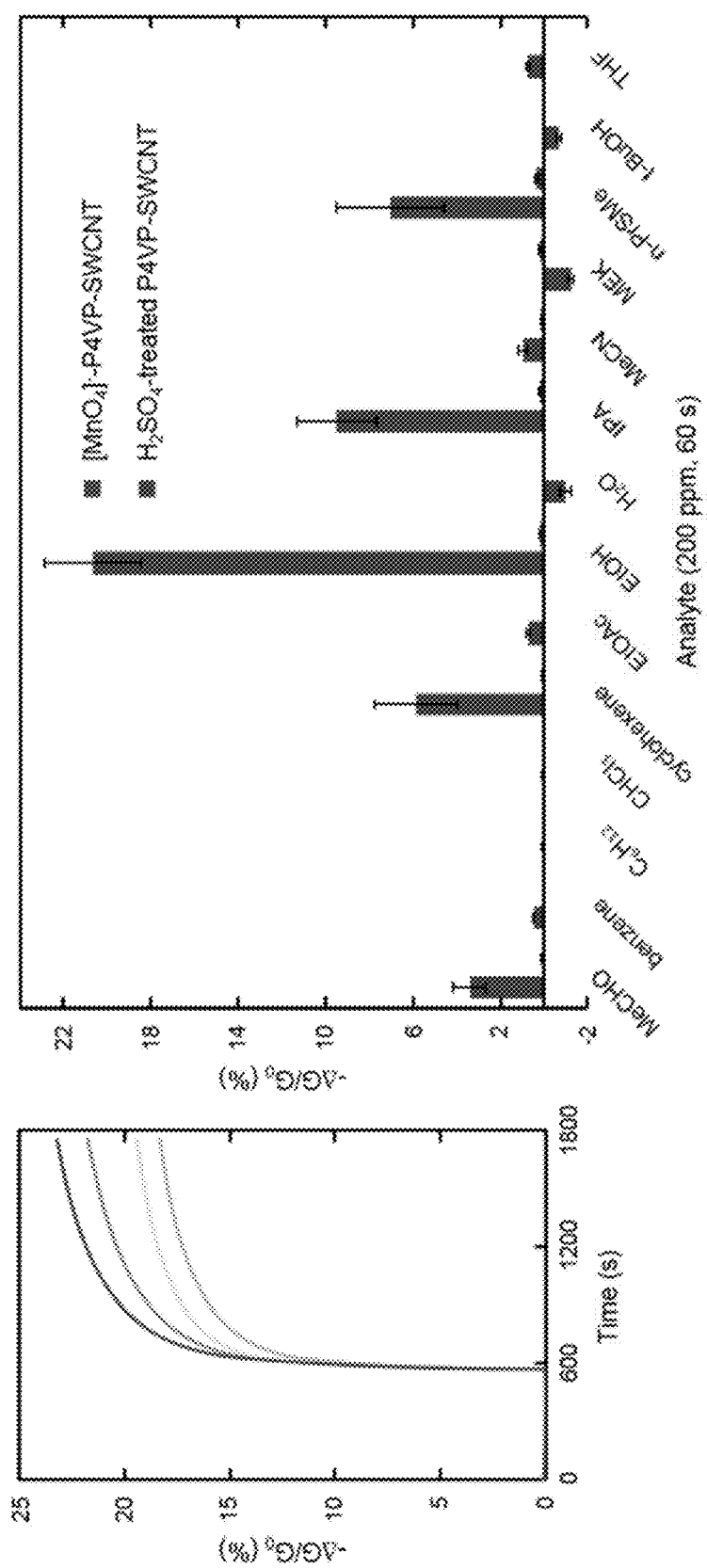
FIG. 6A shows chemiresistive traces of quadruplicate [MnO$_4$]$^-$-P4VP-SWCNT devices in response to one 60 s exposure to EtOH vapor of 200 ppm in air at room temperature.
FIG. 6B shows chemiresistive responses averaged across quadruplicate [MnO$_4$]$^-$-P4VP-SWCNT devices to 60 s exposure of VOCs at a concentration of 200 ppm.

These permanganate-functionalized devices were tested for their responses to the vapors of various VOCs. Those that are susceptible to oxidation were found by permanganate elicited strong, irreversible chemiresistive responses. As an example, the conductance traces for quadruplicate device channels responding to 60 s exposures of 200 ppm EtOH are shown in FIG. 6A. Chemiresistive responses of the permanganate-functionalized devices to the various VOCs are summarized in FIG. 6B; chemiresistive responses of analogous devices simply acidified with dilute $H_2SO_4$ to the same VOCs are also shown for comparison as a negative control and exhibit no significant changes in resistance. Control experiments with devices fabricated from pyridinium permanganate and SWCNTs without the P4VP could not be conducted because pyridinium permanganate has been reported to have been prepared in a polymer-supported form but not as a discrete unit compound. See, Kótai, L.; Sajó, I. E.; Gács, I.; Sharma, P. K.; Banerji, K. K. *Z. Anorg. Allg. Chem.* 2007, 633 (8), 1257-1260, and Kotai, L.; Gacs, I.; Sajo, I. E.; Sharma, P. K.; Banerji, K. K. *Chem Inform* 2009, 11, 25-104, each of which is incorporated by reference in its entirety. A suitable solvent system that was inert to $KMnO_4$ could not be identified in which both $KMnO_4$ could be dissolved and SWCNTs could be dispersed sufficiently well enough to fabricate chemiresistors from a $KMnO_4$-SWCNT composite via drop casting methods.

The data presented in FIG. 6B are consistent with the hypothesis that organic compounds susceptible to oxidation by permanganate would give significant, irreversible chemiresistive responses in the permanganate-based devices. Acetaldehyde, cyclohexene, ethanol, isopropanol, and methyl n-propyl sulfide, as representative aldehyde, alkene, primary alcohol, secondary alcohol, and thioether, respectively, all elicited chemiresistive responses as expected as they can all be readily oxidized by potassium permanganate, while other types of VOCs failed to give significant increases in device resistance. The small but detectable increases in resistance observed for compounds that would be expected to have strong intermolecular interactions with permanganate but not be oxidized—water, methyl ethyl ketone, and t-butanol as a tertiary alcohol—suggests that compounds that can engage in favorable intermolecular interactions with the incorporated permanganate will, upon solvation, screen the effects of the ionic species on the resistance of the SWCNTs much in the same way as described for the ionic metalloporphyrin complexes discussed in the previous publication. See, Liu, S. F.; Moh, L. C. H.; Swager, T. M. *Chem. Mater.* 2015, 27 (10), 3560-3563, which is incorporated by reference in its entirety. However, compounds that can subsequently be oxidized will thereby result in the irreversible reduction of the $Mn^{7+}$ metal centers of the permanganate, which presumably results in quenching of positive hole charge carriers in the SWCNTs by the electron-rich reduced manganese species, leading to the observed increases in resistance in the devices. The system need not be limited to $Mn^{7+}$ oxidation reactions. $Mn^{4+}$ compounds such as $MnO_2$ are known to give selective oxidation reactions in organic chemistry. Additionally, $Os^{8+}$ or $Ru^{8+}$ compounds such as $OsO_4$ or $RuO_4$ may behave similarly. Other reagents based upon $Pb^{4+}$, $Cr^{6+}$, $Mo^{6+}$, $W^{6+}$, $Fe^{4+}$, $Fe^{3+}$, and $Cu^{2+}$ can be used to impart selectivity to oxidation reactions with particular analytes including aromatics, alkenes, amines, thiols, thioethers, furans, phenols, alcohols, pyrroles, thiophenes, nitric oxide, and hydrogen.

In summary, a chemiresistive detector was fabricated from a composite of SWCNTs and surface-immobilized P4VP decorated with AgNPs for sensitivity to a model analyte, ammonia, by tuning the composite film thickness and SWCNT loading. By exploiting the modularity of this platform, incorporation of soft $Pd^{2+}$ metal cations into the P4VP-SWCNT film yields devices that chemiresistively detect vapors of representative organic thioethers with high sensitivity compared to devices made only with a $PdCl_2$-SWCNT composite, at least in part to the ability of the P4VP to promote dispersibility of SWCNTs in organic solvent. Additionally, the $Pd^{2+}$-P4VP-SWCNT devices exhibit good selectivity for thioethers over VOCs that do not function as soft Lewis bases. This work establishes that principles that govern inorganic coordination chemistry such as HSAB theory translate well to this platform and can be used to guide the rational design of effective chemiresistive detectors. Swelling of the CNT composite appears to contribute to the observed chemiresistive response by increasing inter-CNT distances, thereby increasing the resistance of the composite. Finally, incorporation of permanganate anions into the P4VP-SWCNT platform yields chemiresistive detectors that are sensitive to VOCs that are susceptible to oxidation such as primary and secondary alcohols, aldehydes, alkenes and thioethers.

Quaternized Polymer-Single-Walled Carbon Nanotube Scaf-folds for a Chemiresistive Glucose Sensor A sensor for detecting an analyte can include a substrate and a conductive region in electrical communication with at least two electrodes on the substrate, the conductive region including a composite, where the composite includes a carbon nanotube associated with a polymer covalently linked to a surface of the substrate via a linker. In certain embodiments, the composite can be functionalized.

Figure 26:
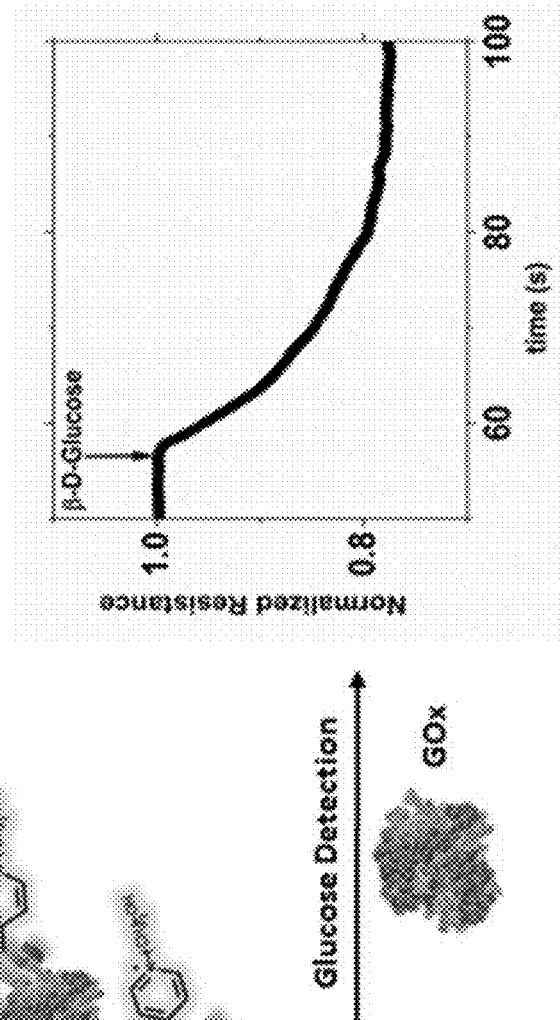
FIG. 26 shows a schematic of the glucose sensor and a graph depicting the change of resistance of the sensor over time upon detection of glucose.
Figure 26:
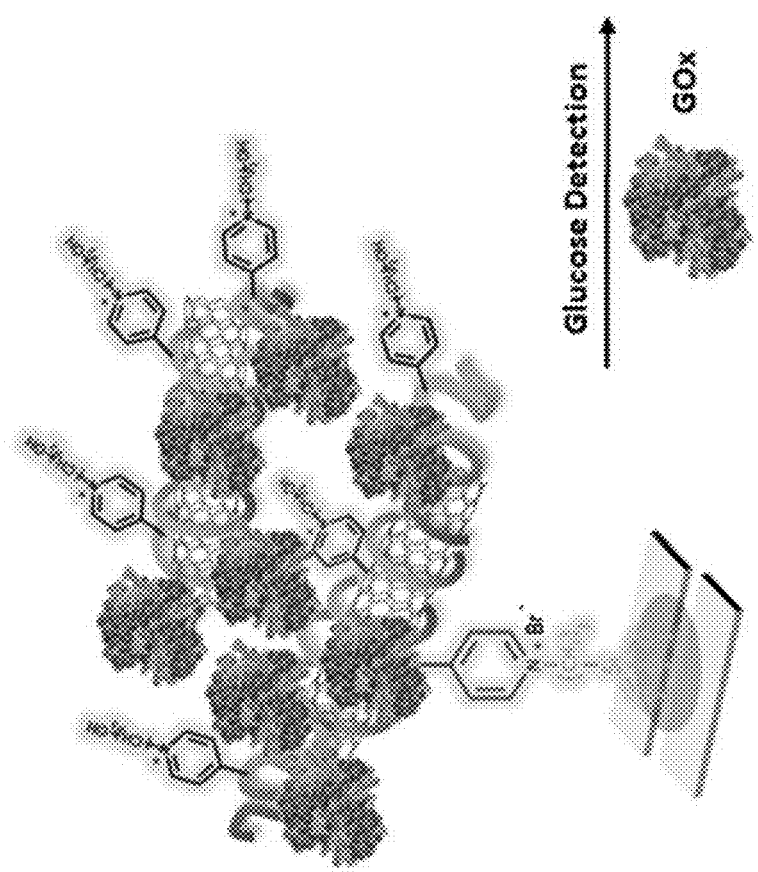

In certain embodiments, a chemiresistive glucose sensor can be fabricated based on poly(4-vinylpyridine) (P4VP) and single-walled carbon nanotube (SWCNT) composites (see FIG. 26 for a schematic). In certain embodiments, the composite can be functionalized with 2-bromoethanol. The composite can further comprise a sensing element. In a glucose sensor, the sensing element can be glucose oxidase. The glucose oxidase can be immobilized on P4VP-SWCNT composites through electrostatic and hydrophilic interactions.

To fabricate this glucose sensor, a gold electrode-deposited glass substrate was treated with 3-bromopropyltrichlorosilane to obtain a covalent bond between the polymer-SWCNT composite and the surface treated glass substrate. Then, residual pyridyl moieties in P4VP of the composite were treated with 2-bromoethanol to achieve highly charged hydrophilic surface by quaternization reaction, thereby improving biocompatibility with enzyme molecules. The resulting biomimetic surface for selective glucose detection was prepared by incorporating glucose oxidase (GOx) into the quaternized P4VP-SWCNT composite, which shows a decrease in electrical resistance by interaction with enzymatically liberated hydrogen peroxide upon exposure to glucose. The sensor exhibited efficient selectivity towards glucose and short response time (3 s) that plays an important role in quality control of glucose containing beverages as well as in clinical analysis.

Diabetes mellitus is a serious metabolic disease, which is related to the accumulation of glucose concentration in the blood. The worldwide prevalence of diabetes has continuously increased although there are a lot of progresses in modern medical science and technology. See, Wu, Q.; Wang, L. Organization of Glucose-Responsive Systems and Their Properties. Chem. Rev. 2011, 111, 7855-7875, which is incorporated by reference in its entirety. Glucose is an essential carbohydrate that acts as a metabolic intermediate. Abnormal accumulation of glucose in human body results in diabetes mellitus. See, Locke, A. K.; Cummins, B. M.; Coté, G. L. High Affinity Mannotetraose as an Alternative to Dextran in ConA Based Fluorescent Affinity Glucose Assay Due to Improved FRET Efficiency. ACS Sens. 2016, 1, 584-590, Martinkova, P.; Pohankaocke, M. Biosensors for Blood Glucose and Diabetes Diagnosis: Evolution, Construction, and Current Status. Anal. Lett. 2015, 48, 2509-2532, and Rines, A. K; Sharabi, K.; Tavares, C. D. J.; Puigserver, P. Targeting Hepatic Glucose Metabolism in the Treatment of Type 2 Diabetes. Nat. Rev. Drug Discov. 2016, 15, 786-804, each of which is incorporated by reference in itsentirety. To reduce and prevent costly treatment of this disease, monitoring of glucose level is required. In addition, glucose monitoring in fermentation of food industry is also crucial since the quality of food products can be directly influenced by the amount of glucose. Therefore, the research on glucose detection and monitoring of its accumulation level has attracted great interest up to now.

Of the various glucose sensors, the enzyme based sensor devices have been widely studied since Clark and Lyons first developed in 1962. See, Clark, L. C.; Lyons, C. Electrode Systems for Continuous Monitoring in Cardiovascular Surgery. Ann. N. Y. Acad. Sci. 1962, 102, 29-45, which is incorporated by reference in its entirety. Enzymatic methods have been preferred over other methods for the detection of glucose due to their excellent specificity and low interfering effect. Glucose oxidase (GOx) is the most widely used model enzyme, which involves the conversion of glucose to gluconolactone and $H_2O_2$ in the presence of GOx for the electrochemical enzymatic glucose detection. See, Wang, J. Electrochemical Glucose Biosensors. Chem. Rev. 2008, 108, 814-825, which is incorporated by reference in its entirety.

Single-walled carbon nanotubes (SWCNTs) have been employed as a key component for the construction of biocompatible platforms in biotechnological applications since they offer several advantages such as good electrical conductivity, high surface area-to-volume ratio and high sensitivity of their electrical resistance when exposed to molecules. See, Cella, L. N.; Chen, W.; Myung, N.V; Mulchandani, A. Single-Walled Carbon Nanotube-Based Chemiresistive Affinity Biosensors for Small Molecules: Ultrasensitive Glucose Detection. J. Am. Chem. Soc. 2010, 132, 5024-5026, and Pang, X.; Imin, P.; Zhitomirsky, I.; Adronov, A. Amperometric Detection of Glucose Using a Conjugated Polyelectrolyte Complex with Single-Walled Carbon Nanotubes. Macromolecules 2010, 43, 10376-10381, each of which is incorporated by reference in its entirety. It was reported that CNT based transducers enhance sensor performance via improving enzyme stability. See, Soylemez, S.; Kanik, F. E.; Uzun, S. D.; Hacioglu, S. O.; Toppare, L. Development of an Efficient Immobilization Matrix Based on a Conducting Polymer and Functionalized Multiwall Carbon Nanotubes: Synthesis and Its Application to Ethanol Biosensors. J. Mater Chem. B. 2014, 2, 511-521, which is incorporated by reference in its entirety. Moreover, composites of CNTs with polymers was found to be useful to improve the solubility of CNTs as well as to prevent nanotube aggregation, which increase the biocompatibility of CNTs in a polymer matrix.

Chemiresistive sensors, which provide facile integration into portable and low-cost devices for in-field use, have been widely researched and developed for various applications to detect different types of the analytes. See, Hubble, L. J.; Cooper, J. S.; Pintos, A. S.; Kiiveri, H.; Chow, E.; Webster, M. S.; Wieczorek, L.; Raguse, B. High-Throughput Fabrication and Screening Improves Gold Nanoparticle Chemiresistor Sensor Performance. ACS Comb. Sci. 2015, 17, 120-129, Wang, F.; Gu, H.; Swager, T. M. Carbon Nanotube/

Polythiophene Chemiresistive Sensors for Chemical Warfare Agents. *J. Am. Chem. Soc.* 2008, 130, 5392-5393, and Liu, S. F.; Petty, A. R.; Sazama, G. T.; Swager, T. M. Single-Walled Carbon Nanotube/Metalloporphyrin Composites for the Chemiresistive Detection of Amines and Meat Spoilage. *Angew. Chem. Int. Ed.* 2015, 54, 6554-6557, each of which is incorporated by reference in its entirety. Such sensors are based on arrays of chemiresistive materials that change their resistance in response to changes in their immediate chemical environment. SWCNTs are a major point at issue in chemosensor development. However, the poor solubility of SWCNTs is one of the main disadvantages that limits their applicability. In order to improve the solubility and to impart sensor selectivity for specific target analytes, poly(4-vinylpyridine) (P4VP)-functionalized SWCNTs for a chemiresistive sensor platform can be used. See, Yoon, B.; Liu, S. F.; Swager, T. M. Surface-Anchored Poly(4-vinylpyridine)-Single-Walled Carbon Nanotube-Metal Composites for Gas Detection. *Chem. Mater.* 2016, 28, 5916-5924, which is incorporated by reference in its entirety. The dispersant P4VP not only shows a favorable interaction with SWCNTs and stabilizes debundled dispersion but also allows further modifications on its pyridyl nitrogens with alkyl halides or metal ions with the help of its nucleophilic and ligand properties. Moreover, P4VP has a potential to provide a suitable immobilization matrix for enzymes, antibodies, and nucleic acids. Based on these considerations, the P4VP-SWCNT nanocomposite can be used as a sensor platform to create glucose sensor.

Figure 22:
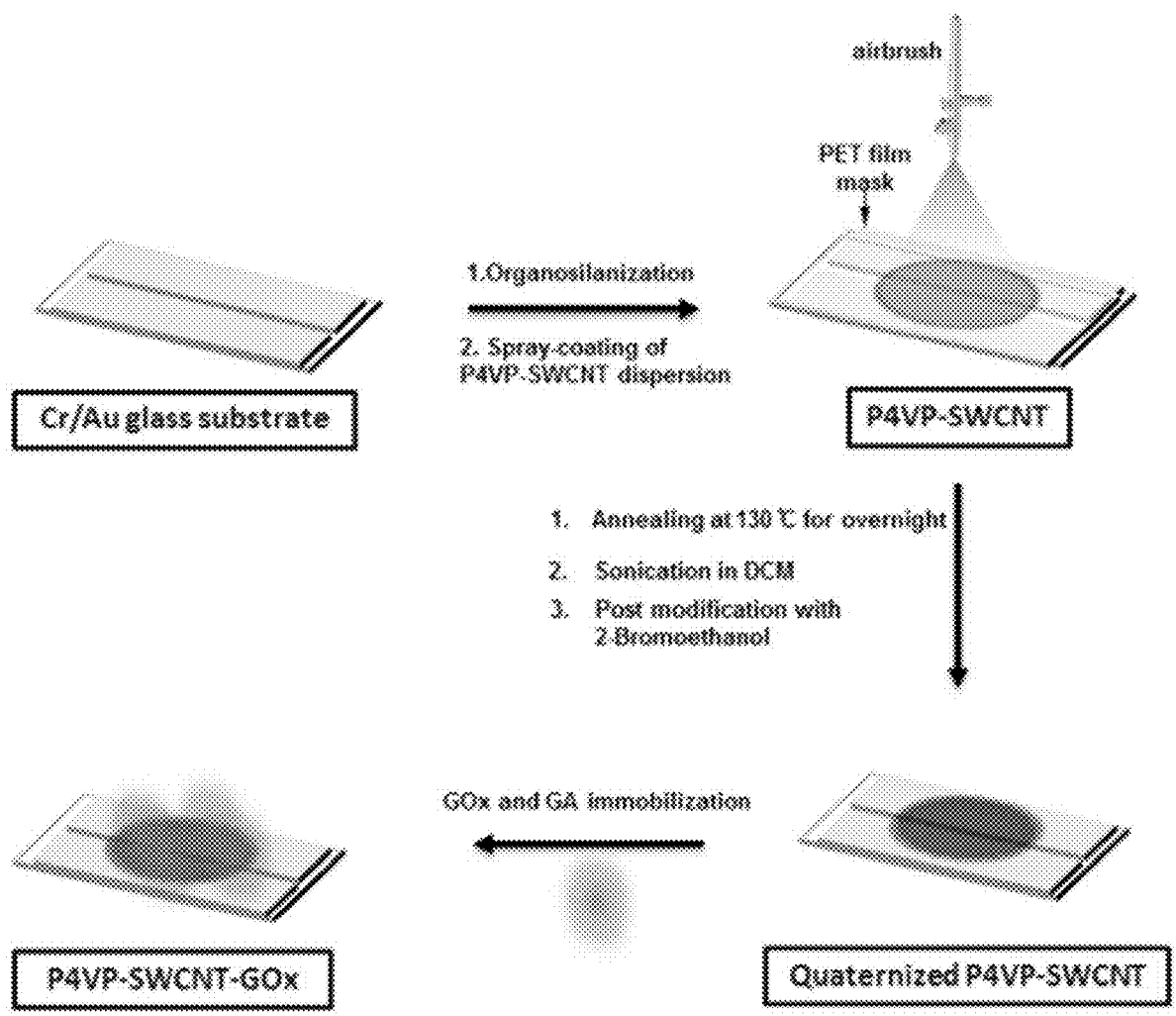
FIG. 22 shows preparation of the proposed chemiresistive glucose sensor.

In order to fabricate a chemiresistive glucose sensor, P4VP-SWCNT dispersion was prepared and used for device fabrication via spray coating, followed with post-functionalization of P4VP-SWCNT surface with 2-bromoethanol as illustrated in FIG. 22. The modified surface was then treated with enzyme glucose oxidase (GOx) since it is commonly used as a biological element of the glucose sensor for diabetics. The quaternized P4VP-SWCNT scaffold with hydroxyl end group was used as a bioactive layer since it provides an excellent matrix for the immobilization of GOx through electrostatic and hydrophilic interactions. The strong electrostatic interaction between the positively charged surface and the negatively charged enzyme would result in a sensor with a more efficient electron transfer and hence in a higher response to glucose. See, Kros, A.; Hoven, S. W. F. M.; Sommerdijk, N. A. J. M.; Nolte, R. J. M. S. Poly(3,4-ethylenedioxythiophene)-Based Glucose Biosensors. *Adv. Mater.* 2001, 13, 1555-1557, which is incorporated by reference in its entirety. In a subsequent step, the P4VP-SWCNT-GOx matrix was fixed by glutaraldehyde (GA) as a cross linking agent. The resistance change of the sensor was measured upon exposure to glucose as the analyte. In this study, P4VP-SWCNT nanocomposites are fabricated in combination with a specific enzyme, GOx, providing both a simple route and low cost to fabricate. This versatile chemiresistive sensor scaffold is expected to be guided into a number of biosensor applications with different type of suitable enzymes.

The use of an appropriate material as a biosensing platform is important in analyte detection depending on the purpose of the application. Instead of using a pristine material, creating a modified one for a target application and tuning the material properties to make it useful for a certain purpose is gained plenty of interest from researchers in scientific progress. Additionally, glucose oxidase (GOx) based sensors have been attracted great attention and played an important role for detection of glucose in drinks and serum matrices. For that matter, GOx should be properly fixed onto the substrate. To create stable and robust platform, the quaternized P4VP-SWCNT chemiresistor scaffold capable of glucose monitoring can be fabricated via immobilization of enzyme molecules. Disclosed herein is a simple and noncovalent functionalization of SWCNT with P4VP, and subsequent quaternization with 2-bromoethanol to create biomimetic and cost effective surface for device fabrication. The quaternized surface, being hydrophilic in nature, is known to interact with the biomolecule via hydrogen bonding and $\pi$-stacking, thus providing a fixation for enzyme molecules. Additionally, cationic surface on the electrode surface was created with the help of residual pyridyl moieties of the polymer. GOx has an isoelectric point of about 4.2 (see, Pazur, J. H.; Kleppe, K. The Oxidation of Glucose and Related Compounds by Glucose Oxidase from *Aspergillus niger*. *Biochemistry* 1994, 3, 578-583, which is incorporated by reference in its entirety), and hence carriers a net negative charge in pH 7.0 phosphate buffer solution. Strong electrostatic binding of biomolecules occurs due to the interaction of negatively charged enzyme with positively charged surface. It would result in a chemiresistive sensor with more efficient electron transfer and hence in a higher binding with biomolecule. See, Kros, A.; Hövell, S. W. F. M.; Sommerdijk, N. A. J. M.; Nolte, R. J. M. S. Poly(3,4-ethylenedioxythiophene)-Based Glucose Biosensors. *Adv. Mater.* 2001, 13, 1555-1557, which is incorporated by reference in its entirety. Carbon nanotubes are crucial theme in chemiresistive sensor design (see, Fennell, J. F.; Liu, S. F.; Azzarelli, J. M.; Weis, J. G.; Rochat, S.; Mirica, K. A.; Ravnsbaek, J. B.; Swager, T. M. Nanowire Chemical/Biological Sensors: Status and a Roadmap for the Future. *Angew. Chem. Int. Ed.* 2016, 55, 1266-1281, which is incorporated by reference in its entirety), and especially carbon nanotubes combined with the polymer exhibits superior communications with glucose oxidase which result in higher response to glucose. See, Wang, Z. G.; Wang, Y.; Xu, H.; Li, G.; Xu, Z. K. Carbon Nanotube-Filled Nanofibrous Membranes Electrospun from Poly(acrylonitrile-co-acrylic acid) for Glucose Biosensor. *J. Phys. Chem. C.* 2009, 113, 2955-2960, which is incorporated by reference in its entirety. Hence, the excellent sensing performance was achieved with this combination, and it could open up opportunities in portable, wearable and cheap sensor production.

Figure 23A:
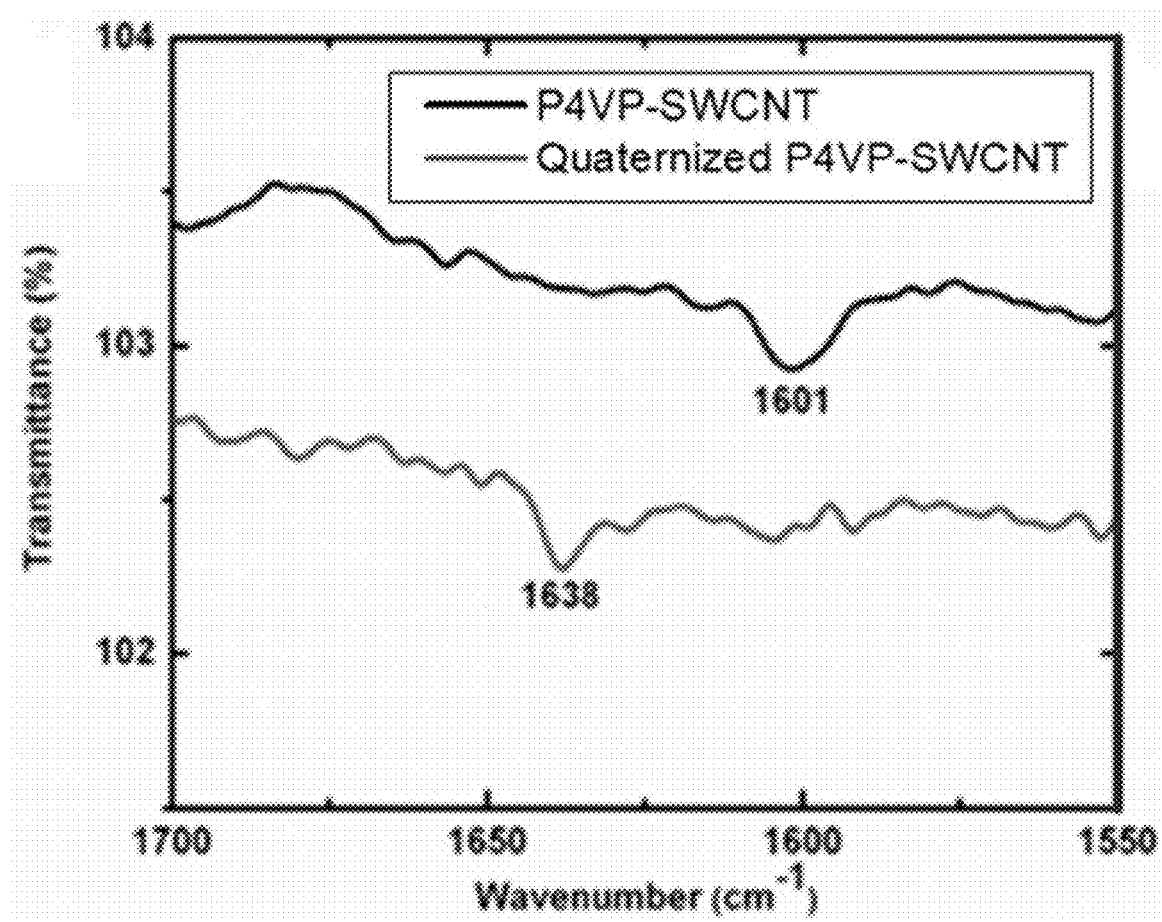
FIG. 23A shows ATR-FTIR spectra of P4VP-SWCNT, and quaternized P4VP-SWCNT composites on glass substrates.
Figure 23B:
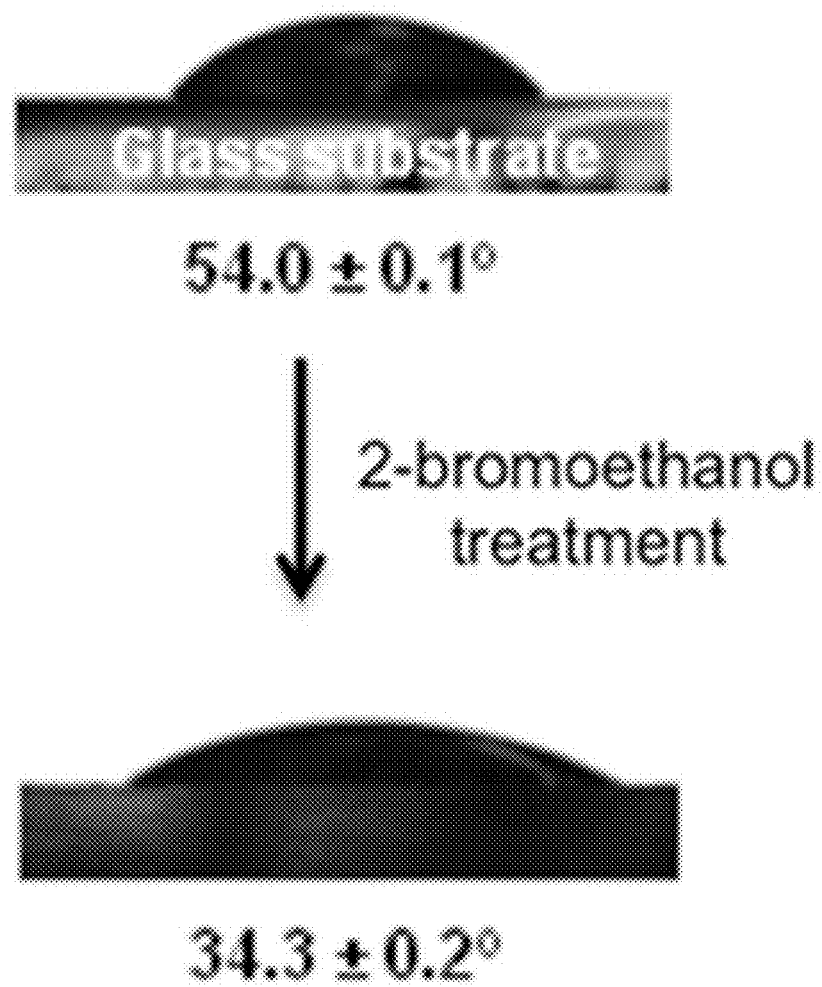
FIG. 23B shows their water contact angle measurements.
Figure 23C:
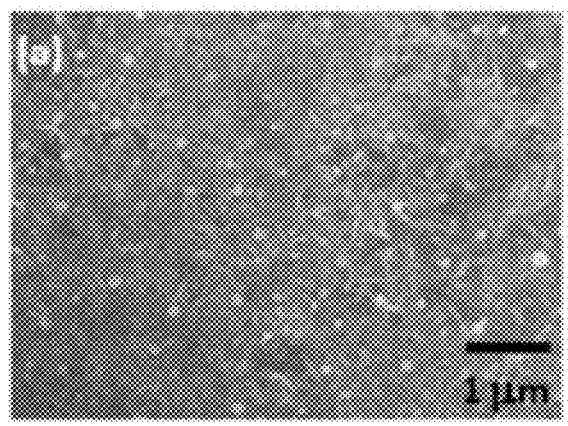
FIG. 23C shows SEM images of (a) P4VP-SWCNT, (b) quaternized P4VP-SWCNT, and (c) P4VP-SWCNT-GOx films on glass substrates.
Figure 23C:
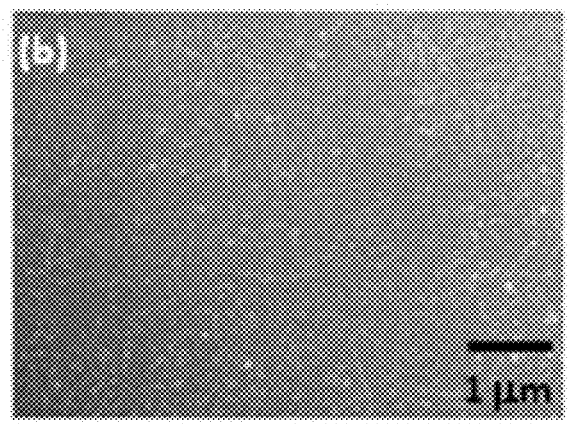
Figure 23C:
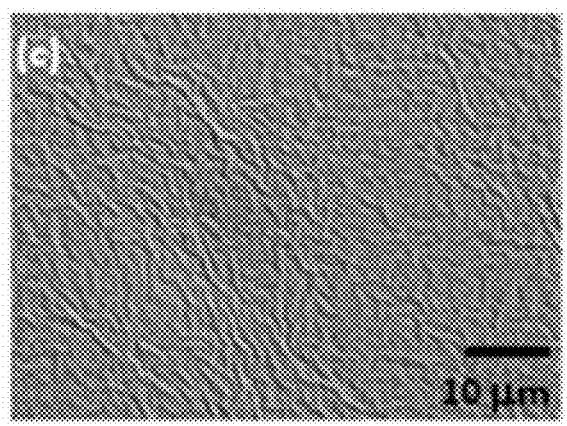
Figure 24A:
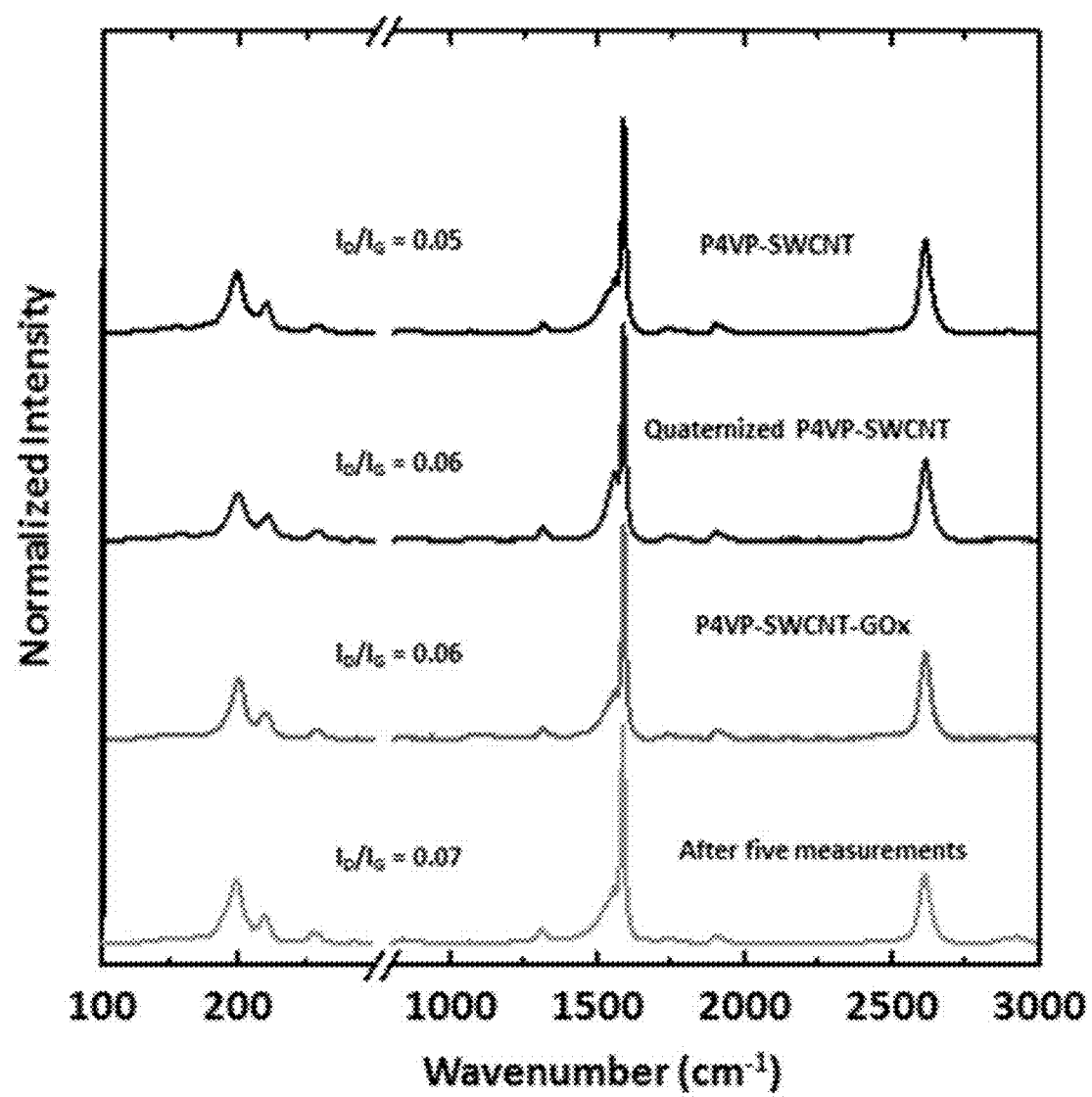
FIG. 24A shows Raman spectra of P4VP-SWCNT, quaternized P4VP-SWCNT, P4VP-SWCNT-GOx films and P4VP-SWCNT-GOx film after 5 consecutive measurements.

In order to prepare hydrophilic and positively charged surface for the GOx immobilization, P4VP-SWCNT was treated with 2-bromoethanol. FIG. 23A presents the ATR-FTIR spectra of P4VP-SWCNT composites before and after 2-bromoethanol treatment. The shift in pyridyl C=N stretching band from 1601 to 1638 $cm^{-1}$ shows the quaternization reaction on the pyridiyl nitrogen of P4VP. The quaternized P4VP-SWCNT was also confirmed by a decrease in the water contact angle (FIG. 23B). Since the P4VP-SWCNT composites are covalently anchored to the substrate, SEM images in FIGS. 23C(a) and 23C(b) show the composites remaining stable on the substrate after the quaternization reaction. GOx was immobilized to the cationic quaternized P4VP-SWCNT surface by means of GA as a cross linking agent. SWCNTs were not observed by SEM in FIG. 23C(c) due to the top layer of cross-linked GOx. The obtained electrical resistance of the P4VP-SWCNT-GOx films soaked in pH 5.5 acetate buffer solution was in the range between 350 k$\Omega$ and 1 M$\Omega$. FIG. 24A summarizes the Raman spectra of P4VP-SWCNT, quaternized P4VP-SWCNT and P4VP-SWCNT-GOx composites using an excitation wavelength of 633 nm, after 5 consecutive measurements with 2.0 mM of glucose. There was no significant change in the D/G band intensity, which indicates the defect in the SWCNT sidewalls is negligible while the quaternization reaction and GOx immobilization. This observation suggests that because of the noncovalently wrapped P4VP to SWCNT, the π electronic states in the SWCNT sidewalls remain intact while the functionalization.

Following the preparation of P4VP-SWCNT-GOx device with optimum conditions, chemiresistive measurement of the devices was carried out at room temperature in the reaction cell containing 10 mL of NaOAc (2.5 mM, pH 5.5) by applying 0.1 V potential. Under the constant potential, a custom Labview program (with the combination of Keithley 2400 Source meter) was used to monitor the resistance change during experiment. The change in resistance resulted from exposure to glucose was calculated using the equation of $\Delta R\ (\%) = (R - R_0)/R_0 \times 100\%$, $R_0$ is the initial resistance of the P4VP-SWCNT-GOx, and R is the resistance after exposure to glucose. Since the immobilized GOx catalyzes glucose to gluconolactone and hydrogen peroxide under the constant potential, glucose can then detected by monitoring a decrease in resistance of the sensor due to the enzymatically liberated hydrogen peroxide.

Figure 25A:
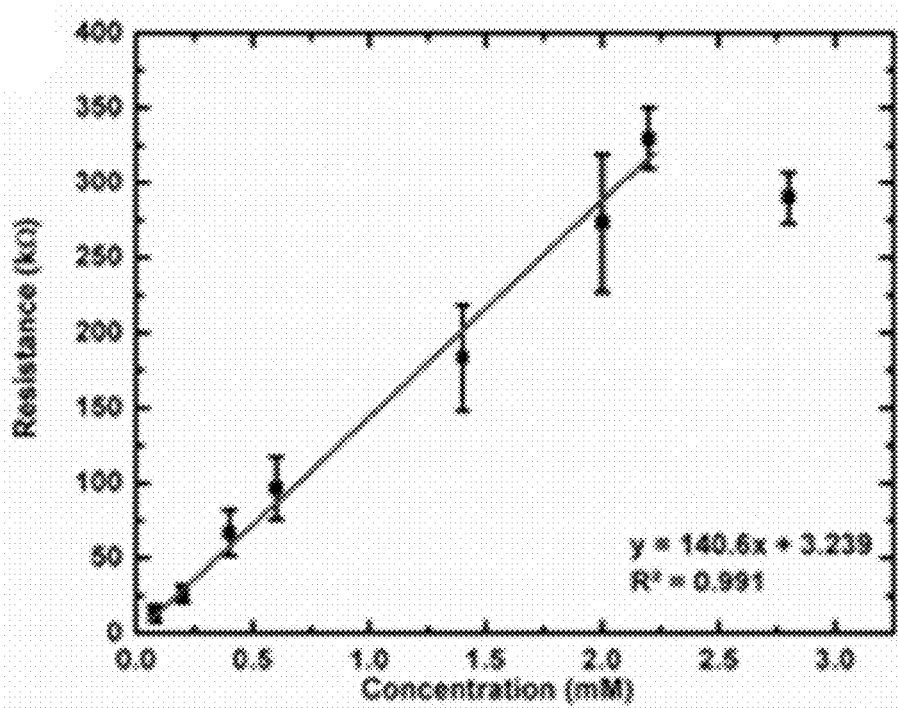
FIG. 25A shows calibration curve for glucose.
Figure 25B:
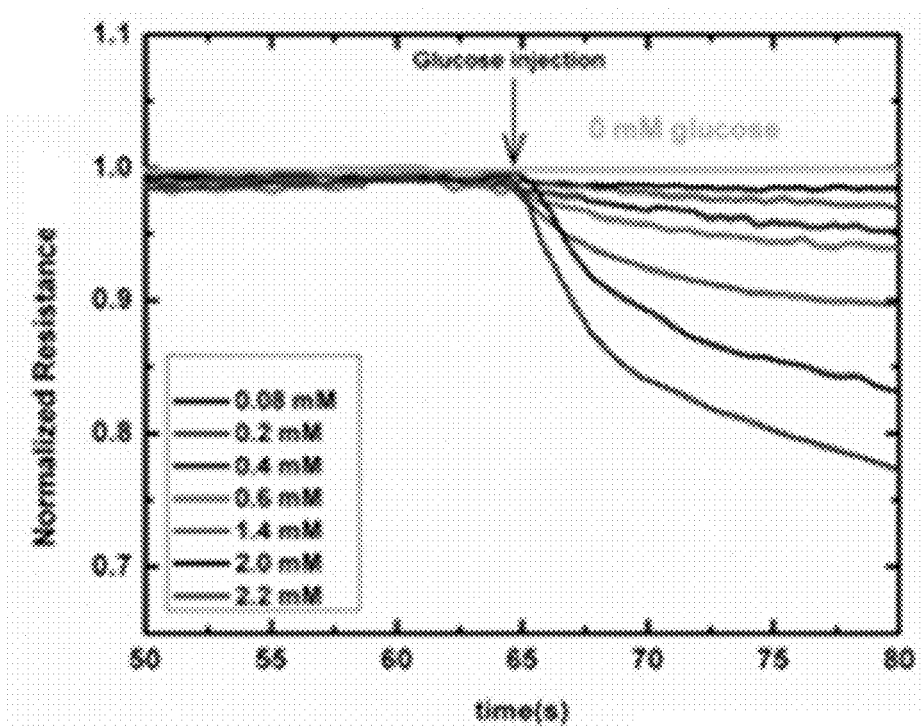
FIG. 25B shows the chemiresistive device response to various glucose concentrations between 0.08 and 2.2 mM.

A calibration curve generated with the addition of different concentration of glucose solutions to the device in a buffer solution is shown in FIG. 25A (in 2.5 mM NaOAc buffer, pH 5.5) (error bars show three consecutive measurements with the same device). A linearity was observed between 0.08 mM and 2.2 mM glucose, as given by y=140.6x+3.239 and $R^2$=0.991. Also, typical sensing traces of the sensor to different concentration of glucose are given in FIG. 25B. As shown in FIG. 25B, without glucose addition, there is no signal for the corresponding system. This shows that when the concentration of glucose is increased, a higher response change was observed indicating a larger quantity of hydrogen peroxide production as a result of enzymatic reaction. However, after a certain concentration of glucose (2.2 mM), a decrease in the response was observed as a result of the saturation point of the enzyme molecules (It is a general phenomenon for enzymatic based sensor systems). So, a reliable linear range was observed within the range of 0.08 mM and 2.2 mM. In blank experiments, the sensor fabricated at the optimized conditions was tested with no glucose oxidase. Addition of glucose solution to the reaction cell of the blank sample did not change the resistance of the system. Additionally, when only buffer was added to the medium instead of glucose, no change in resistance was observed. It confirms that the resistance change can only be observed as a result of enzymatic reaction with P4VP-SWCNT-GOx surface and glucose.

Figure 25C:
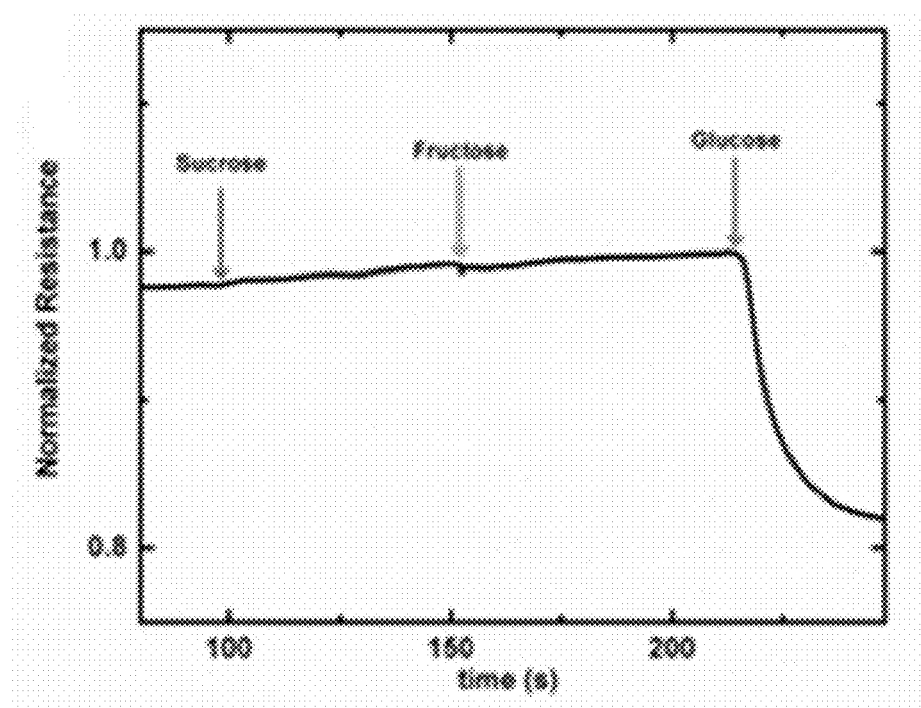
FIG. 25C shows sensor selectivity for different sugars.

Difficulties in accurate measurement of glucose concentration can arise from the interfering effect in the presence of other compounds. The P4VP-SWCNT-GOx sensor was tested for the selective determination of glucose with different sugars. In FIG. 25C shows a comparison of the sensor response to the same concentration of sucrose, fructose and glucose (2.0 mM in 2.5 mM NaOAc buffer, pH 5.5). During experiments, there is no considerable signal for sucrose nor fructose. The results reveal that the described sensor is favorable for selective determination of glucose in the presence of such sugars, providing easy detection of glucose in beverages.

Figure 24B:
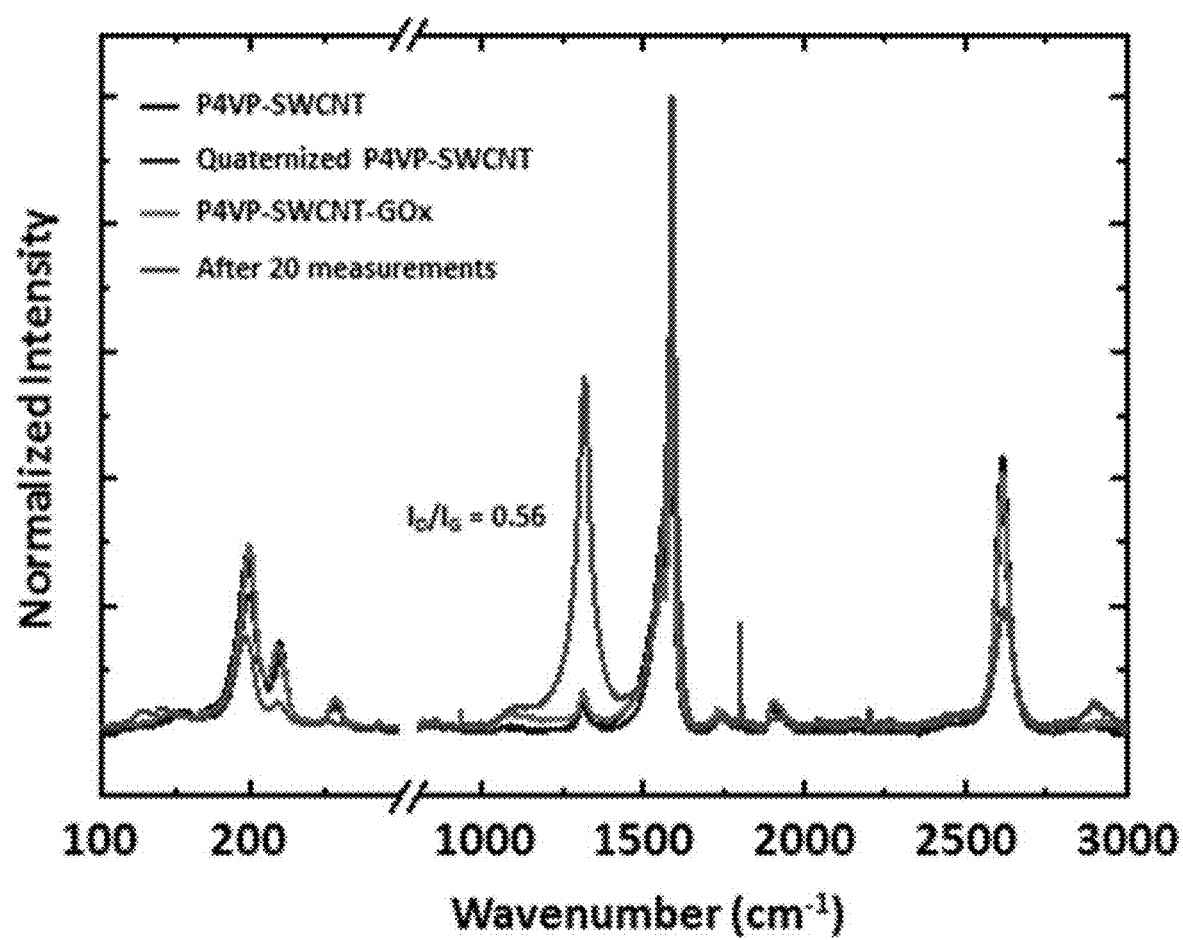
FIG. 24B shows superimposed Raman spectra of P4VP-SWCNT, quaternized P4VP-SWCNT, P4VP-SWCNT-GOx films and P4VP-SWCNT-GOx film after 20 consecutive measurements.
Figure 25D:
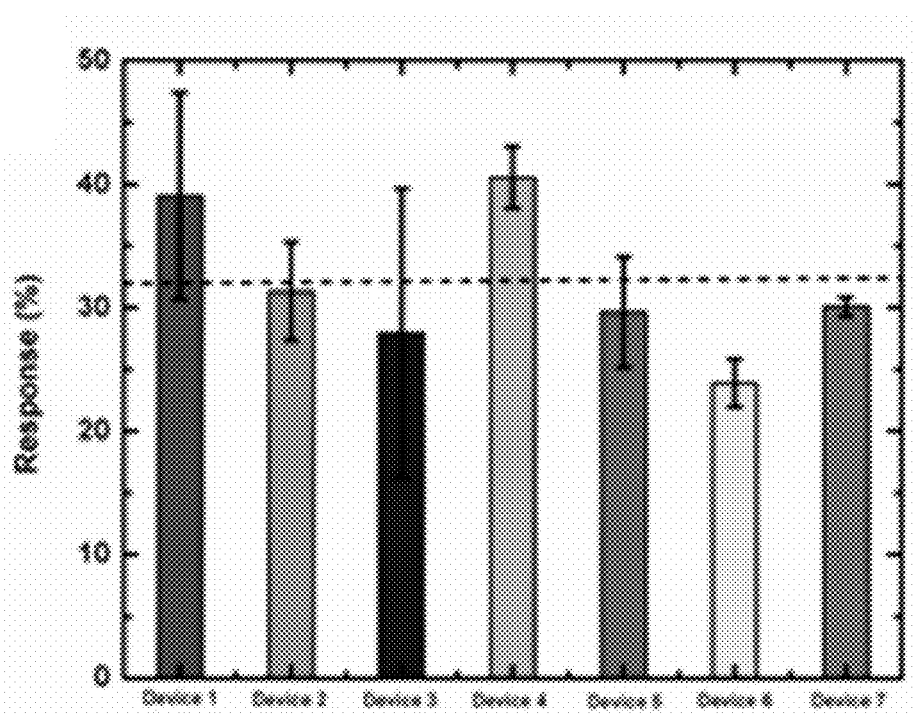
FIG. 25D shows responses of glucose using different devices under the optimum conditions: The dotted line indicates the average value of the devices.

The reproducibility and stability are two important parameters for evaluating the performance of the sensor. Reproducibility of the system was examined among seven different electrodes in the buffer solution containing 2.0 mM glucose. All devices were fabricated with the same fabrication conditions. The responses for each device were recorded as illustrated in FIG. 25D (error bars show three consecutive measurements with the same device). The average percent response with one sensor is ranged from 23.88% to 40.56%, and the relative standard deviation of seven sensors was found as 18.84%. Additionally, the sensor signals corresponding to the 2.0 mM glucose solution were measured ten times consecutively in order to prove the repeatability of the sensor response. The SD and the relative standard deviation were calculated as ±0.365 and 11.29%, respectively. It is noted that when the sensor is exposed to 2.0 mM glucose solution for 5 consecutive times, there was only a modest increase in the D/G band in Raman spectra from 0.06 to 0.07 (FIG. 24A, bottom). However, after 20 consecutive exposures to glucose (excitation at 633 nm), the D/G band intensity ratio of the P4VP-SWCNT-GOx surface increased to 0.56 due to the repeated interactions with hydrogen peroxide (FIG. 24B). Therefore, the proposed sensor can provide reliable responses to glucose up to 5 consecutive exposures with a single sensor device.

Moreover, the long-term stability of the proposed sensor was investigated under optimum conditions. In a period of 45 days, operational performance of the P4VP-SWCNT-GOx was investigated. The fabricated sensor device was first kept at 4.0° C. for 45 days and then exposed to 2.0 mM of glucose. It was found that the response tends to be practically constant and the sensor can still retain 83.3% of its initial response, showing the long-term stability of the device. The improved stability of the P4VP-SWCNT-GOx electrode is related to the excellent biocompatibility of the SWCNT and P4VP for preserving the activity of the biomolecules. Nevertheless, some decrease in the response after a long-term storage can be observed, which is probably due to the denaturation of the enzyme as a result of storing conditions for a long time. Moreover, the proposed sensor exhibits fast response time (~3s), which can reduce the analysis time and be used as a real time sensor.

The sensing system was checked in the known concentration of glucose in two different beverages (0.5 mM and 1.6 mM; S® fruit punch juice and L® ice tea). The untreated beverage samples were injected into the device cell instead of glucose. The sensor responses for each sample were recorded and glucose concentrations were estimated from the calibration curve. Each sample response was recorded three times to calculate their standard deviation (SD) during measurements and reported in Table 1. Also, all the experiments were performed using the optimum conditions. As shown in Table 1, although there is a small difference between the experimental results and the data on the product labels provided by the manufacturers because of some electroactive species in drinks the fabricated sensor is suitable for glucose detection in beverages.

Since the commercial methods which are used to routine analysis have several drawbacks, the proposed design is still suitable for glucose determination in real samples. Hence, it offers several advantages over traditional methods and also improvement in the selectivity of the proposed sensor can be a subject of ongoing research via designing new surface components.

TABLE 1

Determination of glucose in beverage samples

| Glucose (mM) Sample | Product Label (mM) | Sensor (mM) | Recovery (%) | Standard Deviations (SD) |
|---|---|---|---|---|
| S ® fruit punch juice | | | | |
| 1 | 1.60 | 1.07 | 66.87 | 5.77 |
| 2 | 0.50 | 0.33 | 66.0 | 10.0 |

TABLE 1-continued

Determination of glucose in beverage samples

| Glucose (mM) Sample | Product Label (mM) | Sensor (mM) | Recovery (%) | Standard Deviations (SD) |
|---|---|---|---|---|
| L ® ice tea | | | | |
| 1 | 1.60 | 1.10 | 68.75 | 5.77 |
| 2 | 0.50 | 0.28 | 56.0 | 5.77 |

In conclusion, a chemiresistive glucose sensor can be fabricated with the combination of SWCNT and P4VP as a sensing scaffold to achieve better attachment of biomolecules. These surface-immobilized P4VP-SWCNTs can be functionalized with 2-bromoethanol to generate hydrophilic and positively charged surface to increase the compatibility to GOx. The quaternized P4VP-SWCNT scaffold not only provides prolong stability and enhanced immobilization but also allows better contact between the biomolecule and the electroactive layer thereby improving the biocompatibility of enzyme molecules. The designed sensor is the first example of an enzymatic based chemiresistive sensor system for real time glucose sensing. Such development of low cost, fast response and robust glucose sensor brings a useful tool for glucose monitoring. This study may provide a simple and economic way to integrate the system into the devices for real time glucose analysis.

EXAMPLES

Materials

All chemicals and reagents were purchased from Sigma-Aldrich and used without additional purification, unless noted otherwise. SWCNTs (purified ≥95% as SWCNT, batch # UPT 1188-58BL) were acquired from Nano-C, Inc. Poly(4-vinylpyridine) (Mv=200,000 g/mol) and poly(2-vinylpyridine) (Mv=200,000 g/mol) were purchased from Scientific Polymer Products, Inc. 3-Bromopropyltrichlorosilane (BPTS) was purchased from Gelest. Silver hexafluorophosphate (98%) and cobalt(II) chloride (99.7%) were purchased from Alfa Aesar. Palladium(II) chloride (99%), nickel(II) chloride hexahydrate (99.999%), zinc chloride (97%), potassium permanganate (99%) and sulfuric acid (95%) and were purchased from Sigma-Aldrich. Copper(II) chloride dehydrate (98%) was purchased from Fisher Scientific. 2-Bromoethanol (97%), D-fructose (99%), and sucrose (99%) were purchased from Alfa Aesar. Glucose oxidase (from *Aspergillus niger*, 17300 units per g solid) and glutaraldehyde (GA) as the cross linking agent were obtained from Sigma-Aldrich and used as received.

Characterization

UV-Vis-NIR absorption spectra were obtained using an Agilent Cary 5000 spectrophotometer. ATR-FTIR spectra were obtained using a Thermo Scientific Nicolet 6700 FTIR with a Ge crystal for ATR. Raman spectra were collected with excitation at 633 nm laser using a Horiba LabRAM HR800 Raman spectrometer. X-ray photoelectron spectroscopy (XPS) was performed with a PHI Versaprobe II XPS spectrometer. Scanning electron microscope (SEM) images were obtained using a JEOL JSM-6700F FESEM at an accelerating voltage of 3 kV and 10 kV. The static water contact angles on the surfaces before and after organosilanization were measured using a Ramé-Hart goniometer (model 590) by vertical deposition of 2 μL of water droplet. The sheet resistance of P4VP-SWCNT composite films spray-coated on glass substrates of 0.8 cm×0.8 cm was measured using a four-point probe equipped with osmium tips (Signatone) in conjunction with a Keithley 2400 source meter.

Glucose sensing experiments were performed using a Keithley 2400 source meter with the combination of Keithley KUSB-488B cable. Glucose sensing results were recorded using a custom Labview program. In chemiresistive analyses, the data were given as the average of three measurements and standard derivations were recorded as ±5D. All measurements were performed at ambient conditions (25° C.).

Preparation of a P4VP-SWCNT Dispersion

To a solution of P4VP (50 mg) in N,N-dimethylformamide (DMF, 10 mL) was added SWCNT (5 mg) and then, the resulting mixture was sonicated for 1 h in an ultrasonic bath (Branson, 3510) chilled with ice and then allowed to reach room temperature. Subsequently, the suspension was centrifuged for 30 min at 15,000 g and allowed to stand overnight undisturbed. The isolated supernatant was directly used for the device fabrication via spray-coating unless otherwise indicated. For UV-Vis-NIR absorption spectroscopy, the isolated supernatant was diluted to 1:3 in DMF, further sonicated for 5 min, and recorded in a 1 cm optical path quartz cuvette.

Preparation of a Surface Functionalized Substrate

Glass substrates deposited with chromium adhesive layers (10 nm) and gold electrodes (100 nm) were prepared according to a literature procedure. See, Frazier, K. M.; Swager, T. M. *Anal. Chem.* 2013, 85 (15), 7154-7158, which is incorporated by reference in its entirety. Briefly, glass slides (VWR Microscope Slides) were cleaned by sonication in acetone for 5 min followed by UV-ozone treatment using a UVO cleaner (Jelight Company Inc., Model 42) for 20 min. A 10 nm layer of chromium (99.99%, R. D. Mathis) and a subsequent 100 nm layer of gold (99.99%, R. D. Mathis) were deposited through a custom stainless steel mask using Thermal Evaporator (Angstrom Engineering), which result in three sets of electrode pattern on the single glass slide, followed by cutting into three individual devices. Each device contains a gold pattern of four isolated working electrodes with one shared reference-counter electrode on the glass substrate. The gap between one pair of gold electrodes is 1 mm. For the surface treatment with BPTS, the glass substrates were cleaned by sonication in acetone and isopropyl alcohol for 5 min each to remove dust. After drying completely, the glass substrates were immersed in piranha solution ($H_2SO_4:H_2O_2$, 1:1, v/v) for 1 h, rinsed thoroughly with distilled water and then dried under $N_2$. The cleaned glass substrates were then immersed in anhydrous toluene containing 10% of BPTS by volume at room temperature under argon atmosphere overnight. After reaction, the glass substrates were rinsed with toluene, dried under $N_2$ and then annealed at 130° C. for 1 h.

Fabrication of a P4VP-SWCNT Chemiresistor Platform

The desired amount of P4VP-SWCNT dispersion was loaded into an airbrush (Revolution BR, Iwata) and manually spray-coated on the gap of gold electrode pairs on the surface functionalized substrate, the gaps for two electrode pairs at a time among four electrodes, through a homemade transparency film (CG3700, 3M) mask. In order to prevent unwanted nozzle drips and over-wetting on the substrate surface, which result in non-uniform deposition of composites, the dispersion was sprayed intermittently multiple times with an injection rate of about 40 μL/min at a distance of 10 cm from the substrate placed on a 130° C. hot plate under $N_2$ carrier gas of 2 bar pressure. After the spraying process, the resulting substrate was thermal annealed at 130° C. overnight for quarternization between alkyl bromides and pyridyl groups, followed by sonication in dichloromethane for 1 min to remove excess polymers and unimmobilized P4VP-SWCNT composites, and drying under $N_2$.

Metal Incorporation into a P4VP-SWCNT Chemiresistor Platform

In the case of silver nanoparticle (AgNP) incorporation, the substrate was soaked in 10 mg (40 µmol) of $AgPF_6$ solution in 2 mL of tetrahydrofuran (THF) overnight under dark condition, followed by sonication in THF for 1 min to remove unbound silver ions, and drying under $N_2$. Upon irradiation with 254 nm UV light by using a handheld UV lamp, $Ag^0$-P4VP-SWCNT composites were prepared by photoreduction of silver ions. For $Pd^{2+}$ incorporation, the substrate was soaked in a saturated ethanolic solution of $PdCl_2$ for 3 h, treated again in an ultrasonic bath to remove unbound $Pd^{2+}$ ions, and then dried under $N_2$. For the $[MnO_4]^-$-P4VP-SWCNT composites, the substrate was soaked in 2.5 mL water in a glass vessel. To the chamber, 0.63 mL of 0.5 M $H_2SO_4$ was added at room temperature and was allowed to sit for 1 h with occasional agitation. A solution of 0.75 g $KMnO_4$, 6.25 mL water, and 0.63 mL of 0.5 M $H_2SO_4$ was then added to the device at 0° C. (in an ice water bath), and the mixture was allowed to sit for 1 h with occasional agitation. The device was removed and rinsed with water, washed in water in an ultrasonic bath for 1 min, rinsed again with water, and then dried under a stream of $N_2$.

Fabrication of Chemical Detectors

Devices not containing P4VP were prepared on untreated glass substrates contains a gold pattern of four isolated working electrodes with one shared reference-counter electrode described above. For a typical device, 0.25 mg (20 µmol C) of SWCNTs and 5 µmol metal chloride salt were suspended in 1 mL DMF and sonicated briefly in an ultrasonic bath at room temperature. The resulting dispersions for each metal salt were drop-cast in triplicate using a micropipette onto the 1 mm gap between isolated gold working electrodes of the prepared glass substrates. The solvent was removed in vacuo. The application of the dispersion followed by the removal of the solvent was repeated until the resistance across the SWCNT network reached a value of 1-10 kΩ as measured by an ohmmeter. Non-functionalized SWCNTs used to fabricate chemiresistive devices in this manner for comparison.

Ammonia Gas Detection Measurement

For $NH_3$ detection measurement, the fabricated device was inserted into a 2×30 pin edge connector (TE Connectivity AMP Connectors) mounted on a solderless breadboard, and then enclosed with a custom-built PTFE chamber containing a small gas inlet and outlet. The gold electrodes of the device were connected to a PalmSens EmStat potentiostat with a MUX16 multiplexer, and a Smart-Trak Series 100 (Sierra Instruments) gas mixing system was used to deliver 1 mL/min of a mixture of 1% $NH_3$ in $N_2$ that was further diluted by $N_2$ at a rate of 1 L/min to the device's enclosure. The potentiostat applied a constant potential of 0.1 V across the electrodes, and the current for each channel of the device was recorded using PSTrace software (v. 4.7) during 60 s of $NH_3$ exposures. The change in current resulting from exposure to $NH_3$ was converted to the negative change in conductance ($-\Delta G/G_0$), which was taken as the device's response.

VOC Gas Detection Measurement

For VOC gas detection measurement, the fabricated array device was placed into a custom-built PTFE enclosure with a small gas inlet and outlet, and with the aid of a 64-pin device test clip (3M) and custom-built PTFE spacer, the gold electrodes of the device were connected to a PalmSens EmStat potentiostat with a MUX16 multiplexer. A KIN-TEK gas generator system calibrated for each VOC was used to deliver to the device's enclosure a known concentration of a given VOC analyte diluted in $N_2$ or air at a fixed gas flow rate. The potentiostat applied a constant potential of 0.1 V across the electrodes, and the current for each channel of the device was recorded using PSTrace software (v. 4.7) during 60 s of VOC vapor exposures. After a linear baseline correction, the change in current resulting from exposure to the analyte was converted to the negative change in conductance ($-\Delta G/G_0$), which was taken as the device's response.

Fabrication of a P4VP-SWCNT-GOx Chemiresistive Sensor

After fabricating a quaternized P4VP-SWCNT Scaffold, following procedures were applied to obtain final substrate: The substrate was thermally annealed at 130° C. overnight for quaternization reaction between alkyl bromides and pyridyl groups, then sonicated in pure dichloromethane (DCM) for 1 min to remove excess polymers and non-immobilized P4VP-SWCNT composites and finally dried under $N_2$. For the quaternization reaction with 2-bromoethanol treatment, 1 mL of 2-bromoethanol (97%) was added into the 4 mL of acetonitrile (ACN), and mixed well. Then, the modified device was put into the ACN solution and then placed on 30° C. hot plate for 24 hours. Finally, the device was rinsed with pure ACN, and dried under a stream of $N_2$.

Following surface modification, the device was rinsed with distilled water and dried under $N_2$. Then 2 µL of glucose oxidase solution (10 µL of 2.5 mM pH 7.0 phosphate buffer solution containing 30.27 U GOx) was immobilized onto the quaternized P4VP-SWCNT surface. GOx was chosen as the model enzyme. After 2 min, 2 µL of glutaraldehyde (GA) solution (1%) was added on the surface and allowed to dry in ambient air for 2 h to finalize the fabrication of P4VP-SWCNT-GOx-modified devices. Final resistance across the SWCNT network reached at a resistance of 350 kΩ-1 MΩ as measured by a multimeter. Devices were thoroughly washed with distilled water prior to use in order to remove unbound enzyme molecules. The use of GA not only provides intermolecular cross linking in proteins but also enhances anchoring of the enzyme molecules on the supporting material. See, Gouda, M. D.; Kumar, M. A.; Thakur, M. S.; Karanth, N. G. Enhancement of Operational Stability of an Enzyme Biosensor for Glucose and Sucrose Using Protein Based Stabilizing Agents. *Biosens. Bioelectron.* 2002, 17, 503-507, which is incorporated by reference in its entirety.

Glucose Detection Measurement

Chemiresistive measurement of the devices was carried out at room temperature in the reaction cell containing 10 mL of NaOAc (2.5 mM, pH 5.5) by applying 0.1 V potential. Under the constant potential, the resistance change was monitored and recorded using a custom Labview program with the combination of Keithley 2400 Source meter. The change in resistance resulted from exposure to glucose was calculated using the equation of $\Delta R\ (\%) = (R - R_0)/R_0 \times 100\%$, $R_0$ is the initial resistance of the P4VP-SWCNT-GOx, and R is the resistance after exposure to glucose. After the background reached at a steady state, a certain amount of glucose was injected in the reaction cell and the resistance change was recorded as the sensor response. All the experiments were carried out at ambient conditions. For consecutive measurements, working buffer was refreshed and the device was rinsed with distilled water after each measurement.

Glucose oxidase (GOx) is a well-known oxido-reductose enzyme that catalyses glucose to gluconolactone and hydrogen peroxide as follow:

$$\beta\text{-D-Glucose} + O_2 \rightarrow \text{D-Glucono-1,5-lactone} + H_2O_2$$

See, Besteman, K.; Lee, J. o.; Wiertz, F. G. M.; Heering, H. A.; Dekker, C. Enzyme-Coated Carbon Nanotubes as Single-Molecule Biosensors. *Nano Lett.* 2003, 3, 727-730, and Liu, Y.; Feng, X.; Shen, J.; Zhu, J. J.; Hou, W. Fabrication of a Novel Glucose Biosensor Based on a Highly Electroactive Polystyrene/Polyaniline/Au Nanocomposite. *J. Phys. Chem. B.* 2008, 112, 9237-9242, each of which is incorporated by reference in its entirety.

The quantification of glucose can be monitored via detection of enzymatically liberated hydrogen peroxide under the constant potential. When the reaction is occurred glucose is catalyzed to produce hydrogen peroxide and subsequently alters the resistance of the system. However, in the absence of GOx, no change in resistance was observed during the measurement. A SWCNT based chemiresistive glucose detector can be produce a strong resistance response in the system. Additionally, through the catalytic reaction the enzyme molecules temporarily change both their charge state and conformation. This enzymatic reaction leads to change in resistance of the system. Moreover, this designed sensor showed different resistance changes upon exposure to different concentration of glucose. Following the optimization and characterization studies, the P4VP-SWCNT-GOx device was tested for glucose in some beverages. The beverage samples were used without any treatment. Experimental analyses were achieved in the three replicates, and data were calculated as the mean±standard deviation.

Other embodiments are within the scope of the following claims.

What is claimed is:

1. A sensor for detecting an analyte comprising:
a substrate; and
a conductive region in electrical communication with at least two electrodes on the substrate, the conductive region including a composite, wherein the composite includes a carbon nanotube associated with a polymer covalently linked to a surface of the substrate via a linker.

2. The sensor of claim 1, wherein the polymer includes a nitrogenous group available to form a covalent bond with the linker.

3. The sensor of claim 2, wherein the polymer includes poly(4-vinylpyridine) (P4VP).

4. The sensor of claim 1, wherein the linker includes a quaternary nitrogen bond with the polymer.

5. The sensor of claim 4, wherein the linker is from an alkyl halide group.

6. The sensor of claim 5, wherein the linker is from 3-bromopropyltrichlorosilane.

7. The sensor of claim 1, wherein the polymer is further associated with a metal particle or a metal ion.

8. The sensor of claim 7, wherein the metal ion is a soft Lewis acidic cation.

9. The sensor of claim 7, wherein the metal ion is Cu2+, Cu+, Pd2+, Ru+, Rh3+, Ag+, Cd2+, Ru3+, Os+, Ir3+, Pt4+, Au3+, Au+, Hg2+, Hg+ or Tl+.

10. The sensor of claim 7, wherein the metal ion is an oxidizing agent.

11. The sensor of claim 7, wherein the metal ion is permanganate.

12. The sensor of claim 1, wherein a second polymer is incorporated into the sensor.

13. The sensor of claim 12, wherein the second polymer is a conducting polymer.

14. The sensor of claim 12, wherein the second polymer is a polydiacetylene.

15. The sensor of claim 1, wherein the carbon nanotube is a single-walled carbon nanotube.

16. The sensor of claim 1, wherein the substrate is glass, paper or plastic.

17. The sensor of claim 1, wherein the substrate is a resonant circuit.

18. The sensor of claim 1, further comprising a metal sensitizer.

19. The sensor of claim 1, wherein the composite is functionalized.

20. The sensor of claim 19, wherein the metal sensitizer includes silver nanoparticles.

21. The sensor of claim 1, wherein the composite further comprises a sensing element.

22. The sensor of claim 19, wherein the composite is functionalized with 2-bromoethanol.

23. The sensor of claim 1, wherein the analyte is glucose.

24. The sensor of claim 21, wherein the sensing element is glucose oxidase.

25. A method of sensing an analyte comprising:
exposing a sensor to a sample, the sensor including:
a substrate; and
a conductive region in electrical communication with at least two electrodes on the substrate, the conductive region including a composite, wherein the composite includes a carbon nanotube associated with a polymer covalently linked to a surface of the substrate via a linker; and
measuring an electrical property at the electrodes.

26. The method of claim 25, further comprising detecting an amine, a thioether, a volatile organic compound, an environmental stimulus, or glucose.

27. The method of claim 25, further comprising detecting the analyte wirelessly.

28. The method of claim 25, further comprising detecting the analyte through a wireless radio frequency communication.

29. The method of claim 25, further comprising detecting an output from a radio frequency identification tag including the sensor.

30. The method of claim 25, wherein the polymer includes a nitrogenous group available to form a covalent bond with the linker.

31. The method of claim 25, wherein the polymer includes poly(4-vinylpyridine) (P4VP).

32. The method of claim 25, wherein the linker includes a quaternary nitrogen bond with the polymer.

33. The method of claim 32, wherein the linker is derived from an alkyl halide group.

34. The method of claim 32, wherein the linker is derived from 3-bromopropyltrichlorosilane.

35. The method of claim 25, wherein the polymer is further associated with a metal particle or a metal ion.

36. A method of preparing a sensor for detecting an analyte comprising:

preparing a substrate;
forming a conductive region on the substrate, the conductive region including a composite, wherein the composite includes a carbon nanotube and a polymer;
grafting a linker on the substrate;
forming a covalent bond between the substrate and the polymer via the linker; and
placing the conductive region in electrical communication with at least two electrodes.

* * * * *